Oct. 14, 1952 R. T. ADAMS ET AL 2,613,427
ARTICLE FORMING APPARATUS
Original Filed Jan. 11, 1945 26 Sheets-Sheet 1
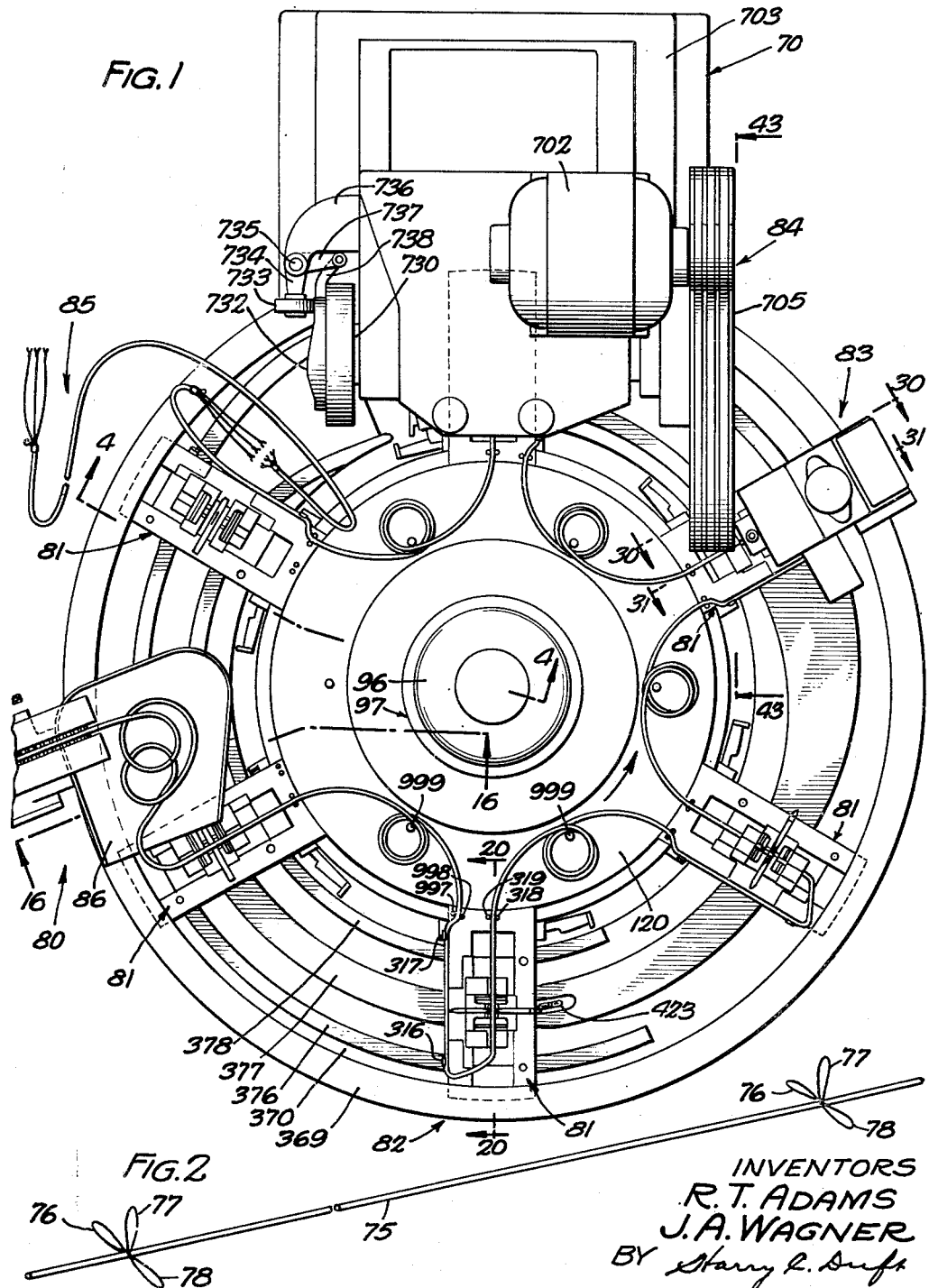
INVENTORS
R. T. ADAMS
J. A. WAGNER
BY 
ATTORNEY

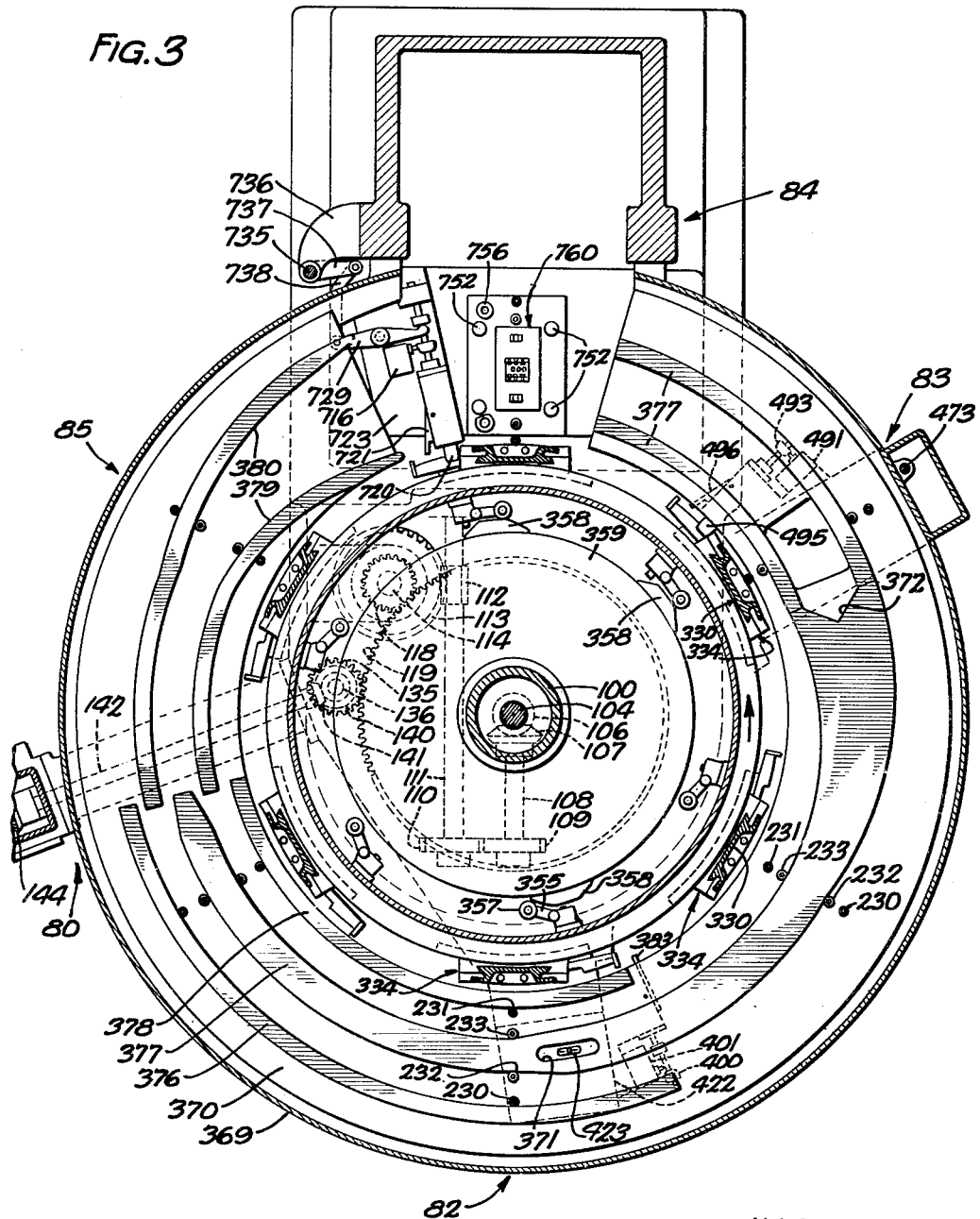

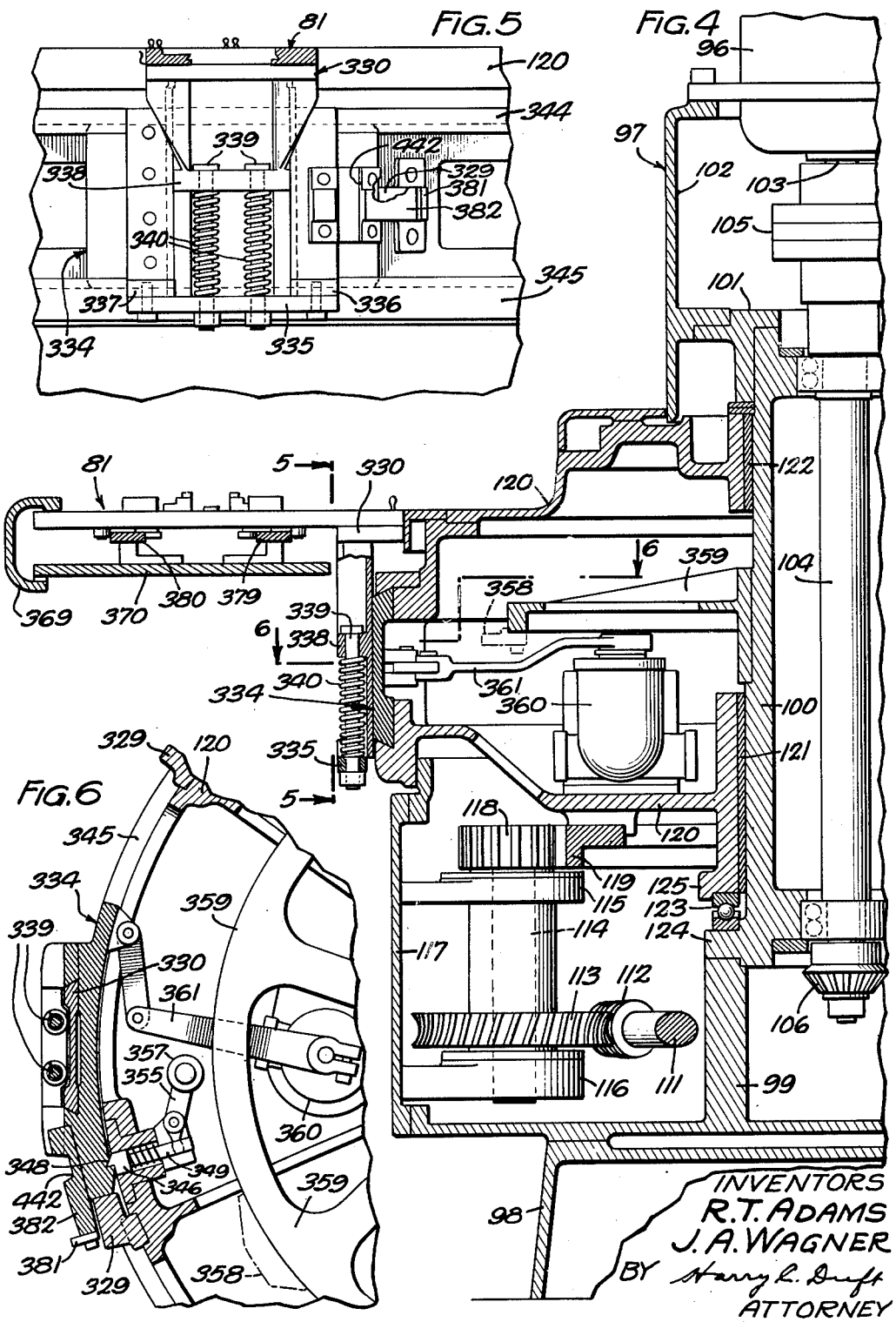

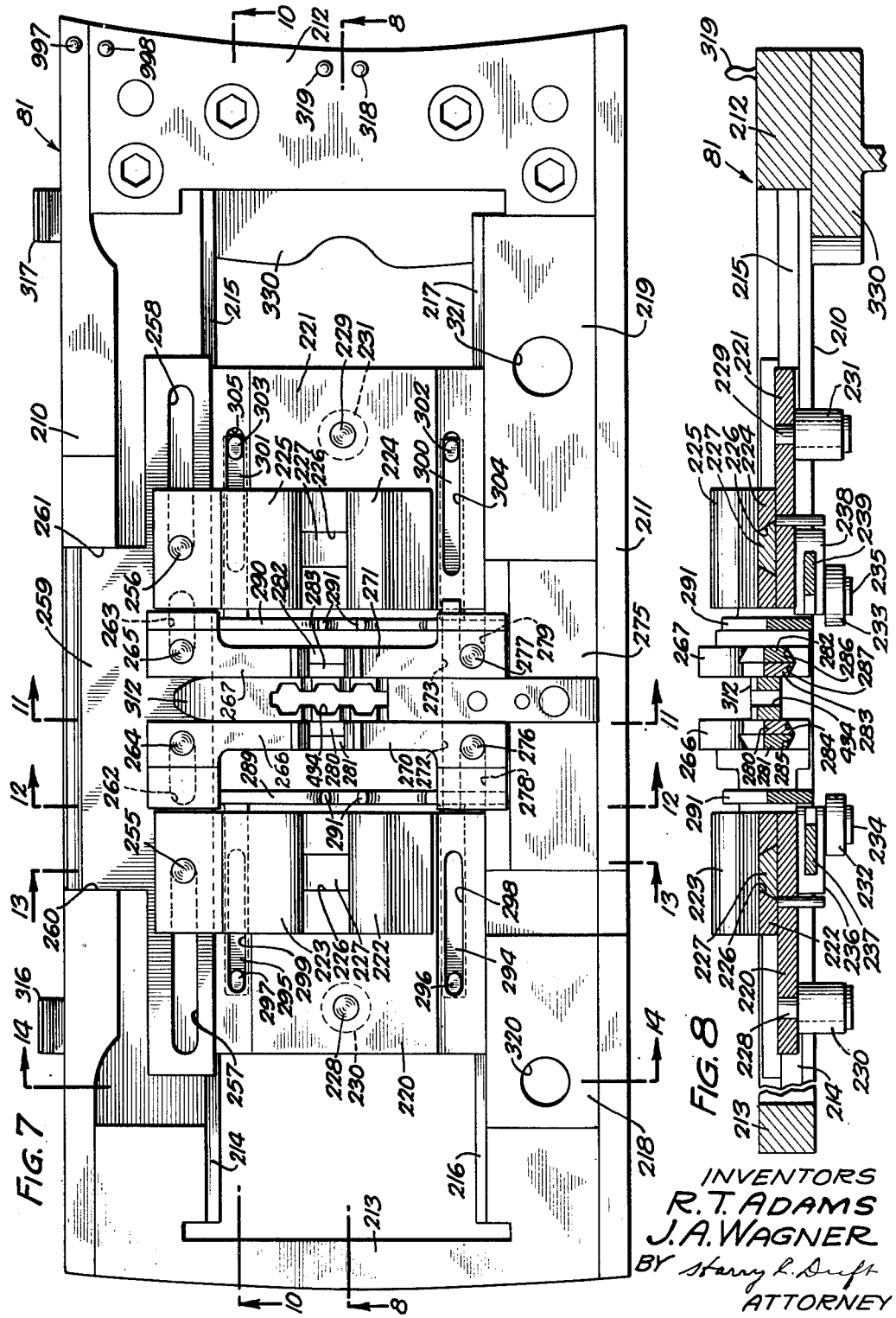

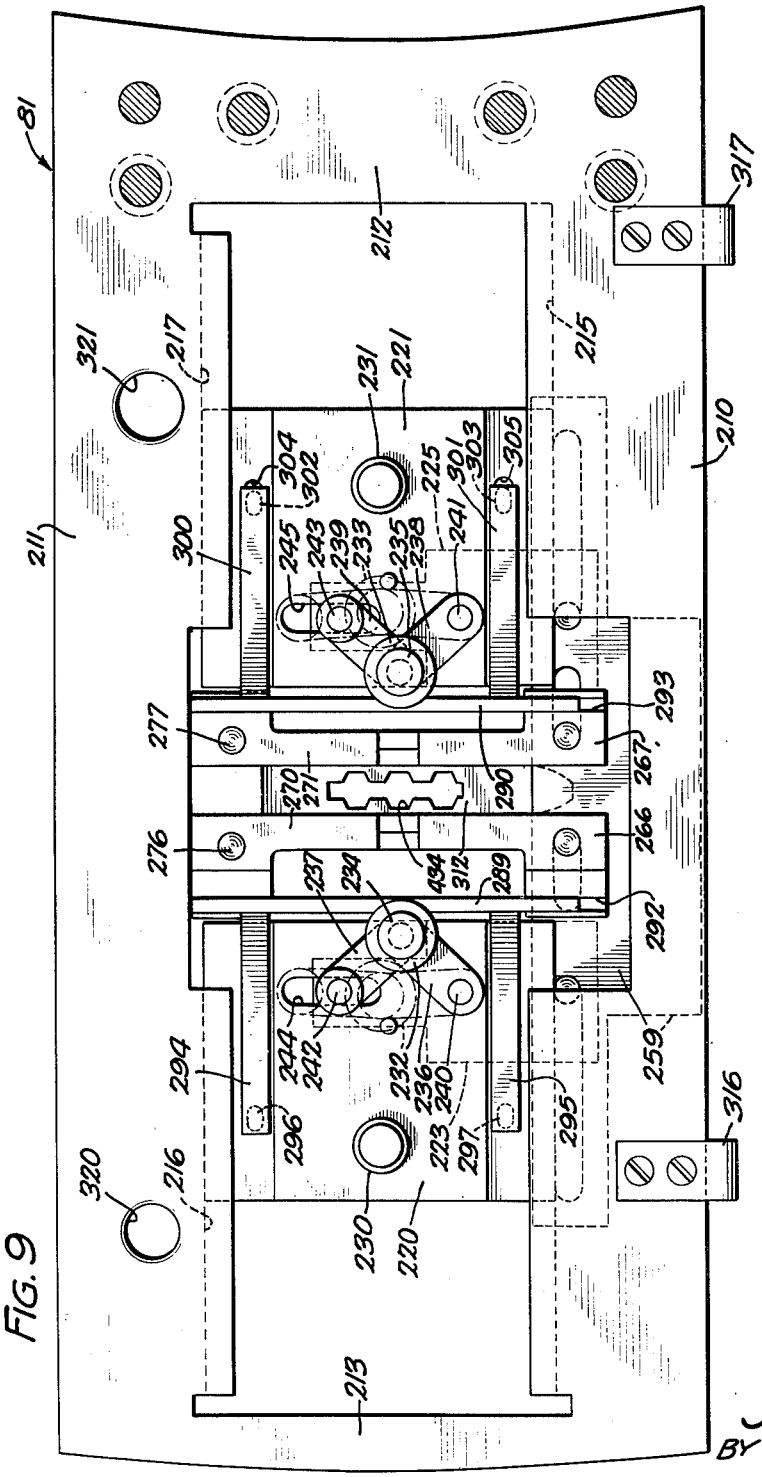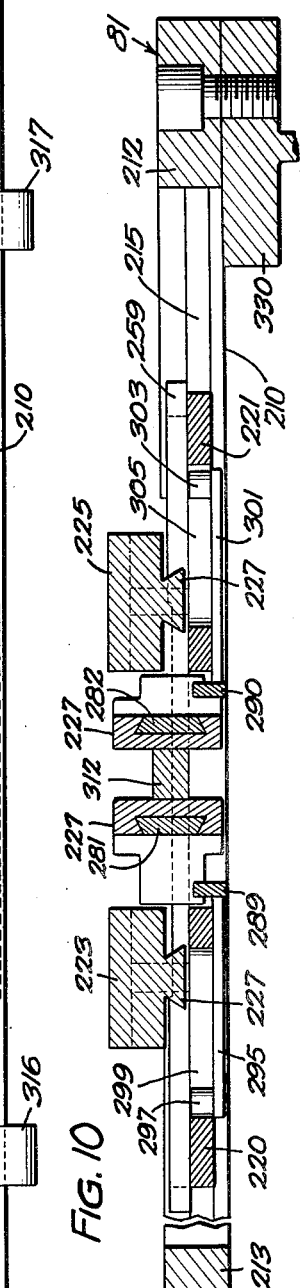

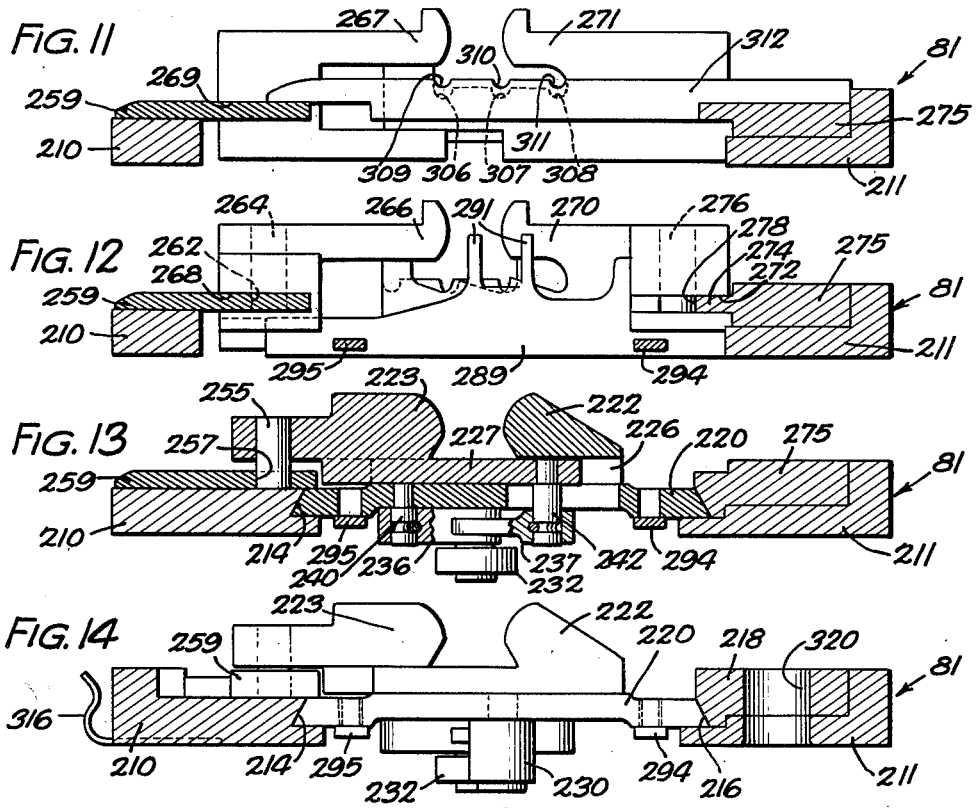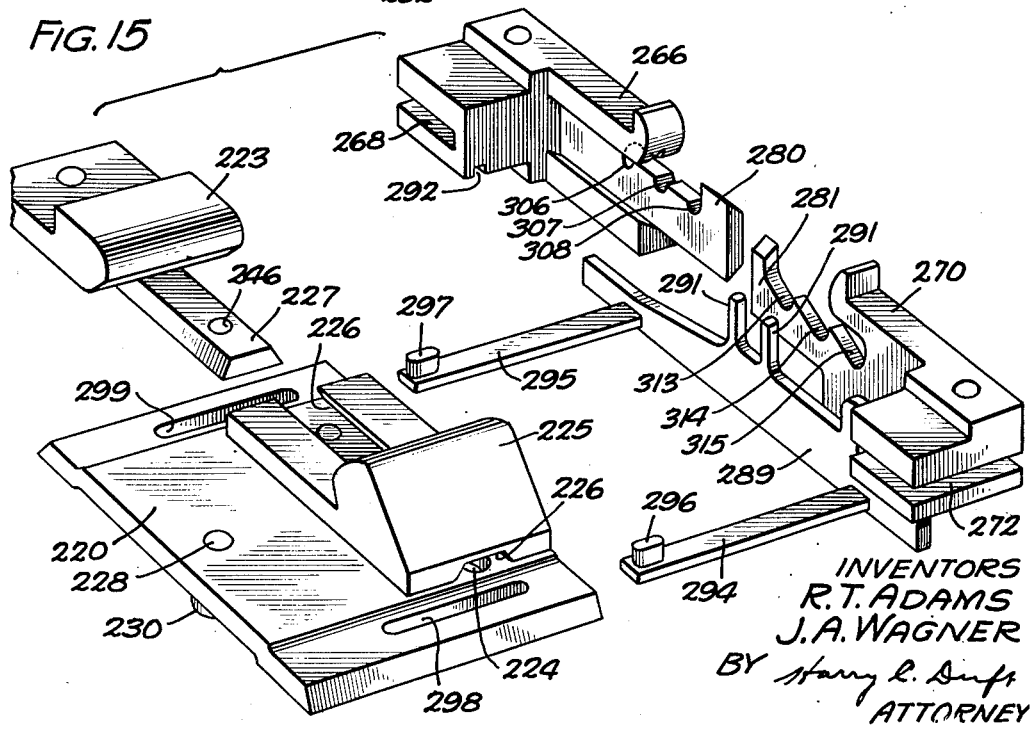

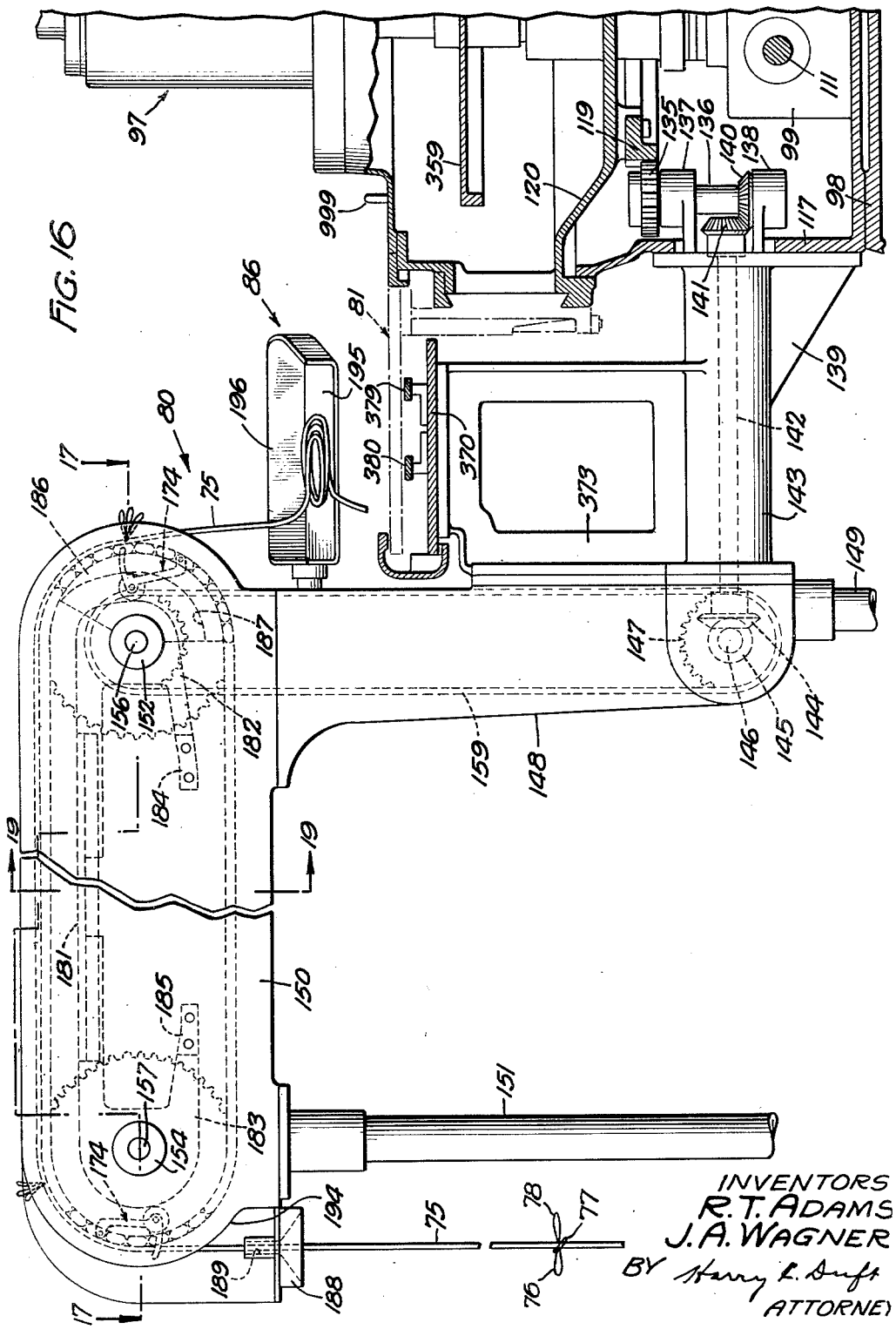

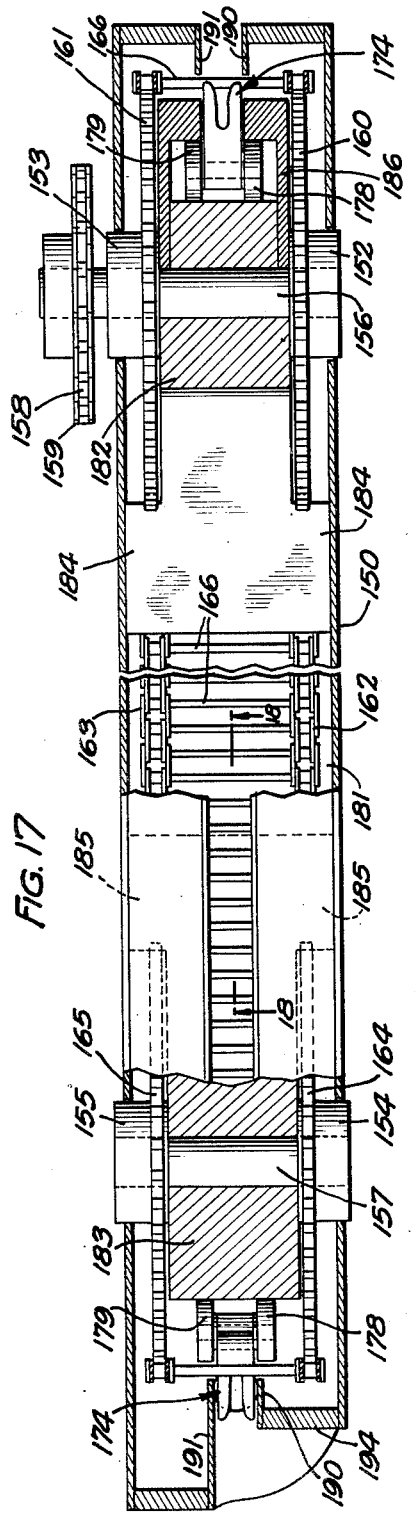
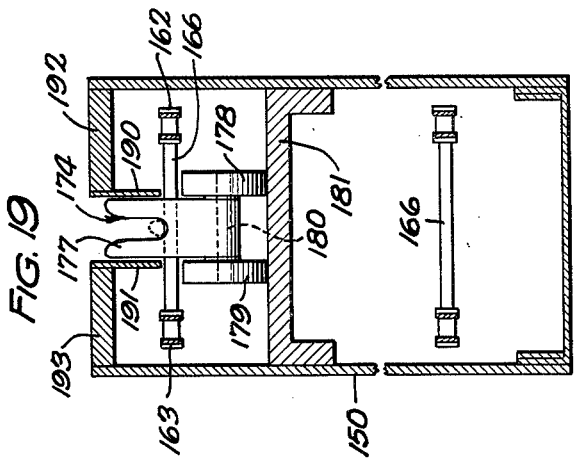
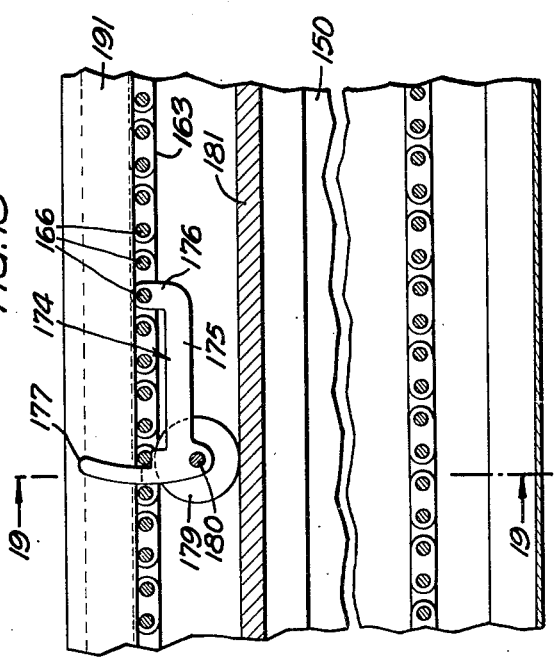

Oct. 14, 1952 R. T. ADAMS ET AL 2,613,427
ARTICLE FORMING APPARATUS
Original Filed Jan. 11, 1945 26 Sheets-Sheet 9
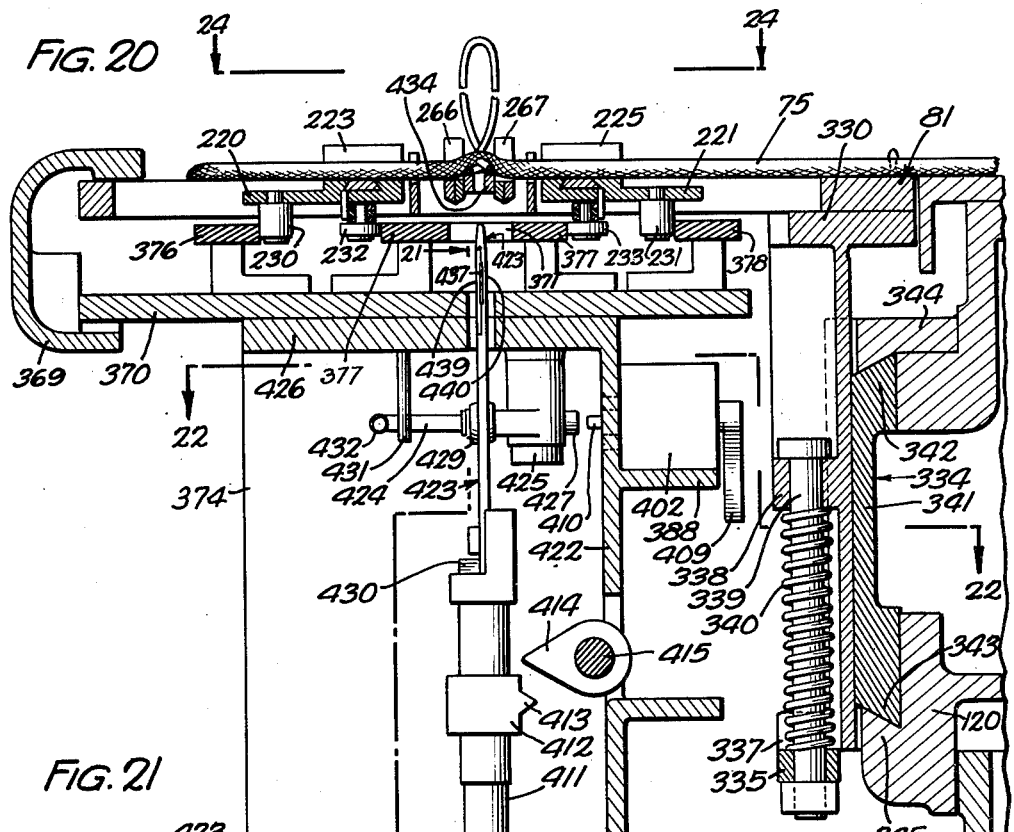
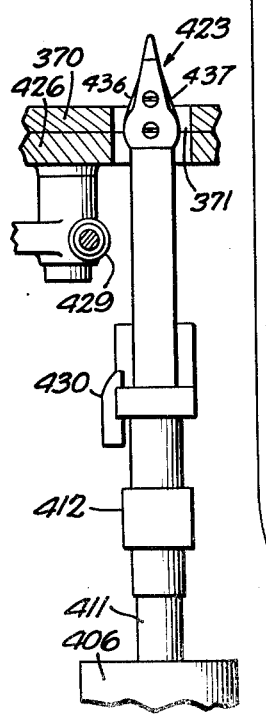
INVENTORS
R. T. ADAMS
J. A. WAGNER
BY Harry R. Duft
ATTORNEY

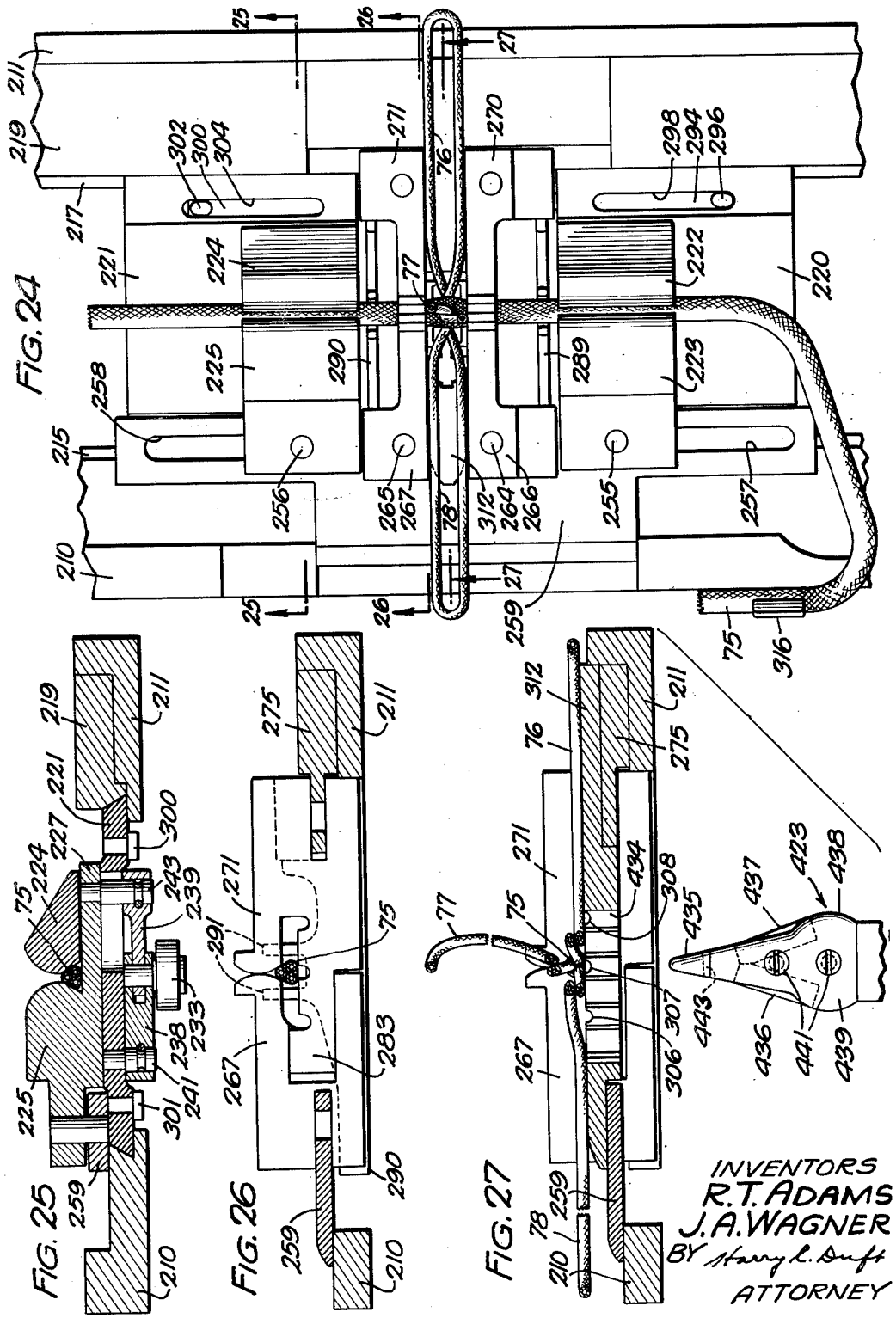

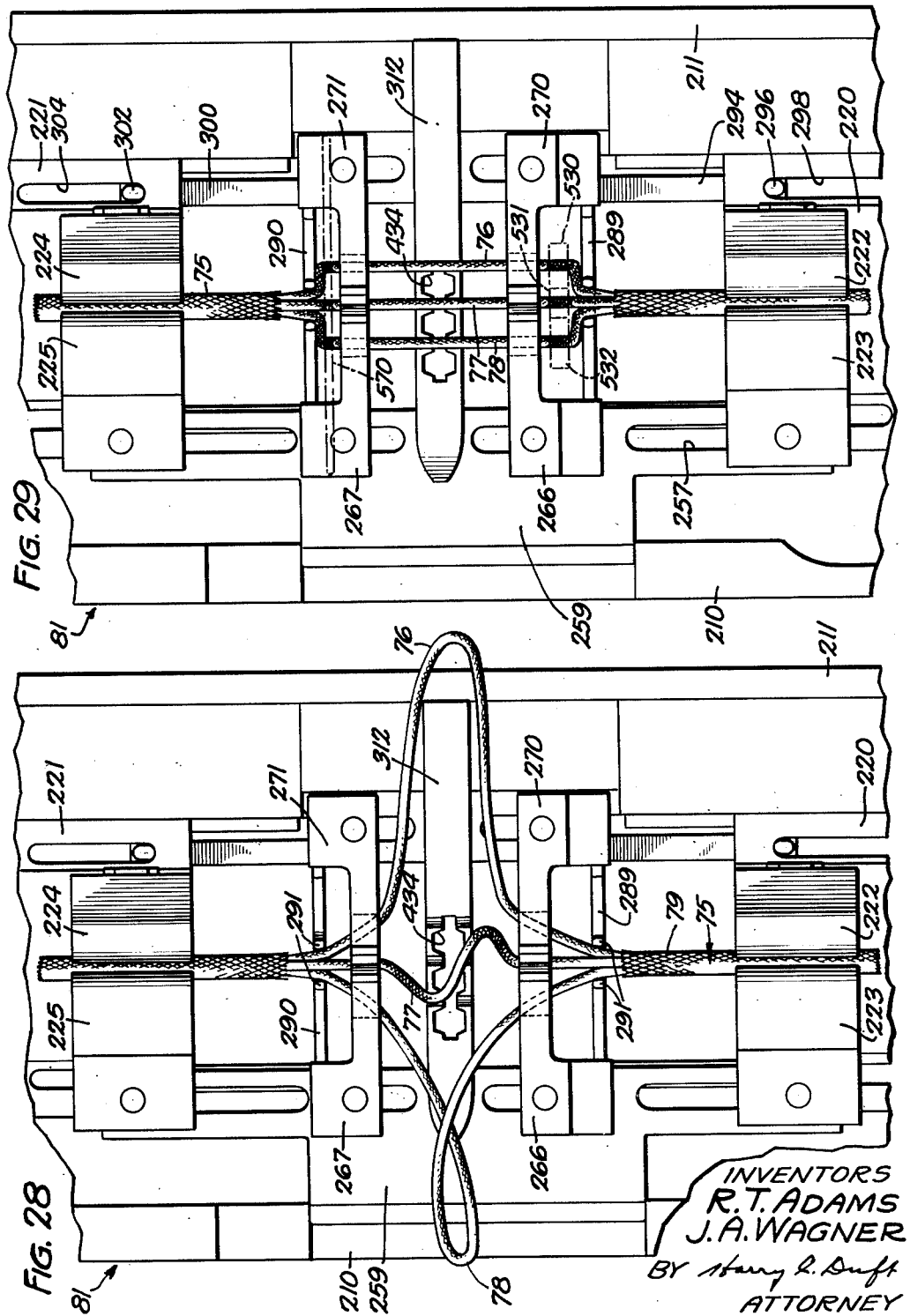

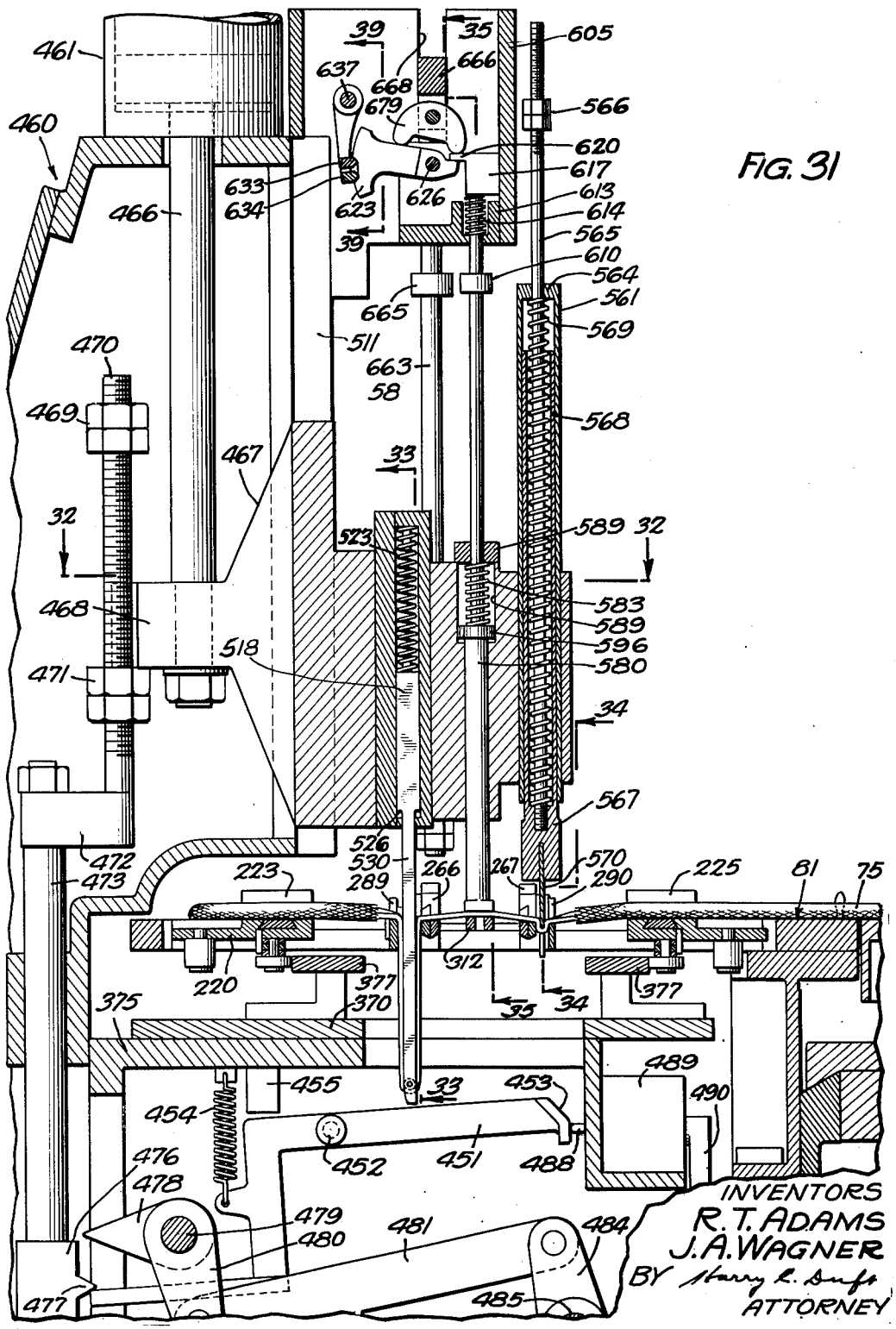

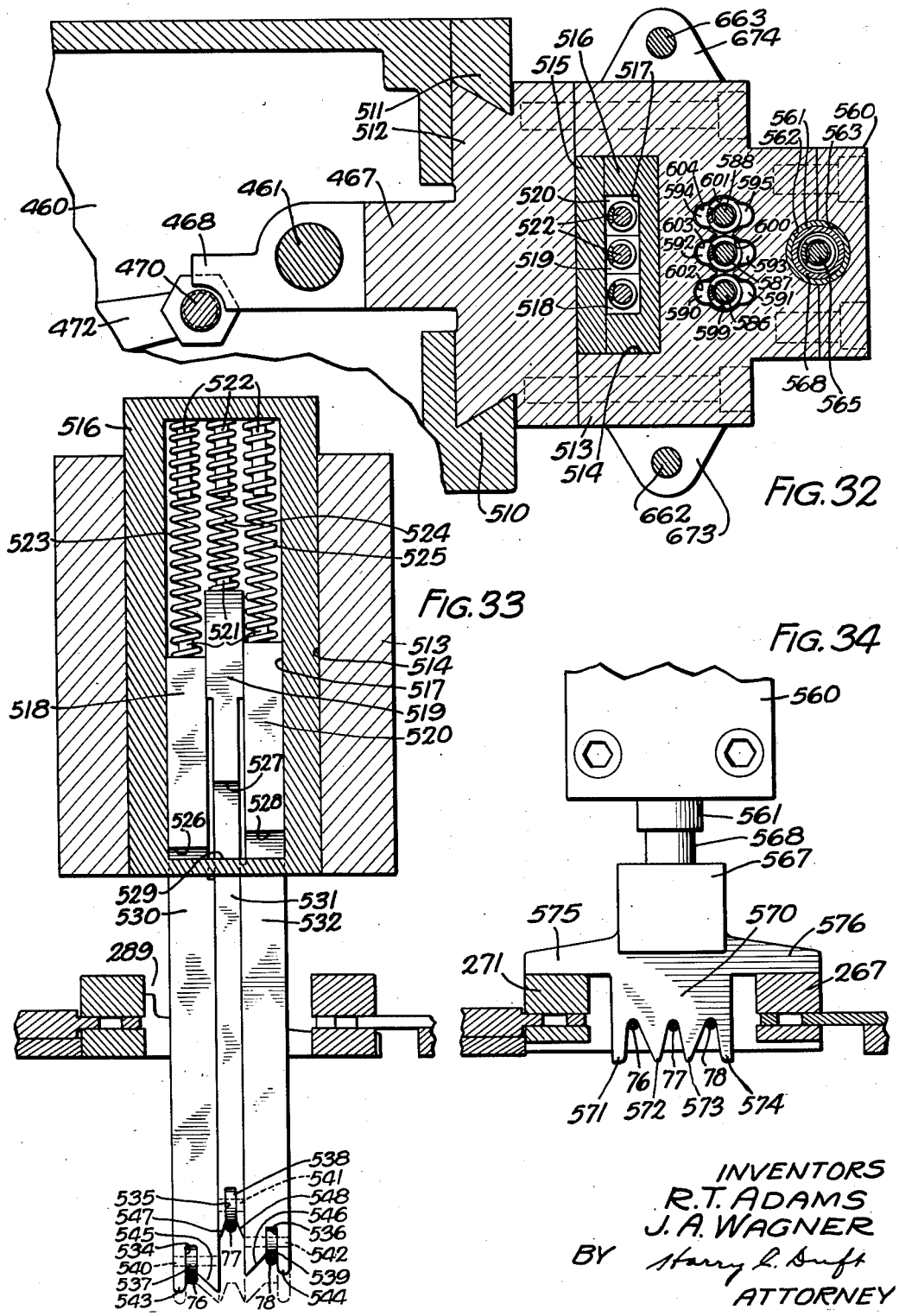

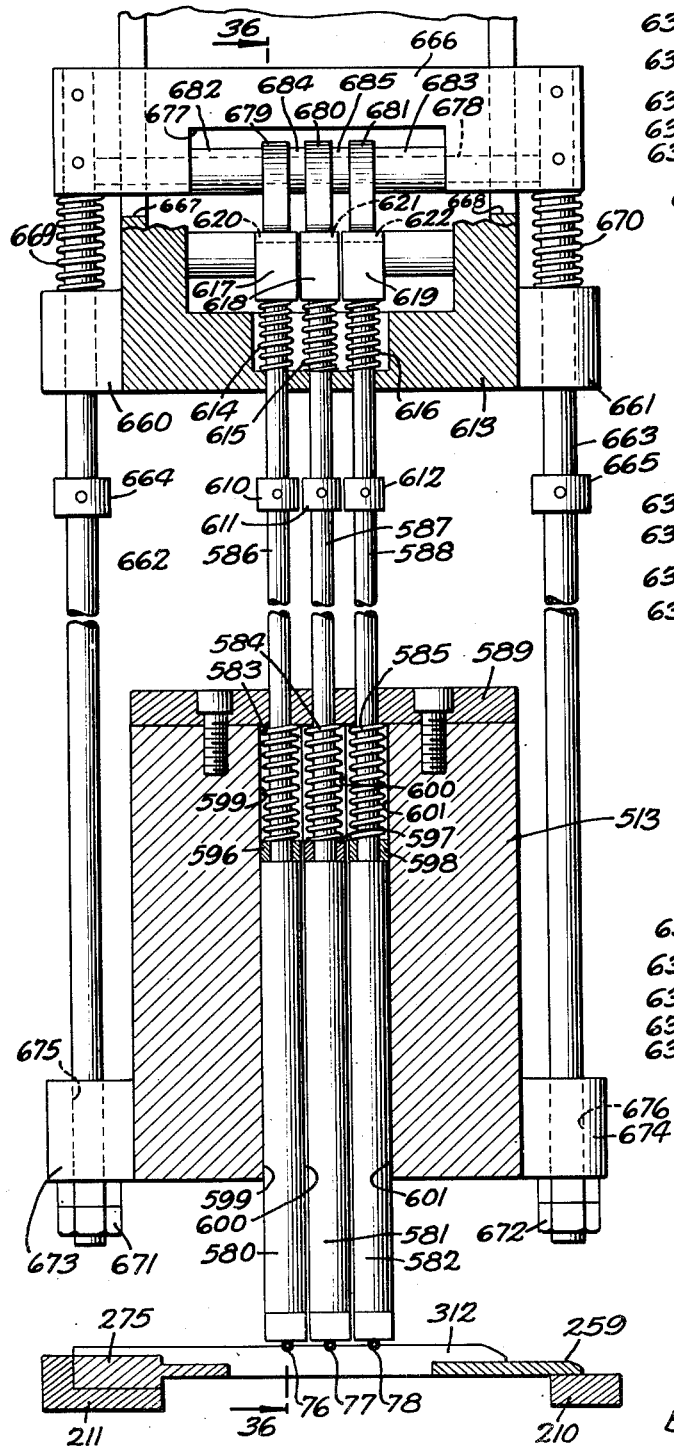
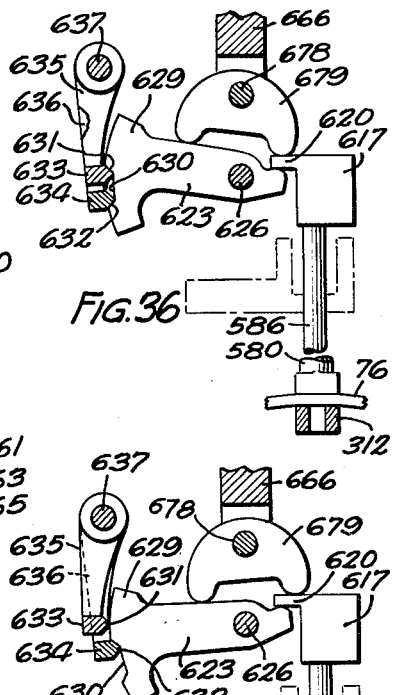
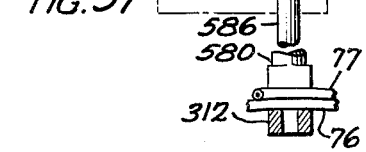
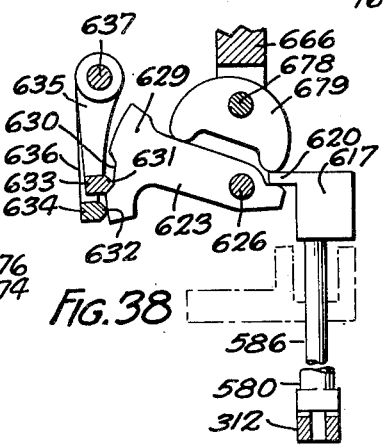

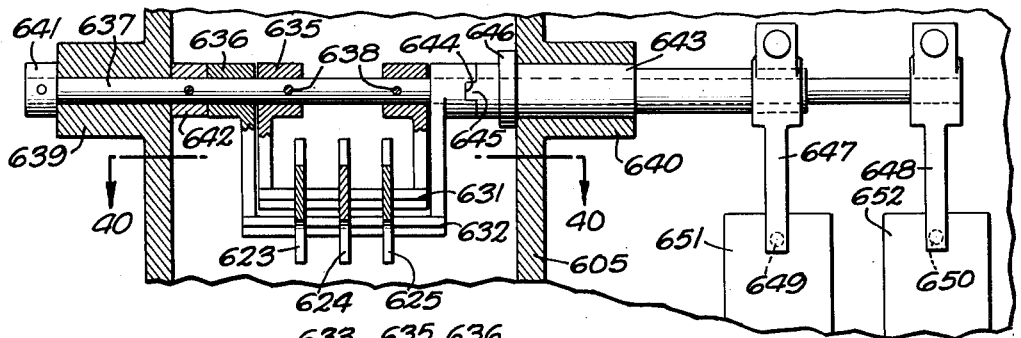
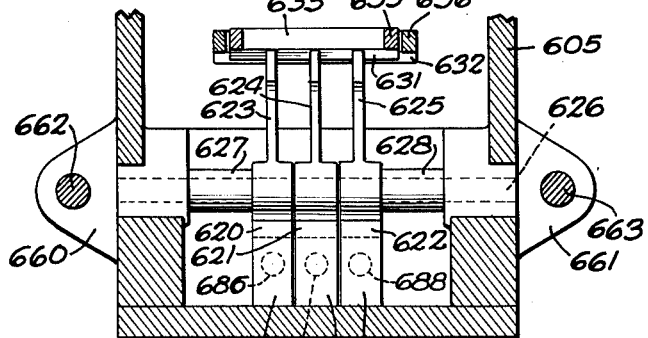
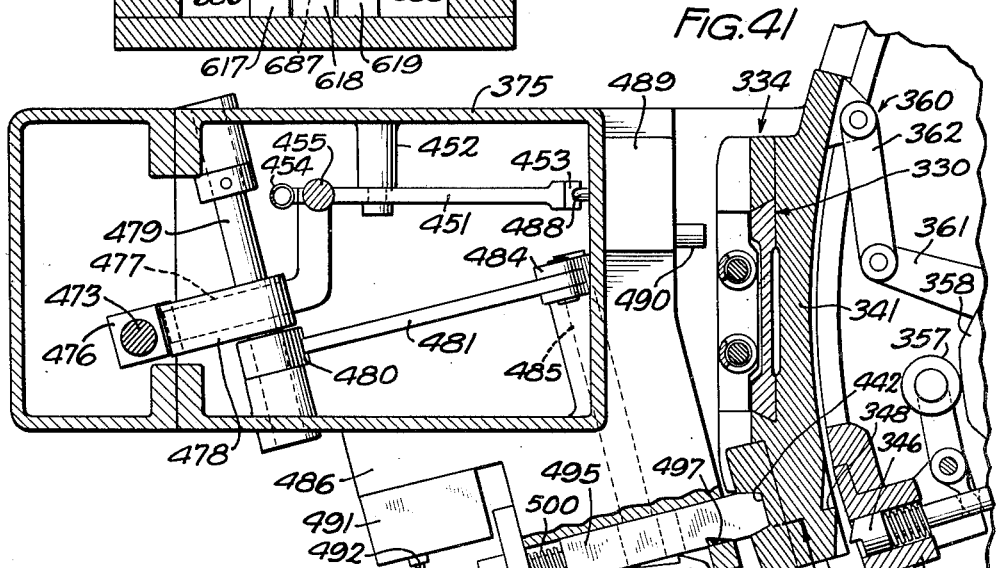
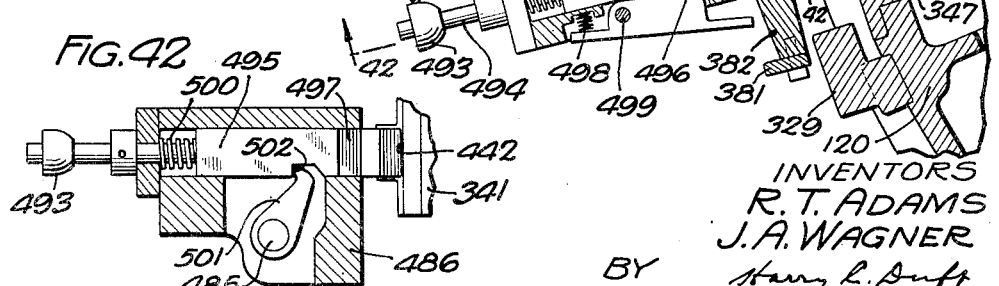

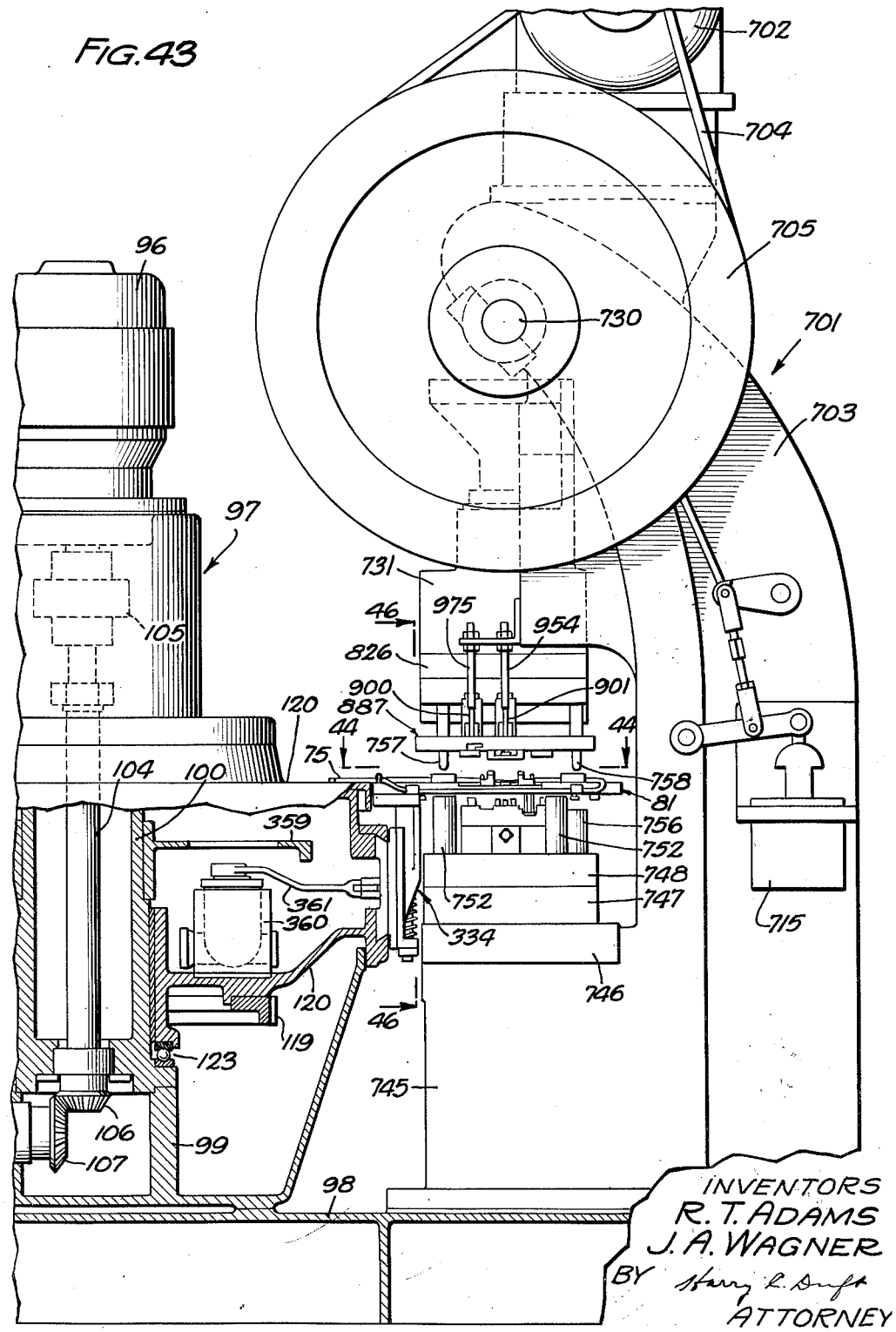

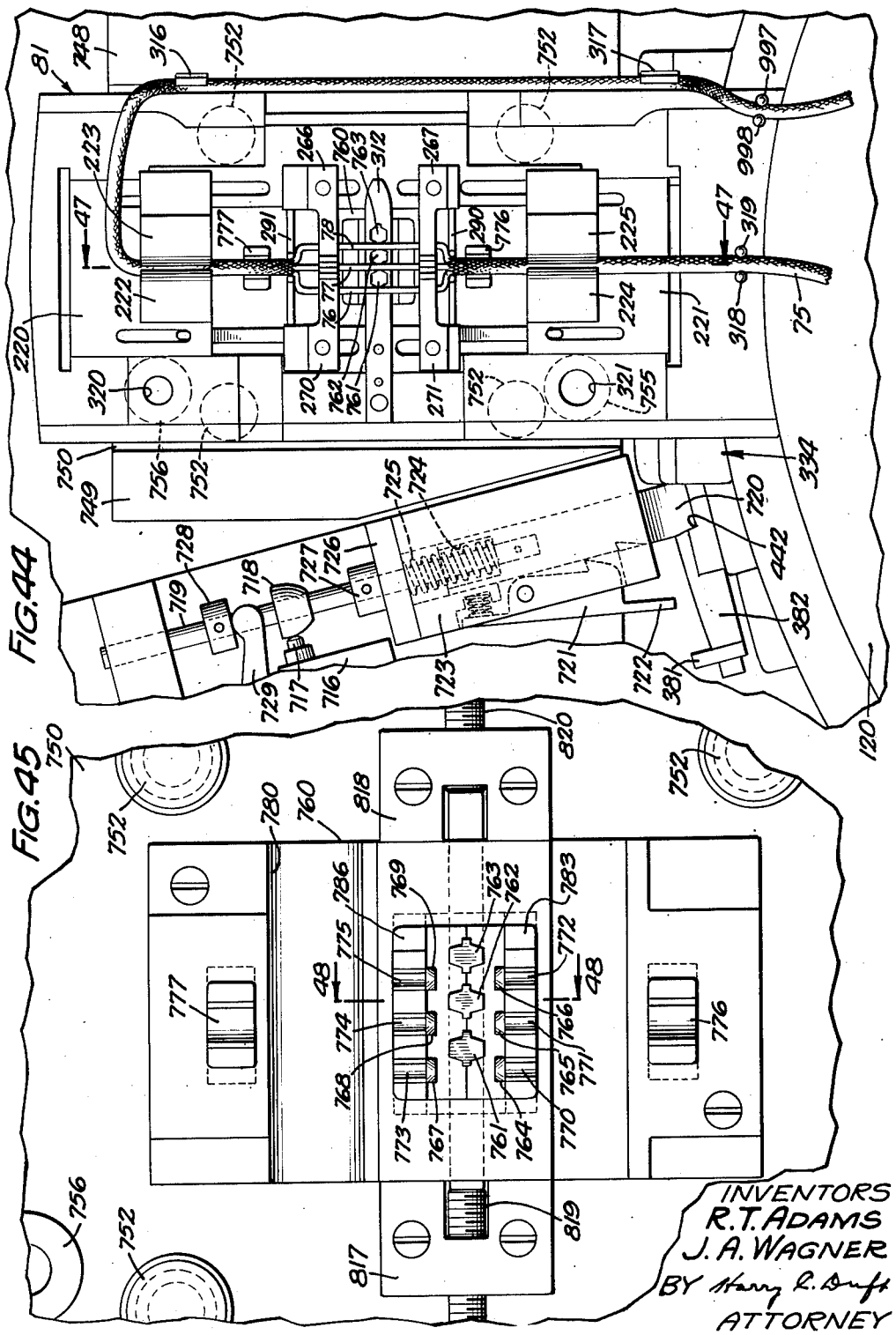

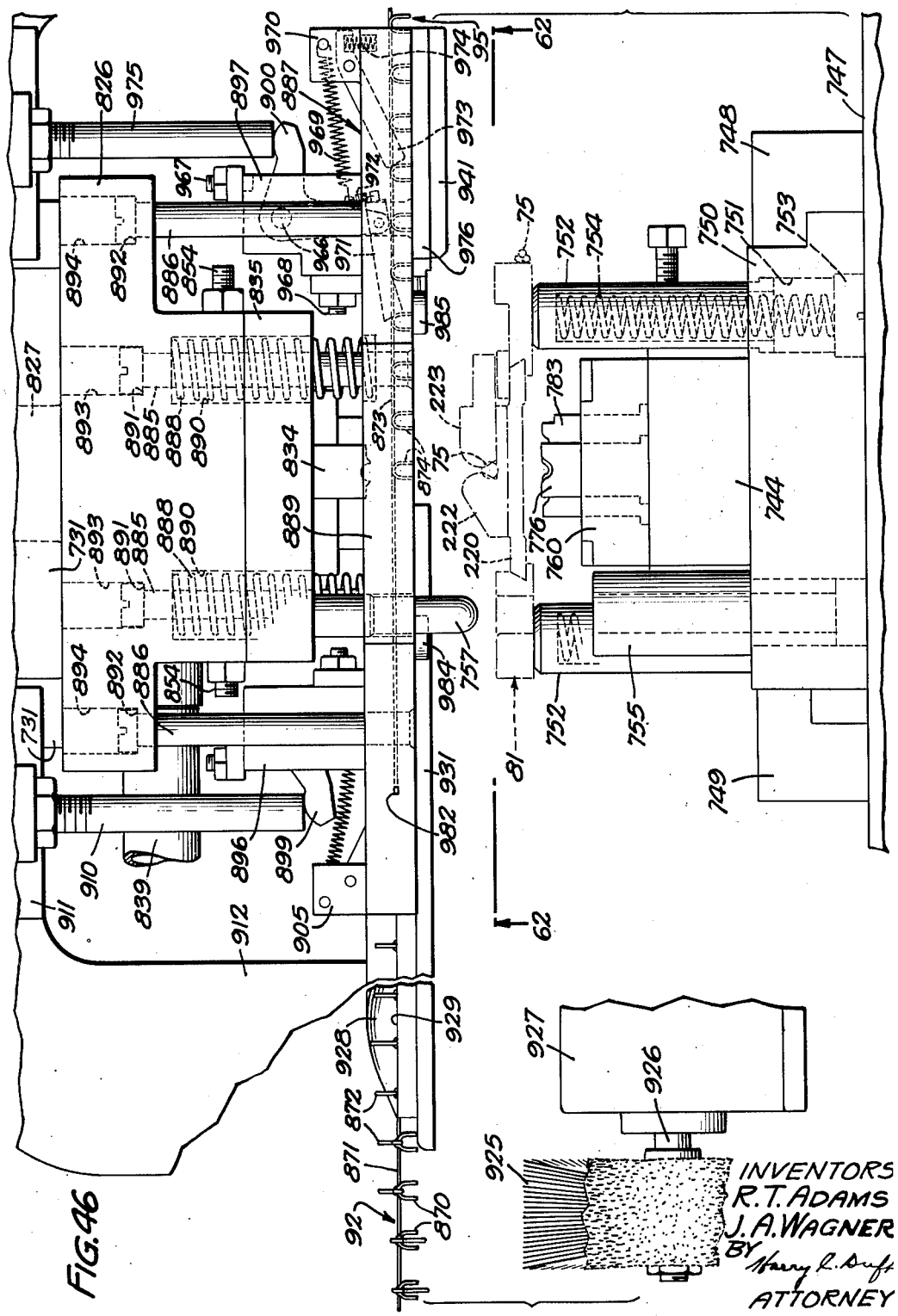

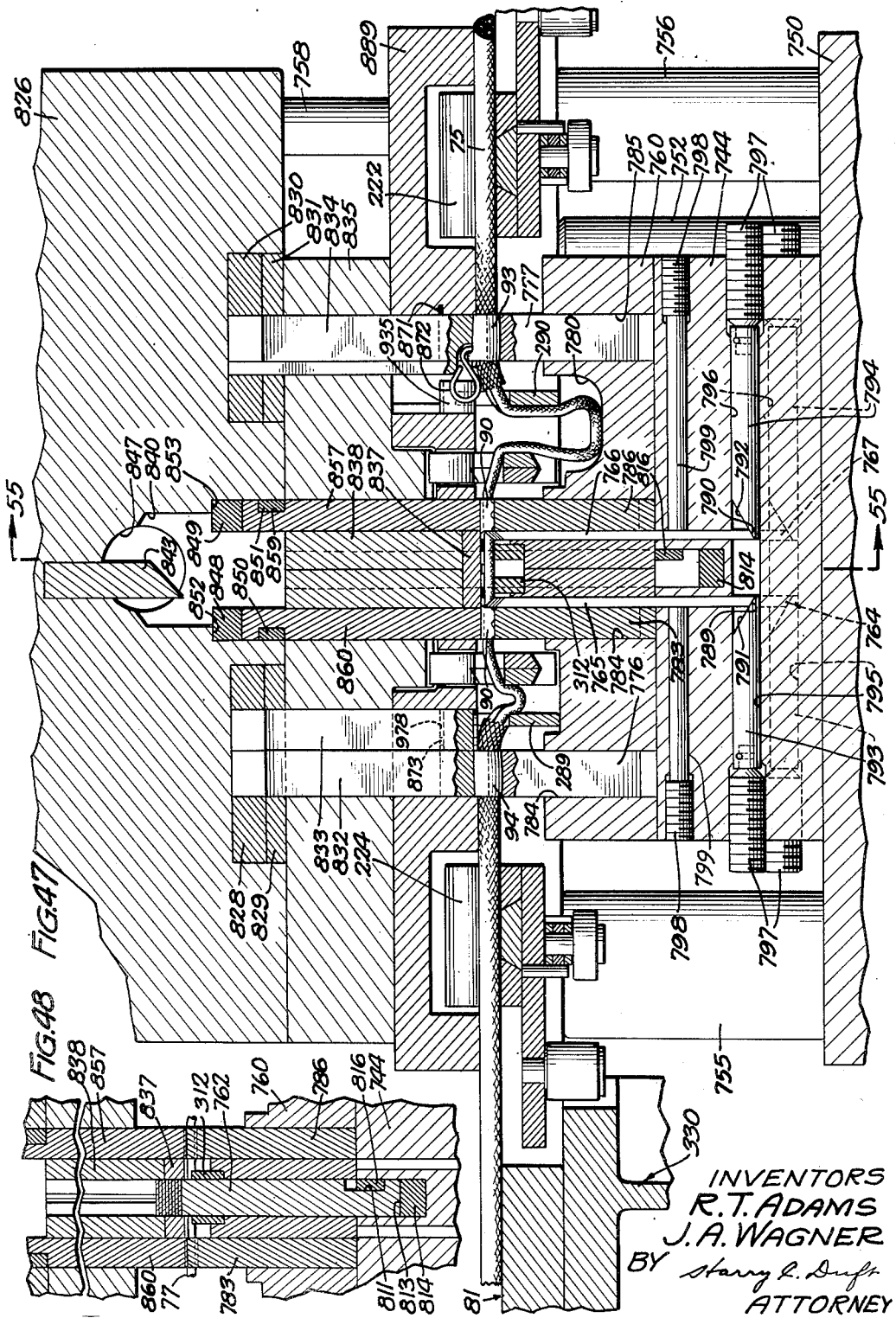

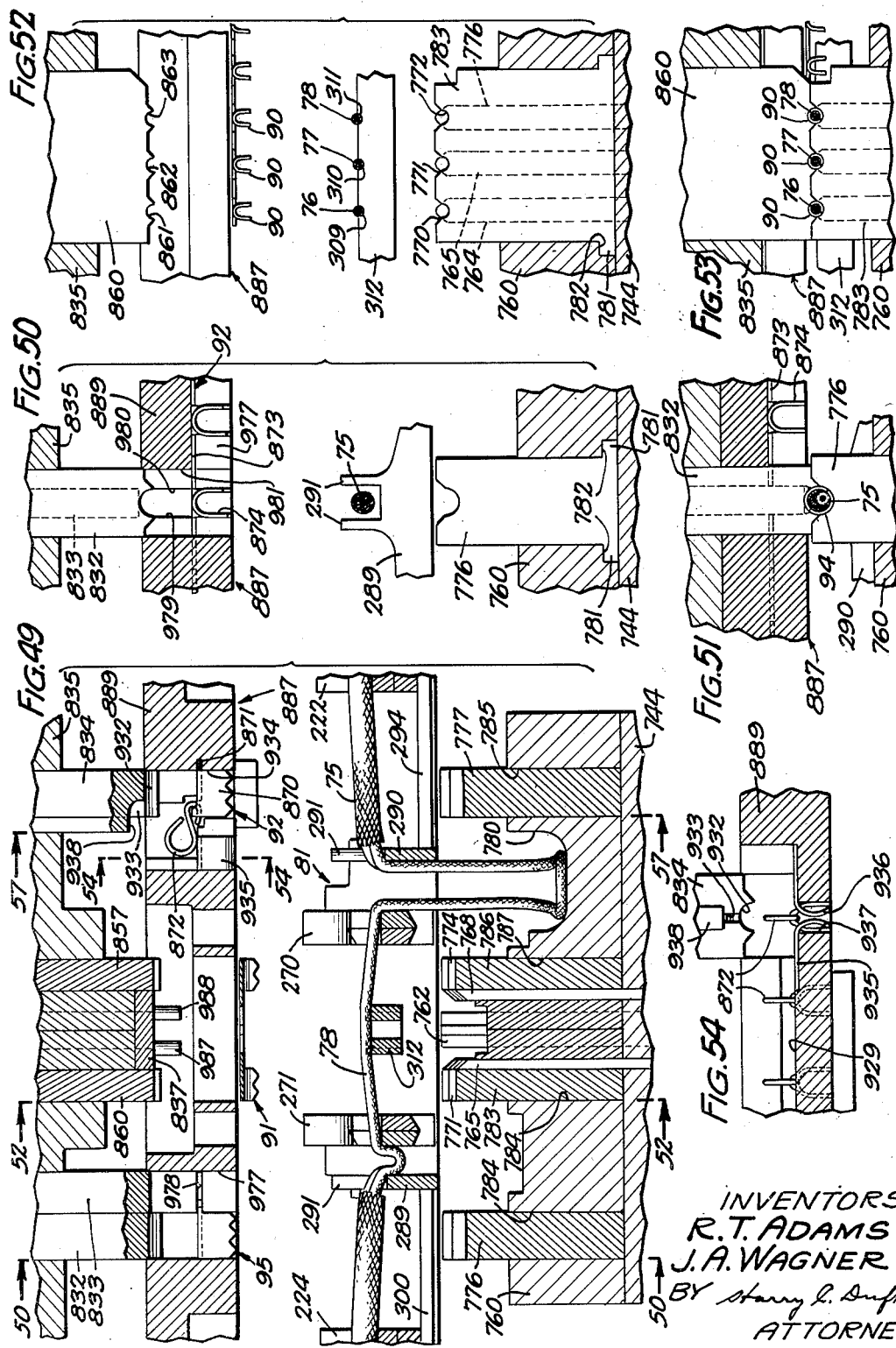

Oct. 14, 1952 — R. T. ADAMS ET AL — 2,613,427
ARTICLE FORMING APPARATUS
Original Filed Jan. 11, 1945 — 26 Sheets-Sheet 23
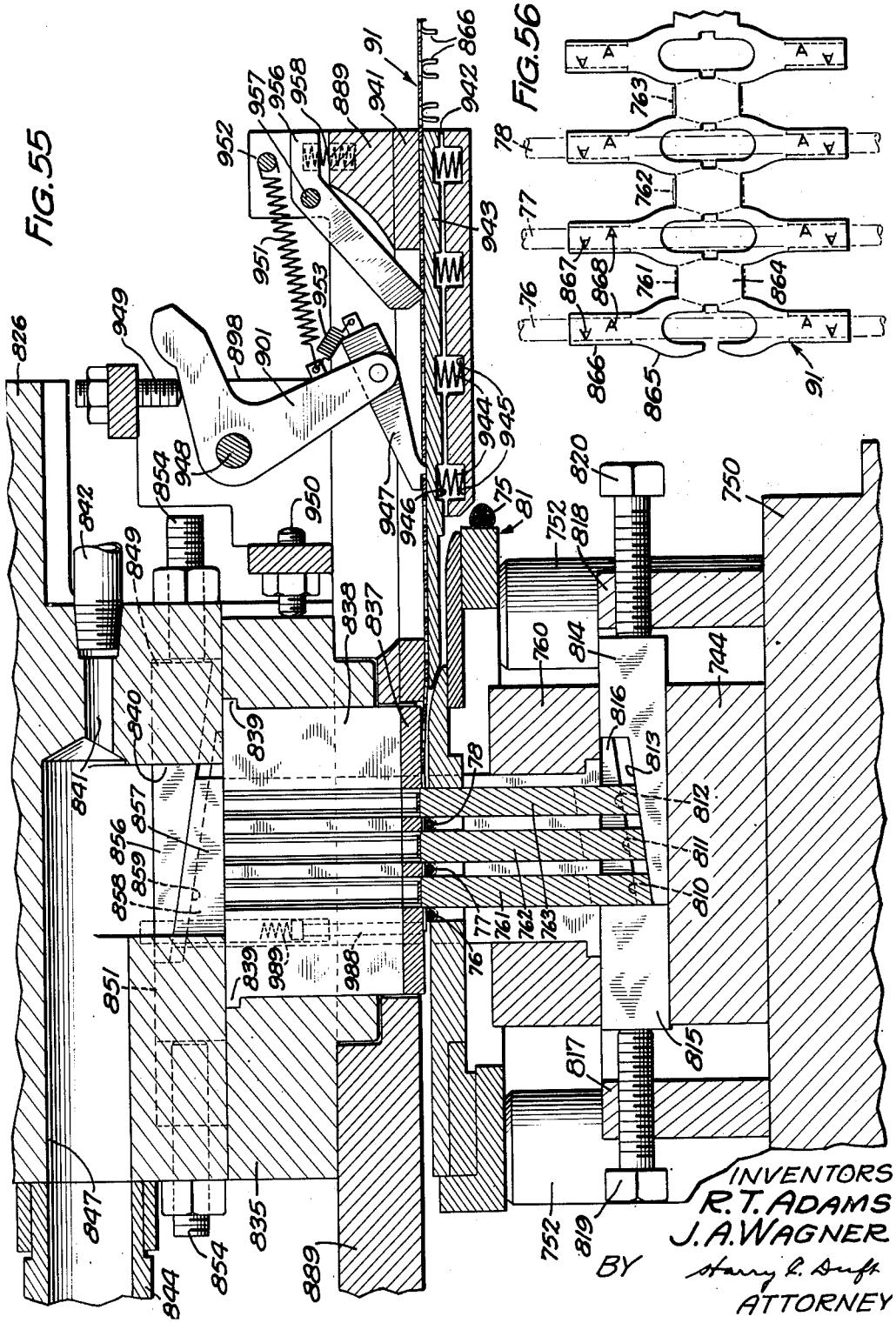
INVENTORS
R.T. ADAMS
J.A. WAGNER
BY Harry R. Duft
ATTORNEY

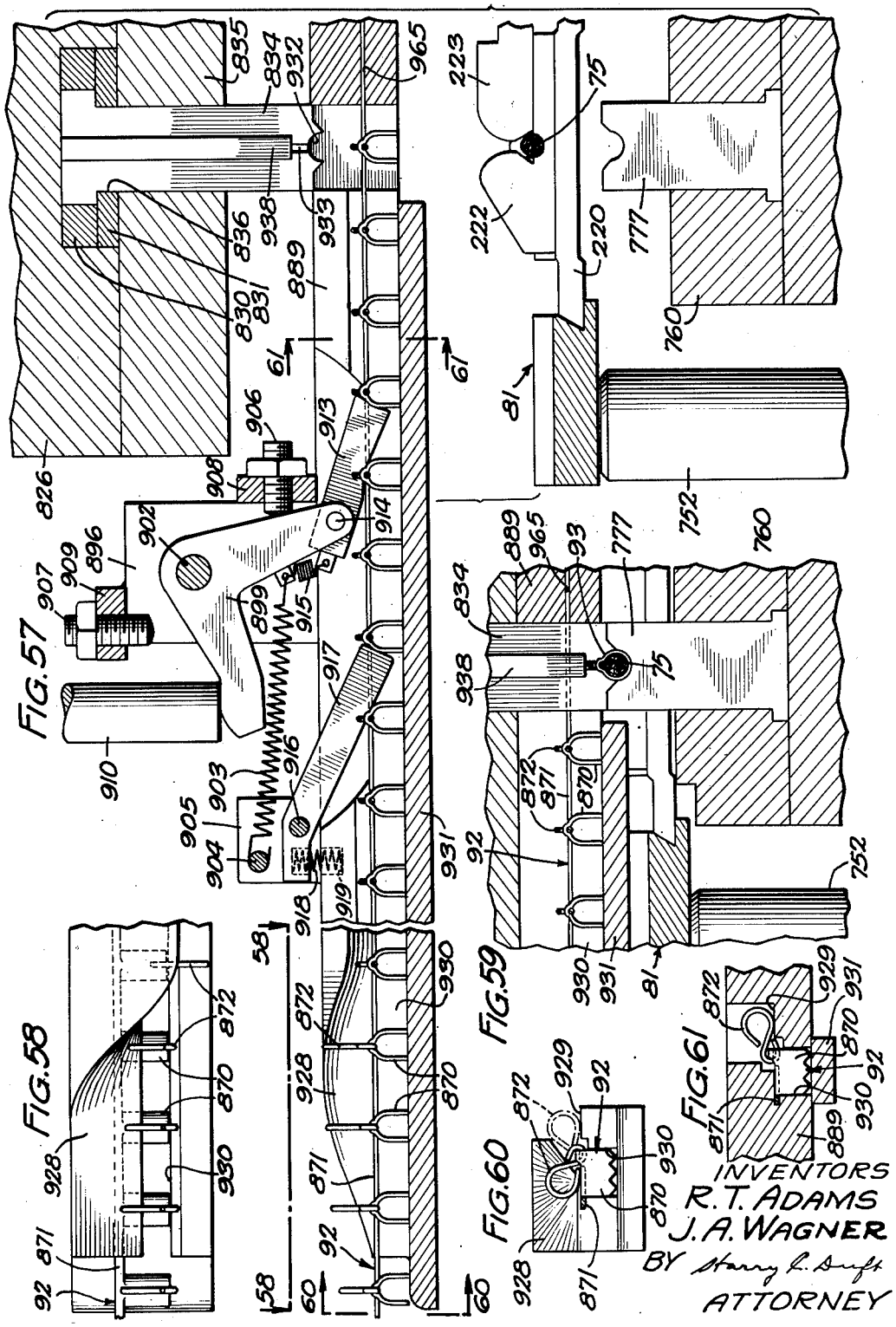

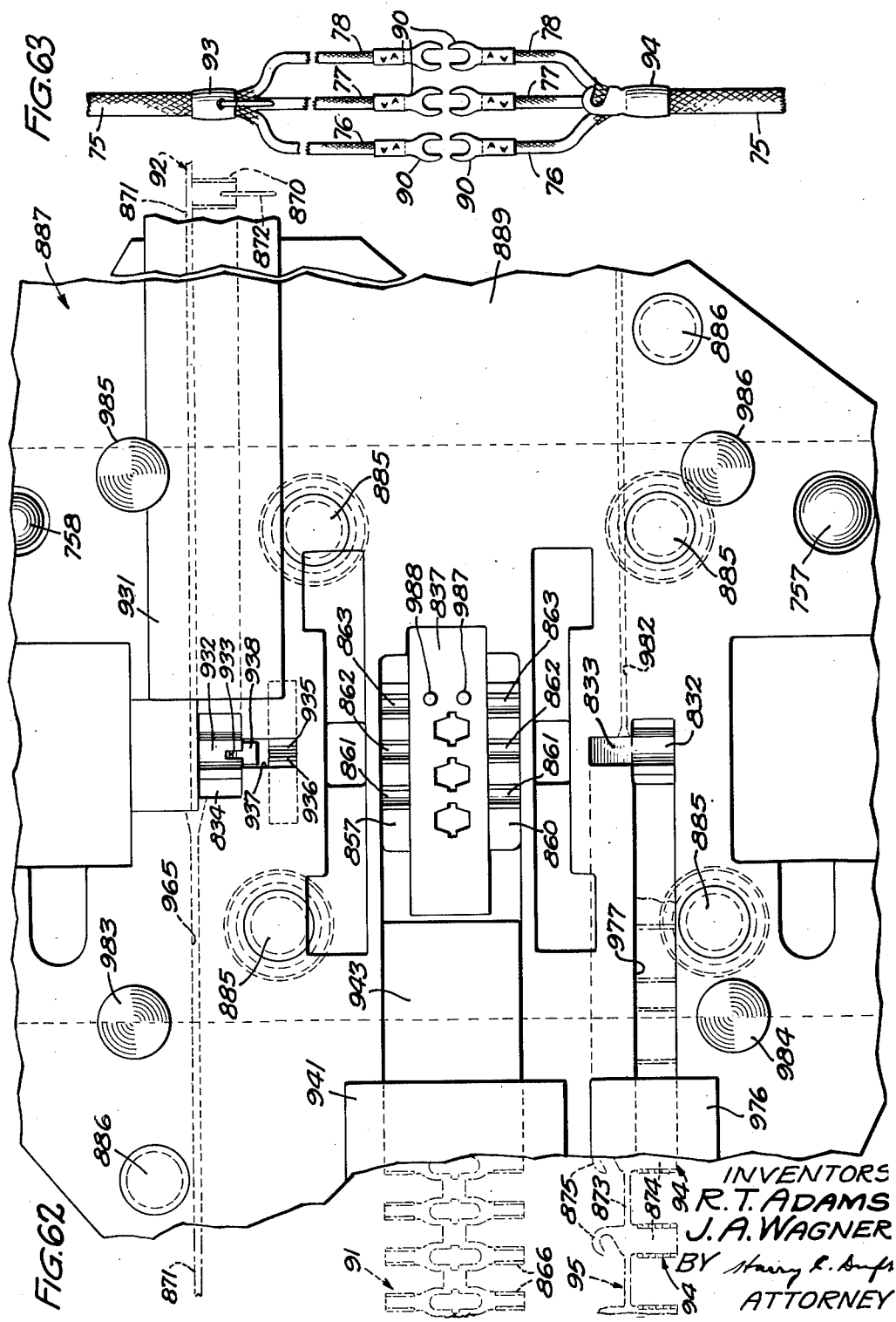

Oct. 14, 1952          R. T. ADAMS ET AL            2,613,427
                    ARTICLE FORMING APPARATUS
Original Filed Jan. 11, 1945                    26 Sheets-Sheet 26

FIG. 64

INVENTORS
R. T. ADAMS
J. A. WAGNER
BY
ATTORNEY

Patented Oct. 14, 1952

2,613,427

UNITED STATES PATENT OFFICE 2,613,427

ARTICLE FORMING APPARATUS

Robert T. Adams, Chatham, N. J., and Julius A. Wagner, Cleveland Heights, Ohio, assignors to Western Electric Company, Incorporated, New York, N. Y., a corporation of New York Continuation of application Serial No. 572,414, January 11, 1945. This application February 24, 1947, Serial No. 730,512

16 Claims. (Cl. 29—33.5)

This invention relates to article forming apparatus and more particularly to apparatus for forming multi-conductor double-ended cords from braided cordage.

This application is a continuation of our copending application Serial No. 572,414, filed January 11, 1945, for "Article Forming Apparatus," and now abandoned.

In the telephone and like industries, large numbers of multi-conductor cords are used for interconnecting cooperating pieces of electrical apparatus. In the manufacture of these cords, it has been found desirable to braid a continuous covering over a plurality of individually insulated conductors and at measured intervals along the resulting cordage to form loops in the conductors which extend through the covering of braid. This operation is performed in the braiding of the cordage and when the cordage is formed in this manner, it is not necessary to strip off the braid covering in forming short double-ended cords since, by severing the braid covering, the lengths of individually insulated conductors which have been thrown out or pulled through the braid may have terminal members attached to them and may be trimmed to the desired lengths.

It is an object of the present invention to provide novel and efficient apparatus for rapidly forming double-ended cords from continuous lengths of cordage.

In accordance with one embodiment of the invention, cordage which has had the conductors looped or thrown out at intervals through its braided covering is fed from a suitable supply thereof to a severing and terminal attaching mechanism, which includes a pedestal having a plurality of operating stations spaced about its periphery and on which a series of cordage positioning plates are carried in a circular path to present the plates sequentially to a mechanism for cutting the braided covering at the point where the loops of individually insulated conductors are thrown out from it, to arrange the individually insulated conductors in position to receive terminals, to arrange the severed ends of the cordage in position to receive restraining bands for preventing unravelling of the braided covering, and for severing the individual conductors adjacent to the point at which they have the terminals attached to them.

A complete understanding of the invention may be had by reference to the following detailed description, when considered in conjunction with the accompanying drawings, wherein:

Fig. 1 is a plan view, partly broken away, of an apparatus embodying the invention;

Fig. 2 is a view in perspective of a length of cordage supplied to the machine and showing the individually insulated conductors thrown out of the cordage at spaced intervals;

Fig. 3 is a plan section taken through the apparatus at a point just below the cordage positioning plates and showing some of the cams for actuating portions of the cordage positioning plates and also showing some of the drive mechanism for the apparatus;

Fig. 4 is a vertical sectional view taken substantially along the line 4—4 of Fig. 1 in the direction of the arrows and showing portions of the drive mechanism for the apparatus and portions of the mechanism which supports the cordage positioning plates for movement with respect to their driving mechanisms;

Fig. 5 is a fragmenetary vertical sectional view taken substantially on the line 5—5 of Fig. 4 in the direction of the arrows showing some details of the plate supporting mechanism in elevation;

Fig. 6 is a fragmentary horizontal sectional view taken substantially along the line 6—6 of Fig. 4 in the direction of the arrows and showing details of a mechanism for permitting the plates to lag behind their driving mechanism during periods when some operations are being performed on the cordage positioned by the plates;

Fig. 7 is a plan view in detail of one of the cordage positioning plates, of which there are six provided in the apparatus, and showing the parts of the plate in position to receive that portion of the cordage which is to be operated upon in the apparatus;

Fig. 8 is a longitudinal sectional view of the plate shown in Fig. 7, taken substantially along the line 8—8 of Fig. 7 in the direction of the arrows, part of the structure being broken away to conserve space;

Fig. 9 is a view looking up at the underside of the plate shown in Fig. 7 to more clearly illustrate those parts carried by the plate on its underside;

Fig. 10 is a longitudinal sectional view taken substantially along the line 10—10 of Fig. 7 in the direction of the arrows showing details of construction of the plate;

Figure 22:
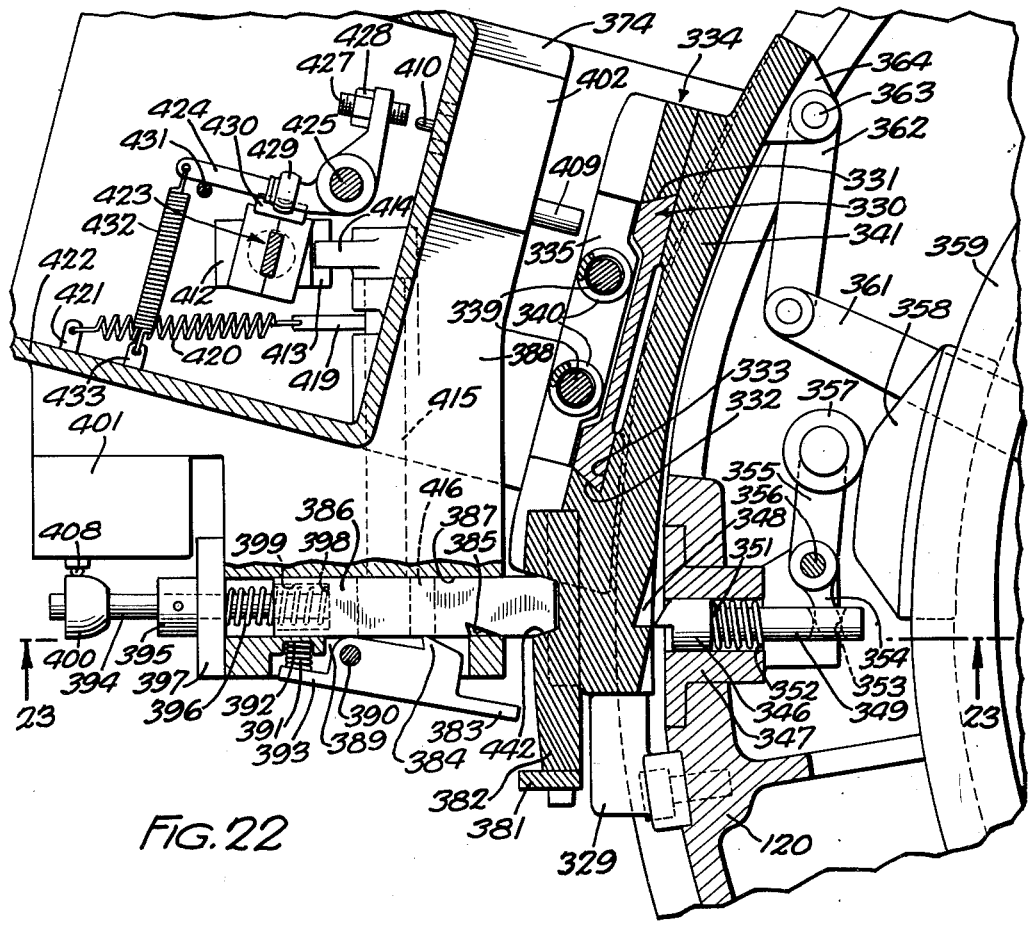
Figure 23:
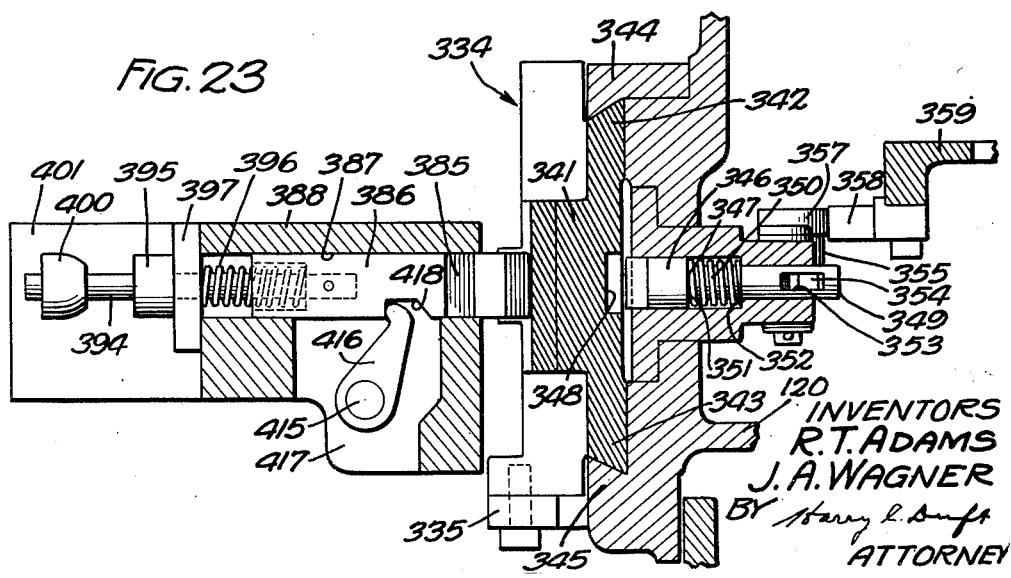
Figure 30:
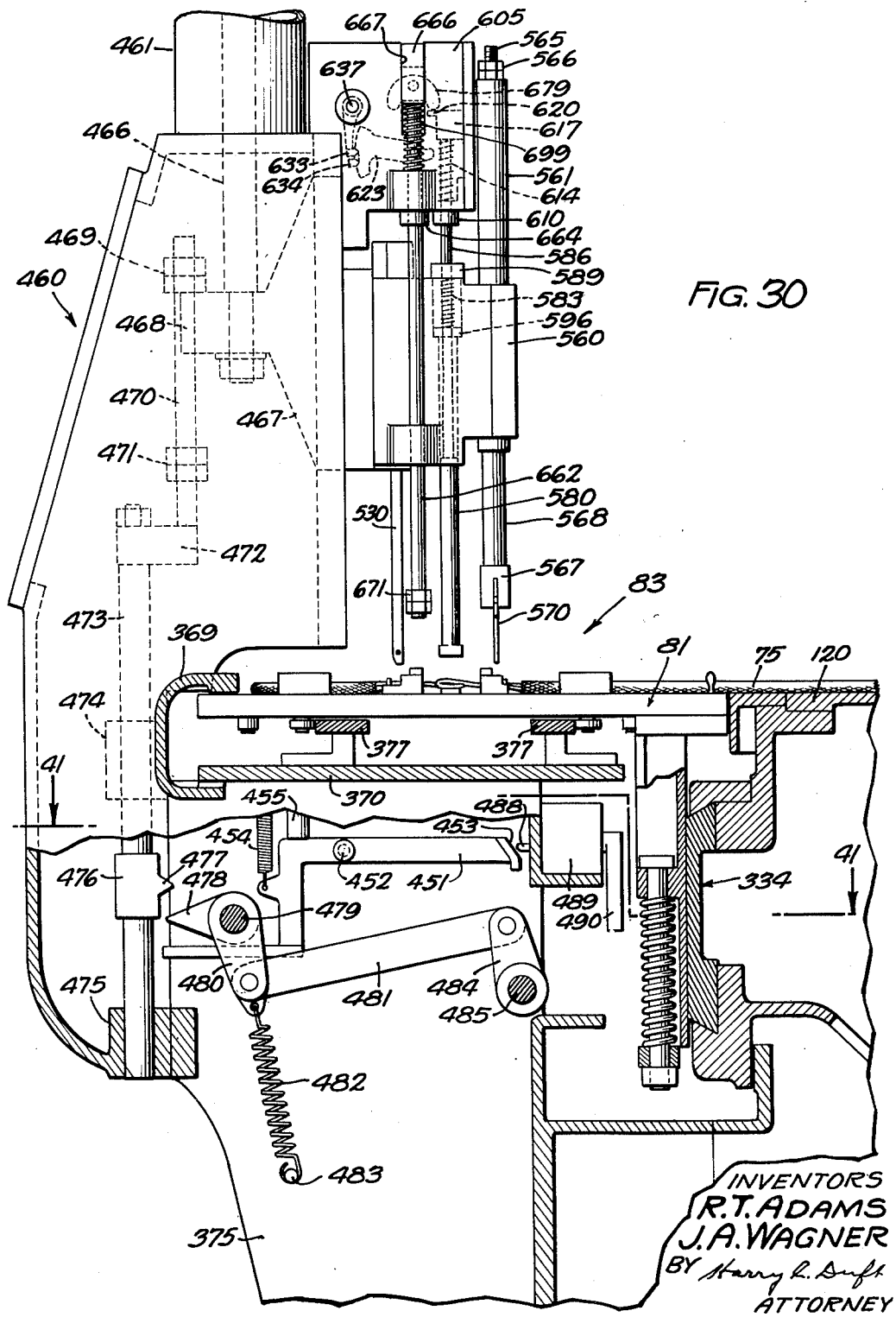

Figs. 11, 12, 13 and 14 are transverse sectional views taken substantially along the lines 11—11, 12—12, 13—13, and 14—14, respectively, on Fig. 7 and showing the details of construction of the cordage positioning mechanisms on the cordage positioning plate;

Fig. 15 is an exploded view in perspective of the mechanism carried by the plate for engaging the cordage at one side of the place where the leads are thrown out from it;

Fig. 16 is a vertical sectional view taken substantially along the line 16—16 of Fig. 1 in the direction of the arrows and showing the mechanism for feeding cordage to the apparatus, in elevation;

Fig. 17 is a horizontal sectional view taken substantially along the line 17—17 of Fig. 16 in the direction of the arrows showing the details of construction of the means for feeding a length of cordage equal to the distance between the points where the individual conductors extend through the braided covering of the cordage, parts being broken away to show some parts positioned beneath them;

Fig. 18 is a fragmentary vertical sectional view taken substantially along the line 18—18 of Fig. 17 in the direction of the arrows showing details of a mechanism for engaging the looped conductors which extend out through the braided covering for feeding the cordage into the apparatus;

Fig. 19 is a fragmentary vertical sectional view taken substantially along the line 19—19, as shown on either Fig. 16 or Fig. 18, and illustrating more details of the mechanism for feeding the cordage from the supply thereof;

Fig. 20 is a vertical sectional view taken substantially along the line 20—20 of Fig. 1 in the direction of the arrows showing some details of the mechanism for severing the braided covering on the cordage at the point where the loops extend through the braid;

Fig. 21 is a fragmentary vertical sectional view taken substantially along the line 21—21 of Fig. 20 in the direction of the arrows showing some details of the knife which cuts the covering on the cordage and its supporting and actuating mechanisms;

Fig. 22 is a fragmentary horizontal sectional view taken substantially along the line 22—22 of Fig. 20 in the direction of the arrows and showing some details of the controls for the mechanism for cutting the braid and also showing details of construction of the mechanism which permits the cordage positioning plate to lag behind its driving mechanism during the operation of the cutting mechanism on the braid;

Fig. 23 is a fragmentary vertical sectional view taken substantially along the line 23—23 of Fig. 22 in the direction of the arrows and showing some details of a device for normally latching the plate supporting structure to its driving mechanism and of mechanism for temporarily holding the plate in position for the braid cutting mechanism to operate on the cordage;

Fig. 24 is a fragmentary plan view on an enlarged scale looking down at the top of the cordage positioning plate with a length of cordage mounted in it prior to the operation of the braid-cutting mechanism on the cordage, one of the conductors being cut away;

Figs. 25, 26 and 27 are fragmentary vertical sectional views taken along the lines 25—25, 26—26 and 27—27 of Fig. 24 in the direction of the arrows showing the arrangement of the various parts of the cordage positioning plate with respect to the cordage prior to the cutting of the braid;

Fig. 28 is a plan view similar to Fig. 24, but showing the cordage engaging portions supported by the cordage-positioning plate after they have been moved apart to separate the severed ends of the braided covering and prior to the point where the individual conductors are tucked down through the plate and properly aligned to receive their terminals;

Fig. 29 is a view similar to Figs. 24 and 28 except that it shows the individual conductors properly aligned to receive terminal members on them and also shows the severed ends of the braided covering in position to be enclosed in clamping members which serve to prevent undue unravelling of the braid and also serve as means for attaching the cords to their associated apparatus;

Fig. 30 is a fragmentary vertical sectional view taken substantially along the line 30—30 of Fig. 1 in the direction of the arrows and showing a portion of a mechanism for tucking the individually insulated conductors down through the cordage-positioning plate to properly align them to receive terminal members and also showing means for determining whether the individual conductors are properly positioned on the positioning plate;

Fig. 31 is a fragmentary vertical sectional view taken substantially along the line 31—31 of Fig. 1 in the direction of the arrows and showing, in section, portions of the mechanisms shown in elevation in Fig. 30;

Fig. 32 is a fragmentary horizontal sectional view taken substantially along the line 32—32 of Fig. 31 in the direction of the arrows and showing portions of the mechanism for tucking the individual conductors into position on the positioning plate and for determining whether the conductors are properly positioned;

Figs. 33, 34 and 35 are fragmentary vertical sectional views taken substantially along the lines 33—33, 34—34 and 35—35 of Fig. 31 in the direction of the arrows and showing details of construction of the mechanisms shown in Figs. 30 and 31;

Figs. 36, 37 and 38 are fragmentary detail sectional views taken substantially along the line 36—36 of Fig. 35 in the direction of the arrows, parts being broken away to conserve space, and illustrating the three conditions which may occur in the positioning of the conductors on the plate, Fig. 36 illustrating the condition which exists when the conductors are properly positioned on the positioning plate, Fig. 37 illustrating a condition which may possibly occur due to the failure of some parts of the positioning plate to operate correctly wherein two conductors are superposed one upon the other and Fig. 38 illustrating a condition which may arise wherein no conductor is in position where a conductor should be on the positioning plate;

Fig. 39 is a fragmentary vertical sectional view taken substantially along the line 39—39 of Fig. 31 in the direction of the arrows showing some details of the mechanism for determining whether the conductors are properly positioned on the positioning plate and some of the control mechanisms which may be actuated by the means for determining whether the conductors are properly positioned;

Fig. 40 is a fragmentary horizontal sectional view taken substantially along the line 40—40 of Fig. 39 in the direction of the arrows;

Fig. 41 is a horizontal sectional view taken substantially along the line 41—41 of Fig. 30 in the direction of the arrows and showing some details of the mechanism for holding the cordage positioning plate at the position where the conductors are tucked through it and also some details of the mechanism for releasing the plate from its driving mechanism;

Fig. 42 is a fragmentary detail sectional view taken substantially along the line 42—42 of Fig. 41 in the direction of the arrows showing some details of a mechanism provided for releasing the cordage positioning plate to permit it to move back into latched engagement with its driving mechanism;

Fig. 43 is a view partly in section and partly in side elevation, taken substantially along the line 43—43 of Fig. 1 in the direction of the arrows and showing portions of a punch press mechanism which operates in timed relation to the operation of the cordage positioning plates for attaching terminals to the individually insulated conductors of a cord and for applying bands to prevent unravelling of the braided covering on the braid covered cord, the bands for preventing the braid from unravelling comprising "S-hooks" and "stay bands";

Fig. 44 is a fragmentary plan view on an enlarged scale, taken looking in the direction of the arrows along the line 44—44 of Fig. 43 and showing a cordage positioning plate in position to cooperate with the punch press;

Fig. 45 is a fragmentary plan view looking in the same direction as Fig. 44, but showing the die which is directly beneath the cordage-positioning plate in the punch press;

Fig. 46 is an enlarged fragmentary vertical sectional view taken substantially along the line 46—46 of Fig. 43 in the direction of the arrows showing the upper and lower dies of the punch press in elevation, showing the cordage positioning plate in dot and dash lines between the dies, and showing parts of a means for positioning portions of the S-hooks to be applied to the braided covering. In this figure, the dies are shown in their open position preparatory to performing their operations of attaching stay bands, S-hooks and terminals to the braided covering of the cordage and to the individual conductors forming the core of the cordage;

Fig. 47 is a fragmentary vertical sectional view taken substantially along the line 47—47 of Fig. 44 in the direction of the arrows showing the punch press dies in their closed position with the cordage-positioning plate between them;

Fig. 48 is a fragmentary vertical sectional view taken substantially along the line 48—48 of Fig. 45 in the direction of the arrows showing some details of the forming dies which attach the terminals to the individually insulated conductors and to which the terminals are fed in strip form;

Fig. 49 is an enlarged fragmentary vertical sectional view taken substantially along the line 47—47 of Fig. 44 in the direction of the arrows and is similar to Fig. 47 except that it shows the dies of the punch press in their open position;

Figs. 50 and 51 are fragmentary vertical sectional views taken substantially along the line 50—50 of Fig. 49 in the direction of the arrows and showing the dies in their open and closed positions, respectively;

Figs. 52 and 53 are fragmentary vertical sectional views taken substantially along the line 52—52 of Fig. 49 in the direction of the arrows and showing the terminal attaching dies in their open and closed positions, respectively;

Fig. 54 is a fragmentary detail sectional view taken substantially along the line 54—54 of Fig. 49 in the direction of the arrows and showing a means for retaining a portion of the S-hook in proper alignment during the attachment thereof to the braided covering of a cord after the S-hook has been sheared from its strip;

Fig. 55 is a fragmentary sectional view taken substantially along the line 55—55 of Fig. 47 in the direction of the arrows showing some details of construction of the upper die mechanism of the punch press and also showing some details of the feed mechanism for feeding the terminals in strip form to the punch and die mechanism;

Fig. 56 is a detail view of the interconnected strip of terminals fed to the conductors to which they are to be attached showing the conductors in dot and dash lines prior to the attachment of the terminals to them and the cutting of the conductors;

Fig. 57 is a fragmentary vertical sectional view taken substantially along the line 57—57 of Fig. 49 showing some details of the mechanism for feeding the S-hooks to the punch press in strip form;

Fig. 58 is a fragmentary plan view taken substantially along the line 58—58 of Fig. 57 in the direction of the arrows;

Fig. 59 is a fragmentary view of a portion of the mechanism shown in Fig. 57 and taken at the same place that Fig. 57 was taken, but showing the dies in their closed position;

Figs. 60 and 61 are fragmentary detail sectional views taken along the lines 60—60 and 61—61 of Fig. 57 and showing the means for guiding portions of the S-hooks into position to be attached to the cords;

Fig. 62 is a view of the underside of he upper die of the punch press taken substantially along the line 62—62 of Fig. 46 in the direction of the arrows;

Fig. 63 is a detail view of the adjoining ends of two cords to which stay bands, S-hooks and terminals have been attached in the apparatus; and Fig. 64 is a circuit diagram of the electrical and fluid circuits which control the operation of the apparatus.

The apparatus of the preferred embodiment of the invention is designed to process cordage 75 (Fig. 2), which comprises three separately insulated conductors 76, 77 and 78 having a covering of braid 79 thereon, as shown most clearly in Fig. 28, enclosing the three individually insulated conductors throughout most of its length, but having the three insulated conductors 76, 77 and 78 drawn out through the braid 79 at predetermined intervals, which intervals determine the length of the cords to be formed. The amount that the individual conductors 76, 77 and 78 are drawn through the braid, in the process of applying the braid on the conductors, will determine the length of the conductor extending out at the ends of the braided cords after the braid has been severed at the point where the conductors extend from it and after the conductors have each been cut.

The braided cordage is fed to the mechanism for cutting the braided covering at the point where the conductors extend from it by a feeding mechanism, designated generally by the numeral 80 (Fig. 1). This feeding mechanism operates in timed relation to the remainder of the apparatus, and the cordage, as it is fed to the rest of the processing mechanism, may be positioned on one of a plurality of cordage positioning plates 81, there being six cordage positioning plates provided in the apparatus. These plates are suitably supported, as will be described hereinafter, to travel in a circular path, which will carry them to a braid severing station 82, a tucking and inspection station 83, a punch press station 84, and an unloading station 85.

At the feeding mechanism 80, the cordage will be fed onto a suitable platform 86, from which an operator may remove a section of cordage and place it on a cordage positioning plate 81, moving past the feeding mechanism, with the cordage so positioned that the loops of individually insulated conductors 76, 77 and 78 extending out from it will be located in a predetermined position on the plate, as will be described more in detail hereinafter. The plate, in the operation of the apparatus, will be carried around to the braid severing station, where the braid 79 will be cut at the point at which the conductors 76, 77 and 78 extend through it. In travelling in its circular path, the plate will next arrive at the tucking and inspection station and, in travelling to this station, the severed ends of the braid 79 will be moved apart slightly so that when the cordage positioning plate 81 arrives at the tucking and inspection station, a mechanism may be brought into operation to tuck the surplus portions of the individual conductors down through the plate 81 and locate the individual conductors in proper position to receive terminal members 90—90 to each of the conductors 76, 77 and 78 in the manner shown in Fig. 63, and also to inspect the cordage to determine whether the individual conductors are properly positioned on the positioning plate.

Each of the individual conductors 76, 77 and 78 has two terminal members 90 attached to it in the punch press station 84, and, thereafter, in the same operation, each of the conductors 76, 77 and 78 has a section cut from it in the position between the formed terminal members 90. The terminal members 90 are fed to the punch press mechanism in strip form, as shown in Fig. 62, at 91, and all of the terminal members in the strip are interconnected. In the punch press mechanism, however, the mechanism provided, in addition to attaching the terminals to the conductors 76, 77 and 78, also cuts the terminals apart so that when the cordage positioning plates 81 move out of the punch press, the terminals will be separated one from another and will be attached to their conductors. At the punch press station 84, S-hooks 93 partially formed and interconnected in a strip 92, as shown most clearly in Figs. 46 and 62, are cut from their strip and attached to the cordage to form a supporting means, as shown in Fig. 63. Similarly, stay bands 94 interconnected in a strip 95 (Fig. 62) and partially formed are fed into the punch press, cut from their strip and attached to the cordage 75. The S-hooks 93 and stay bands 94 serve to support the cords in position in electrical apparatus without applying tension to the individual conductors and, in addition, serve to prevent unravelling of the braid 79 from the cords. After the operations on the cordage 75 have been performed at the punch press station, the plates 81 will move up out of the punch press station to the unloading station 85, where the completed cords may be stripped from the plates.

The feeding mechanism

The main driving mechanism for the apparatus comprises, as shown most clearly in Figs. 1, 3 and 4, a motor 96 (Figs. 1 and 4) mounted upon the upper end of a housing assembly 97. The housing assembly 97 comprises a main supporting base 98 (Fig. 4) for supporting a main base casting 99. Suitably supported on the main base casting 99 is a tubular bearing member 100, which extends up through the center of the apparatus and has an annular support ring 101 positioned at its upper surface for carrying an annular motor supporting casing 102. The motor 96 is carried by the casing 102 in position to direct its drive shaft 103 vertically downwardly. The drive shaft 103 is coupled to a main shaft 104 by a suitable coupling member 105, which is, in turn, suitably journalled within the tubular bearing member 100.

Fixed to the lower end of the main shaft 104 is a beveled pinion 106, which, as shown in dotted lines in Fig. 3, meshes with a beveled pinion 107 (Fig. 43) attached to a stud shaft 108 which is, in turn, suitably supported on the main base casting 99. The shaft 108 carries at its outer end a pinion 109 meshing with a pinion 110 on a worm shaft 111, which is also suitably supported on the main base casting 99. The worm shaft 111 carries a worm 112 in mesh with worm gear 113 (Figs. 3 and 4). The worm gear 113 is disposed in a horizontal plane and is fixed to a short shaft 114. The shaft 114 is journalled in suitable bearings 115 and 116 mounted upon a cylindrical casing member 117, which is supported by the main base casting 99. At its upper end, the shaft 114 carries a pinion 118 in mesh with a ring gear 119 fixed to the underside of a dial supporting casting 120. The dial supporting casting encircles the tubular bearing member 100 and is rotatable about lower and upper bearing sleeves 121 and 122, being carried between a wall of bearing member 100 and a suitable thrust bearing assembly 123, which is positioned between a shoulder 124 on the bearing member 100 and a cooperating shoulder 125 formed on the casting 120. The casting 120 is of irregular configuration and serves to support the cordage positioning plates in their rotation around the apparatus.

As shown most clearly in Figs. 3 and 16, the ring gear 119, in addition to meshing with the pinion 118, also meshes with a pinion 135 mounted upon the end of a stud shaft 136 suitably journalled in journal members 137 and 138, which are mounted upon a bracket 139 attached to the outer surface of the casing member 117. The shaft 136 has a beveled pinion 140 fixed to it in position to mesh with a pinion 141 fixed to a shaft 142. The shaft 142 is suitably journalled in a tubular portion 143 of the bracket 139 and carries at its left end (Fig. 16) a bevelled pinion 144. The bevelled pinion 144 meshes with a pinion 145 on a shaft 146, which has a sprocket 147 also fixed to it. The shaft 146 is suitably journalled in a chain guard 148 attached to the end of the tubular portion 143 of the bracket 139 and supported on a standard 149. At its upper end, the chain guard 148 supports one end of a feed chain housing 150, the other end of which is supported upon a standard 151.

Mounted in the feed chain housing 150 are two pairs of bearings 152 and 153 and 154 and 155 (Fig. 17), the bearings 152 and 153 supporting a shaft 156 and the bearings 154 and 155 supporting a shaft 157. The shaft 156 extends out through the bearing 153 and has fixed to it a sprocket 158, which is interconnected with the sprocket 147 by a chain 159. Through this driving connection, the sprocket 147 is driven at a uniform speed from the main drive mechanism of the apparatus and drives the shaft 156. The shaft 156 has attached to it a pair of sprockets 160 and 161, which serve to drive chains 162 and 163 engaging the sprockets and supported at their left end (Fig. 17) by sprockets 164 and 165 mounted upon the shaft 157. The sprockets 164 and 165 are idlers and simply serve to support the left end (Fig. 17) of the chains 162 and 163, which are provided with pins 166—166 common to the two chains 163—163 and extending across the driving sprockets 160 and 161 and the idler sprockets 164 and 165.

At spaced intervals throughout the length of the chains 162 and 163, the pins 166 have feed members designated generally by the numeral 174 pivotally mounted upon them. Each of the feed members 174 comprises, as shown most clearly in Figs. 18 and 19, a lever 175 having an upwardly extending pivot portion 176 pivoted about one of the pins 166 and having bifurcated portion 177 adapted to extend up between two adjoining pins 166 for engaging conductors 76, 77 and 78 extending out through the braid 79. The feed members 174 are mounted on the chains 162 and 163 at such a spacing that the distance between two feed members is slightly greater than the shortest spacing between two conductor loops along the cordage. The chain drive is so timed that each portion of the cordage at which the loops emerge from the braid is deposited on the machine opposite a plate, following which the chain runs freely, without feeding additional cordage until the next feed member 174 engages the next set of conductor loops after a short free travel of the chain. In this manner, the feeding of cordage is kept in synchronism with the timing of the machine, so that one set of loops is deposited on each positioning plate, regardless of uncontrollable variations in the spacing of the conductor loops along the cordage.

The left end of the lever 175 has a pair of cam rollers 178 and 179 mounted upon it, a stud shaft 180 extending through the lever 175 for supporting the cam rollers for free rotation with respect to the lever 175. In the housing 150, there is provided a cam plate 181, which extends across the housing and is fixed to the side walls thereof in position to support the cam rollers 178 and 179 in an elevated position, where they will hold the lever 175 with the bifurcated portion 177 thereof extending upwardly between two adjoining pins 166. This plate 181 abuts and cooperates with a pair of cam members 182 and 183, which surround the shafts 156 and 157 and are attached to the side plates of the housing 150 by extensions 184 and 185 extending from opposite sides of the cam members 182 and 183, respectively, to engage the side plates of the housing 150. The cam member 183 is so formed that a feed member 174 carried by the chains 162 and 163 and held with its bifurcated portion 177 extending through between adjoining pins 166 on the lower course of the chains will be held in position to extend beyond the pins 166 as the feed member travels around the cam member 183 to the upper course of the chains. In this manner, the bifurcated portion 177 will engage conductors 76, 77 and 78 extending out through the braid 79 and will advance the cordage 75. The cam plate 181 is so positioned that it will hold the bifurcated portion 177 of the feed member 174 above the tops of the pins 166 on the upper course of the chains 162 and 163 and thus the cordage 75 will be fed across the top of the feeding mechanism 80.

At the right end of the feed chain housing 150 (Fig. 16), it is necessary to withdraw the bifurcated portion 177 of the feed member 174 from engagement with the cordage and, accordingly, the cam member 182 has an auxiliary cam member 186 suitably attached to it for engaging the cam rollers 178 and 179 to rock the feed member 174 relative to the pin 166, on which it is pivoted. The cam member 182 is shaped to cooperate with the auxiliary cam member 186 and the rollers 178 and 179 will travel in the cam groove 187 defined by the cam member 182 and auxiliary cam member 186. The auxiliary cam member 186 terminates directly below the center of the shaft 156 and the cam member 182 slopes downwardly from the point of termination of the auxiliary cam member 186 in such manner that it will direct the free end of the feed member 174 having the bifurcated portion 177 thereon to a position where the bifurcated portion will extend through the chain pins 166.

At its left end (Figs. 16 and 17), the chain housing 150 is provided with a guide member 188 having a guide channel 189 extending through it, through which cordage 75 fed from any suitable supply may be directed to a passageway (Fig. 17) defined by the inner plates 190 and 191 and the pins 166 extending between the chains 162 and 163. The inner plates 190 and 191 are mounted upon and extend downwardly from top plates 192 and 193 (Fig. 19) comprising parts of the housing 150. The front portion of the housing 150, as viewed in Fig. 16, is formed, as shown at 194, to facilitate the stringing of cordage 75 in the feeding mechanism 80 and the plates 190 and 191 are extended downwardly at this portion of the apparatus to prevent the entanglement of the cordage 75 in the driving elements of the feed mechanism. Similarly, the inner plates 190 and 191 extend downwardly at the right end (Figs. 16, 17 and 19) of the feeding mechanism to prevent the cordage from becoming entangled in the driving elements of the feeding mechanism.

Adjacent to the right end of the housing 150 (Fig. 16) and positioned to receive cordage fed by the feed members 174 is the platform or tray 86, which is provided with a base 195 and an upstanding rim 196. The rim 196 extends partially around the base 195, being open at the end thereof adjacent to the position where an operator may remove cordage which has been fed onto the platform or tray 86. The platform or tray 86 is suitably mounted upon the chain guard 148 and, as the cordage 75 is fed to it, cordage will coil in rough coils on the platform 86 in a manner such that it may be conveniently removed therefrom and placed on a cordage positioning plate 81 in the proper position of alignment. The excess coils may be disposed of as will be described more in detail hereinafter. It should be noted at this time that, as described hereinbefore, the feed members 174 are spaced apart a distance such that one length of cordage between two points where the conductors extend through the braided covering thereon will be deposited on the platform or tray 86 each time a cordage positioning plate 81 is in position adjacent to the tray or platform 86 to receive the cordage and that an operator stationed at this portion of the apparatus inserts the cordage on the plate 81.

The above-described feeding mechanism is disclosed and claimed specifically in our copending application Serial No. 730,513, filed February 24, 1947, as a division of the aforementioned application Serial No. 572,414.

*Cordage positioning plates*

The cordage positioning plates 81, six in number, are all of exactly the same construction and serve to support the cordage 75 in position to have the braid 79 thereon cut at the point where the conductors extend through the braid. Each plate 81 also serves to properly position the cordage and individual conductors at the tucking and inspection station 83 and at the punch press station 84.

In order to present the cordage to the various operating stations of the apparatus, the plates move in a circular path about the axis of the main shaft 104. The means for supporting the plates and for driving them will be described hereinafter.

Since, as pointed out hereinbefore, each of the cordage positioning plates 81 is of the same construction, only one cordage positioning plate will be described in detail, as illustrated in Figs. 7 to 15, inclusive. The cordage positioning plate 81 comprises a framework made up of side members 210 and 211 (Fig. 7), inner end member 212, and outer end member 213, the side members and end members being of irregular configuration and being attached one to another in any suitable manner. The side member 210 has a pair of dove tail slots 214 and 215 formed in it adjacent its outer and inner ends, which cooperate with corresponding dove tail slots 216 and 217, formed on the side member 211 by cooperating surfaces on the side member 211 and retainer plates 218 and 219 suitably attached to the side member 211. Positioned to slide in the cooperating dove tail slots 214 and 216 is a slidable clamp supporting plate 220 and similarly positioned to slide in the cooperating dove tail slots 215 and 217 is a second slidable clamp supporting plate 221. The clamp supporting plate 220 carries a main fixed clamp member 222 and a main movable clamp member 223. Similarly, the clamp supporting plate 221 carries a main fixed clamp member 224 and a main movable clamp member 225. Clamp members 222 and 224 are fixed to their respective clamp supporting plates 220 and 221 and each has a slot 226 formed in its bottom surface, as indicated most clearly in Fig. 15, to cooperate with the clamp supporting plates 220 and 221 to form a dove tail slot for the reception of a dove tail bar 227 formed integrally with or suitably attached to the main movable clamping members 223 or 225. Thus, the main movable clamping members 223 and 225 are slidably mounted with respect to the main fixed clamping members 222 and 224, respectively, but will move with the slidable clamp supporting plates 220 and 221 when the clamp supporting plates move in their associated ways on the side members of the positioning plate 81.

Extending downwardly from the clamp supporting plates 220 and 221 are a pair of stud shafts 228 and 229, on which are freely rotatable a pair of cam rollers 230 and 231. These cam rollers 230 and 231 cooperate with a second pair of cam rollers 232 and 233 in shifting the clamp supporting plates 220 and 221 inwardly and outwardly on their dove tail slots 214 and 216 and 215 and 217. The cam rollers 232 and 233, as may be seen most clearly by reference to Fig. 9, are mounted for rotation on pins 234 and 235, which also pivotally interconnect links 236 and 237 and 238 and 239, respectively. The links 236 and 238 are pivoted upon pins 240 and 241 fixed to the underside of the clamp supporting plates 220 and 221, respectively, whereas the links 237 and 239 have pins 242 and 243 fixed thereon and extending through slots 244 and 245 formed in the plates 220 and 221, respectively. The upper end of each of the pins 242 and 243 is fixed in the adjacent dove tail bar 227, being set into an aperture 246 (Fig. 15) in the bar 227 whereby, when the links 236 and 237 and 238 and 239 are moved from the position shown in Fig. 9 to a position where they align, the main movable clamping members 223 and 225 will be moved toward their associated main fixed clamping members 222 and 224, respectively, thus to clamp cordage which has been placed between the clamping members tightly in position therebetween.

The main movable clamping members 223 and 225 have pins 255 and 256 (Fig. 7) fixed thereto which extend into slots 257 and 258, respectively, formed in an irregularly shaped connecting plate 259, which bears upon a surface of the side member 210 and which slides between cooperating shoulders 260 and 261 formed on the side member 210. In this manner, the connecting plate 259 will move transversely of the positioning plate 81 when the linkages comprising the links 236 and 237 and 238 and 239 are straightened out or when they are bent to the position shown in Fig. 9.

The connecting plate 259 has a pair of slots 262 and 263 (Fig. 7) cut in it for receiving pins 264 and 265, which are fixed in auxiliary movable clamping members 266 and 267, respectively. The movable clamping members 266 and 267 are slotted, as shown at 268 and 269 (Figs. 12, 11 and 15) to receive the edge of the connecting plate 259 between them, whereby the auxiliary movable clamping members 266 and 267 may be moved to the left and right, respectively, with respect to the connecting plate 259, but are linked to the plate for movement with it when the cam rollers 232 and 233 are moved longitudinally of the cordage positioning plate 81. The auxiliary movable clamping members cooperate with a pair of auxiliary fixed clamping members 270 and 271, which are slotted as shown at 272 and 273 to receive a tongue 274 on a locating plate 275 (Figs. 7 and 12). The auxiliary clamping jaws 270 and 271 are prevented from moving transversely of the positioning plate 81 with respect to the locating plate 275 by pins 276 and 277, which extend across the slots 272 and 273 and pass through slots 278 and 279 formed in the locating plate 275. The auxiliary clamping jaws 266 and 270 and 267 and 271 (Fig. 8) are maintained in alignment by tongues 280, 281, 282 and 283 formed on the auxiliary clamping members 266 and 270 and 267 and 271, respectively, riding in cooperating grooves 284, 285, 286 and 287 formed in the auxiliary clamping members 266, 270, 271 and 267, respectively. In this manner, the clamping members are tied together for simultaneous movement longitudinally of the cordage positioning plate 81, but may be moved relative to each other transversely of the positioning plate 81.

Fixed to the underside of the auxiliary clamping members 270 and 271 are a pair of cord locating combs 289 and 290, respectively, each of which has a pair of fingers 291 extending upwardly from it to aid in positioning cordage in alignment with the clamping members, as will be described more in detail hereinafter. These combs 289 and 290 (Fig. 9) extend into slots 292 and 293 formed in the undersides of the auxiliary clamping members 266 and 267, respectively, to hold the combs 289 and 290 against movement longitudinally away from their associated clamping members 266 and 267 of the cordage positioning plate 81. The comb 289 is provided with a pair of posts 294 and 295, as shown most clearly in Fig. 9, which extend toward the outer end of the positioning plate 81 and carry pins 296 and 297 which extend up into slots 298 and 299 (Fig. 15) formed in the plate 220. By means of this arrangement, the plate 220 may be moved in a predetermined distance toward the outer end of a cordage positioning plate 81 before the auxiliary clamping jaws 266 and 270 start to move toward the outer end of the cordage positioning plate 81. The purpose of this lost motion between the two sets of clamping jaws will become apparent as the description progresses. The comb 290 is constructed similarly to comb 289 and is provided with posts 300 and 301, similar to the posts 294 and 295, and the posts 300 and 301 carry pins 302 and 303 in slots 304 and 305 formed in the clamp supporting plate 221, thus permitting a movement of the main cordage clamping jaws with respect to the auxiliary clamping jaws at the inner portion of the cordage positioning plate 81.

The tongues 280 and 281 formed on the auxiliary clamping members 266 and 270 have serrations formed in them, as most clearly illustrated in Fig. 15. The serrations in the tongue 280 are semi-circular and are adapted to receive the individually insulated conductors 76, 77 and 78 in them. The notches forming the serrations designated 306, 307 and 308, serve to align the conductors with corresponding notches 309, 310 and 311 (Fig. 11) in a die bar 312, which is mounted upon the locating plate 275 and extends across the cordage positioning plate 81 to rest on the connecting plate 259. The function of this die bar 312 will become apparent in the description of the punch press mechanism and other portions of the apparatus to be described hereinafter. The three notches numbered 313, 314 and 315 (Fig. 15) slope gradually from a position adjacent to the top of the tongue 281 downwardly to terminate in a rounded surface and these notches serve to properly distribute the individually insulated conductors 76, 77 and 78 in a to-be-described portion of the apparatus.

In addition to the just described operating parts of the cordage positioning plate 81, a pair of clips 316 and 317 are provided at the side of each member 210 to retain the cordage along the side of the plate and, in addition to these clips, the cordage extends between a pair of pins 318 and 319, in the manner illustrated most clearly in Fig. 1. The side plate 218 has a pair of liner pin receiving apertures 320 and 321 adapted to receive liner pins in the punch press section of the apparatus.

The cordage positioning plates 81, comprising the hereinbefore described assemblage of cooperating parts, are each mounted upon a supporting bracket 330, as seen most clearly in Figs. 4, 5, 20 and 22, of which there is provided one for each plate 81. The bracket 330 is irregular in configuration and has its sides tapered, as shown at 331 and 332 (Fig. 22) to fit into a dove-tailed groove 333 on a carriage designated generally by the numeral 334. The carriage 334, as shown most clearly in Figs. 5 and 20, is provided with a cross plate 335, which extends across a major portion of the bottom of the carriage and is secured to forwardly extending portions 336 and 337 of the main body of the carriage. The supporting bracket 330 is provided with a rib 338, which extends out over the cross plate 335 to receive a pair of bolts 339—339, which extend through the rib 338 and cross plate 335 to guide a pair of compression springs 340—340, which are interposed between the rib 338 and cross plate 335 for normally holding the plate 81 in its upper position, as shown in Figs. 4 and 20. The bolts 339 limit the upward movement of the bracket 330 and thus serve to position the cordage positioning plates 81 at the level shown in Fig. 20. However, when the cordage positioning plates 81 arrive at the punch press station, they may be moved downwardly, compressing the springs 340 for a purpose to be explained hereinafter.

The carriage 334 (Figs. 20 and 22) comprises an arcuately shaped portion 341 having dovetailed upper and lower portions 342 and 343, which slidably engage a cap member 344 and a shoulder 345, which cooperate to form a dovetailed slot for slidably supporting the carriage 334 for movement to a limited extent around the dial supporting casting 120, with which the shoulder 345 is integrally formed. Each of the carriages 334 is normally latched to the dial supporting casting 120 by means of a spring pressed latch 346 (Fig. 22), which is seated in a bearing 347 suitably mounted on the dial supporting casting 120 in position to align the latch 346 with a latching notch 348 cut into the rear surface of the arcuately shaped portion 341 of the carriage 334. When the carriage 334 is latched by the latch 346, its leading end will abut a stop member 329 (Figs. 5 and 22) fixed on the casting 120. The latch 346 is provided with a shank 349, which extends through the bearing 347 and is surrounded by a compression spring 350, which bears against a shoulder 351 on the latch 346 and against a shoulder 352 formed inside the bearing 347 normally to urge the latch to the left, as viewed in Figs. 22 and 23. The inwardly extending end of the latch has a slot 353 formed in it to receive a reduced rounded end 354 of a bell crank lever 355. The bell crank lever 355 is pivotally mounted on a pin 356 set into the bearing 347 and carries a cam roller 357 at its free end. The cam roller 357 is so positioned that, at spaced points about the periphery of the apparatus, it will engage camming blocks 358, which serve to rock the bell crank levers 355 counterclockwise about their pivot pins 356 for withdrawing the latch 346 from its associated latching notch 348 in the carriage 334. The camming blocks 358 are mounted upon a spider 359, which surrounds the tubular bearing member 100 and is fixed thereto, as shown most clearly in Fig. 4.

At the various operating stations of the apparatus, the latches 346 will be withdrawn due to the action of the cam block 358 on the cam rollers 357 and the carriage 334 may be held at the operating station, by mechanism to be described, for a sufficient length of time to perform the operations necessary on the cordage at the operating stations and, thereafter, the carriages 334 may be released and they will be moved back to their normal position to be latched therein by the latches 346 by means of a carriage return device (Fig. 4) comprising a door check mechanism 360 of any suitable type, of which there is provided one for each carriage 334. The door check mechanisms are mounted upon the dial supporting casting 120 and have their operating arms 361 connected to the carriage 334 by means of links 362 pivotally connected to the carriages by means of pins 363 (Fig. 22) mounted in the projections 364 formed on the arcuately shaped portions 341 of the carriages 334. By means of this mechanism, a carriage 334, which is stopped in one of the operating stations of the apparatus, will remain stationary therein while the dial supporting casting 120 continues to move counter-clockwise until the necessary operations are performed on the cordage, and, thereafter, the carriage 334, being released by mechanism under control of the apparatus in the operating station, will return to its normal position, as shown in Fig. 22, and will be latched in that position.

In their travel around the apparatus, the cordage positioning plates 81 carry their cam rollers 230, 231, 232 and 233 in position to be engaged by cam members suitably supported upon a cam supporting plate 370, which may be seen most clearly in plan in Fig. 3. As will be seen by reference to the just-mentioned figure, the cam supporting plate 370 extends substantially all the way around the apparatus, being broken away at the punch press station to permit the cordage positioning plate 81 to be manipulated at that station and being apertured as shown at 371 and 372 at the braid severing station 82 and tucking and inspection station 83, respectively. Attached to the plate 370 adjacent to its peripheral edge is a guard member 369 (Fig. 4) of U-shaped cross section, which extends over the ends of the plates 81. The plate 370 is supported upon brackets 373 (Fig. 16), 374 (Fig. 20), and 375 (Fig. 30), which are suitably attached to the casing 117, the brackets 374 and 375 being fixed directly to the casing and the bracket 373 being carried by the bracket 139 fixed to the casing. The cams which control the operations of the cam rollers 230, 231, 232 and 233 are designated by the numerals 376, 377, 378, 379 and 380, and their operative effect upon the elements of the cordage positioning plate 81 will be described in detail in connection with the description of operation of the mechanisms at the various operating stations of the apparatus.

*The braid severing station*

As the portion of the cordage 75 which has been set into one of the cordage positioning plates 81 is carried by the positioning plate into the braid severing station 82, the cam rollers 230 and 231 will have been moved by the cam tracks 376 and 378 to the position shown in Figs. 3 and 20, thus to push the slidable clamp supporting plates 220 and 221 to the right and left, respectively (Fig. 20), to a position where the clamping members carried by the plates 220 and 221 and the auxiliary clamping members 266 and 267, and 270 and 271 are as close together as possible, where these clamping members, as illustrated by the movable clamping members 223, 225, 266 and 267 will occupy the position shown in Fig. 20 to receive a length of cordage 75 between them. As the plate 81 moves into the braid severing station, the cam rollers 232 and 233 will be moved apart while the cam rollers 230 and 231 remain in the positions just described. Movement of the cam rollers 232 and 233 away from each other will cause the main movable clamping jaws 223 and 225 and auxiliary clamping jaws 266 and 267 to move to a position where the cordage will be tightly clamped between them and their associated main fixed clamping jaws 222 and 224 and auxiliary fixed clamping jaws 270 and 271, respectively.

As the cordage positioning plate 81 moves into the braid severing station 82, the latch 346 will be retracted from engagement with the latching notch 348 on the carriage 334 and the carriage will be momentarily stopped at this station. Just before the carriage reaches the position shown in Fig. 22 in the braid severing station 82, a camming finger 381 carried on a bracket 382, in turn fixed to the carriage 334, will engage a trip finger 383 formed integrally with a latch 384 and will move the latch 384 out of engagement with the latching notch 385 in a spring-pressed plunger 386. The plunger 386 is freely slidable in an aperture 387 formed in bracket 388 attached to the bracket 374. The aperture 387 has a slot 389 formed in it for receiving the latch 384, which is pivoted on a pivot pin 390 set in the bracket 388 and which is urged to rock in a counter-clockwise direction (Fig. 22) by a compression spring 391 seated in a socket 392 in the bracket 388 and engaging an extending portion 393 of the latch 384. The plunger 386 has a shank portion 394, to which a collar 395 is attached for forming an abutment to strike against a plate 397 attached to the bracket 388. Also surrounding the shank 394 of the plunger 386 is a compression spring 396, which is seated between the plate 397 and an end surface 398 of a socket 399 formed in the plunger whereby the plunger is normally urged to the right (Fig. 22) and the amount of its movement is limited by the collar engaging plate 397.

In addition to the collar 395, the shank 394 has a switch actuating cam 400 attached to it for actuating a switch 401 when the plunger is released by the latch 384 and moved to the position shown in Figs. 22 and 23. The switch 401, in cooperation with a switch 402, controls the flow of current to a reversing valve mechanism 403 (Fig. 64). The reversing valve mechanism 403 may be of any suitable type which, when its solenoid 404 is deenergized, will supply fluid under pressure through a pipe 405 to the upper end of a cylinder 406 and which, when energized, will reverse the fluid flow and direct fluid under pressure through the pipe 407 to the lower end of the cylinder 406. The switch 401 is a normally open type switch, which is spring-urged to its open position, and the switch 402 is of the type which will remain in either its open or closed position. Thus the switch 401 is provided with one actuator 408, whereas the switch 402 is provided with one actuator 409 and a reset button 410, which resets the switch to its normally open position. Prior to the arrival of the carriage 334 at the position shown in Fig. 22, the camming finger 381, in moving past the switch 402, will engage and actuate the switch actuator 409, thus to close the circuit through the switch 402 and, when the carriage 334 arrives in the position shown in Fig. 22, switch actuator 408 will complete the circuit to the solenoid 404 by closing switch 401, switch 402 having been previously moved to its closed position.

When the switch 401 closes, as just described, fluid will be admitted to the lower end of the cylinder 406 (Fig. 20) to drive a piston rod 411 upwardly. The piston rod 411 carries a collar 412 on which there is formed, as shown in Fig. 20, a camming projection 413 adapted to cooperate with a cam 414 fixed to a shaft 415 journalled in the bracket 388. The shaft 415 (Fig. 23) also carries a plunger retracting member 416 fixed to it which is mounted in a slot 417 in the bracket 388 and which normally carries its upper end in a notch 418 in the plunger 386. The shaft 415 also has a pin 419 (Fig. 22) fixed to it, to which one end of a contractile spring 420 is attached.

The opposite end of the spring 420 is fixed to a pin 421 attached to a side wall of a knife housing 422. The spring 420 normally tends to hold the plunger retracting member 416 against the straight edge of the notch 418, as shown in Fig. 23, but will permit the retracting member 416 to be positively moved away from the notch 418 when the piston rod 411 moves upwardly, at which time, of course, the plunger 386 is in its inward or latching position, as shown in Figs. 22 and 23, and thus this movement of the cam 414, shaft 415 and plunger retracting member are ineffective.

In addition to actuating the cam 414, the piston rod 411 serves to actuate a braid-cutting knife, designated generally by the numeral 423 (Figs. 20 and 21), and also serves to actuate a bell crank lever 424 (Figs. 20 and 22). The bell crank lever 424 is pivotally mounted on a stud shaft 425 secured to the underside of a top member 426 of the knife housing 422. Threaded into one arm of the bell crank lever 424 is a set screw 427, which may be locked in an adjusted position with respect to the bell crank lever by means of a lock nut 428, and which is adapted, when the bell crank is rocked about the shaft 425, to engage the reset button 410 of the switch 402 to reset the switch. Mounted on another arm of the bell crank lever 424 is a cam roller 429, which is positioned in the path of movement of a cam 430 suitably mounted upon the piston rod 411. The bell crank lever 424 is normally held in its inoperative position, as shown in Fig. 22, where it bears against a pin 431, by a contractile spring 432 attached to the bell crank lever and to a pin 433 mounted on the knife housing 422 (Fig. 22).

The knife 423 (Fig. 20), which is adapted to be raised by the piston rod 411 and to sever the braid covering on the cordage 75, is positioned in alignment with a central aperture 434 in the die bar 312 and is adapted in its upward movement to pass through aligned apertures in the cam supporting plate 370 and the top member 426 of the knife housing 422 (see Figs. 21 and 27). The knife 423 comprises a rounded tip portion 435 forming the apex of the knife. This rounded tip is adapted to enter between the threads forming the braid 79 on the cordage 75 without damaging the separately insulated conductors 76, 77 and 78, and will serve, if necessary, to separate the conductors which, due to the fact that they are looped at the place where they extend from the cordage 75, will align themselves in such manner that a pair of blades 436 and 437, disposed at a slight angle to the tapered end of the knife, which terminates in the rounded tip 435, may cut the braided covering without, however, damaging the insulation on the separately insulated conductors. The blade members 436 and 427 extend from the point where their cutting edges coincide with the tapered surface of the knife adjacent to the tip, to a point where a rounded head 438 joins the upper reduced end of the piston rod 411.

The two blades 436 and 437 are held between a retainer plate 439 and the body 440 of the knife, by means of flat head screws 441 which hold the plate on the body of the knife. The retainer member 439 is tapered at the upper end to engage a dovetail notch 443 formed in the body 440 of the knife, thus to retain the blades in the proper position where they extend only slightly beyond the body of the knife portion and the retainer plate. When fluid is admitted to the lower end of the cylinder 406 and the knife 423 is carried up through the cordage 75, the braid 79 will thus be cut at the point where the individual conductors 76, 77 and 78 extend out from it, and thus the cordage may be prepared to have terminals attached to the individual conductors and to have the ends of the braid 79 wrapped with suitable retaining members in the form of a stay band on one end and an S-hook on the other end of the cords.

The just described operation of cutting the braid 79 comprises the first step in preparing the cords for the reception of the S-hooks, stay bands and terminals and the plate 81 carrying the cordage on which the braid has been severed at the point where the individual conductors extend from the cordage must next be carried to the inspection and cutting station 83. As the piston rod 411 reaches the upper end of its travel, the cam 430 carried thereby will engage the cam roller 429 to rock the bell crank lever 424 about the shaft 425. As the bell crank 424 rocks about the shaft 425, the set screw 427 carried thereby will engage and actuate the reset button 410 of switch 402, thus breaking the circuit to the solenoid 404 (Fig. 64) and, consequently, the reversing valve mechanism 403 no longer being held in its operated position, will return to its normal position and fluid will be supplied to the upper end of the cylinder 406 to cause the piston rod 411 to be retracted to the position shown in Fig. 20. In moving downwardly, the piston rod 411 will carry the camming projection 413 into engagement with the cam 414, thus to rock the shaft 415 counter-clockwise (Fig. 20). When the shaft 415 rocks counter-clockwise, the plunger retracting member 416 will withdraw the plunger 386 from a socket 442, which it had entered after it was released by its latch 384. As soon as the plunger 386 is withdrawn from the socket 442, the carriage 334 will be released and the door check mechanism 360 may return the carriage 334 to position where the latch 346 will engage in the latching notch 348 and the carriage will be carried forward by the dial supporting casting 120.

As the cordage positioning plate 81 travels from the braid severing station 82, the various parts of the cordage positioning plate will be in the condition shown in Figs. 24, 25, 26 and 27 and prior to the latching of the plate 81 in the tucking and inspecting station 83, the main clamping jaws and auxiliary clamping jaws must be moved apart so that the tucking and inspection of the cordage may take place. It should be noted at this time that while the main clamping jaws 222, 223, 224 and 225 grip the cordage 75, the auxiliary clamping jaws 266, 267, 270 and 271 engage the cordage somewhat loosely and serve to position it over the die bar 312. Thus when the sets of main clamping jaws, while still clamping the cordage between them, move apart, the auxiliary clamping jaws will stay in the position shown in Figs. 7 and 24 until the main clamping jaws approach the end of their travel longitudinally of the cordage positioning plate 81, at which time the auxiliary clamping jaws will move apart and will assume the position shown in Fig. 28. This moving apart of the auxiliary clamping jaws occurs between the braid severing station 82 and the tucking and inspection station 83.

*Tucking and inspection station*

When the cordage positioning plate 81 moves into the tucking and inspection station 83, which is shown most clearly in Figs. 30 to 42, the auxiliary clamping jaws 266, 267, 270 and 271 will be in the position shown in Fig. 28 and the individual conductors 76, 77 and 78 will lie approximately in the position shown in Fig. 28 preparatory to being tucked down through the cordage positioning plate 81. At the tucking and inspection station, the bracket 375 and the annular member 369 serve to support a housing designated generally by the numeral 460 (Figs. 30 and 31), which, in turn, supports the mechanism for tucking the cordage into position on the plate 81 and inspecting it. Mounted on the upper end of the housing 460 is a cylinder 461, which, as shown diagrammatically in Fig. 64, may be supplied with fluid through pipes 462 and 463 under control of a reversing valve mechanism 464, which may be of any suitable type and which, in its unoperated position, serves to direct fluid under pressure through the pipe 463 to the lower end of the cylinder 461. A solenoid 465, when energized, serves to operate the reversing valve mechanism 464 to cause it to direct fluid under pressure through the pipe 462. The reversing valve mechanism 464 is so connected that when fluid under pressure is fed to one end of it, the fluid will be released from the opposite end.

Fluid entering the cylinder 464 will impart movement to a piston rod 466 (Figs. 30 and 31), which has a slide 467 suitably attached to it to be supported by it. The slide 467 has a projecting portion 468, which normally engages a lock nut assembly 469 on a rod 470 and in the position shown in Fig. 30 the projecting portion 468 of the slide 467 will hold the rod 470 in its uppermost position. Intermediate its ends, the rod 470 has a second lock nut assembly 471 threaded on it to be engaged by the projecting portion 468 of the slide 467 when the slide 467 approaches its lowermost position. Mounted on the lower end of the rod 470 and attached thereto in a suitable manner is a horizontally disposed block 472, which has a plunger 473 suitably attached to it. The plunger 473 is slidable in a pair of bearings 474 and 475 suitably attached to the annular guard member 369 and the housing 460 to guide the plunger 473 in its movements. Attached to the plunger 473 intermediate the bearings 474 and 475 is a collar 476 carrying a camming projection 477 in the path of a cam member 478. The cam member 478 is mounted upon a rock shaft 479 suitably journalled in the bracket 375. The rock shaft 479 has attached thereto a lever 480, to which a link 481 is pivotally connected. The link 481 is normally urged to assume the position shown most clearly in Fig. 30, by a contractile spring 482 attached to a pin 483 mounted in the bracket 375, in which position the link 481 will hold a lever 484 and a shaft 485, on which the lever is fixed, in position shown in Fig. 30. The shaft 485 is journalled in a bearing block 486 (Fig. 41) attached to the bracket 375 and serves to release carriage 334 at the completion of a tucking and inspection operation, as will be described hereinafter.

The plunger 473, in its lowest position, will move the camming projection 477 into engagement with one end of a pivoted lever 451 (Figs. 30, 31 and 41), which is fulcrumed on a pin 452 extending from a wall of bracket 375. The right end of the lever 451 (Figs. 30, 31 and 41) is provided with a camming surface 453 adapted to engage and actuate a reset button 488 of a switch 489 when the lever 451 is rocked from the position shown in Fig. 30 to the position shown in Fig. 31 against the action of a contractile spring 454, which normally holds the lever against an abutment 455 on the plate 377.

The switch 489 is provided with an actuator arm 490, which, as may be seen in Fig. 64, is operative to close the contacts of switch 489 in a manner similar to that described in connection with the operation of switch 402 at the braid severing station 82. The actuator arm 490 is of the same construction as the actuator arm 409 of switch 402 and is adapted to be operated by the camming finger 381 on the cordage positioning plate 81 as the cordage positioning plate enters the tucking and inspection station 83. The switch 489 (Figs. 41 and 64) is connected in series with a switch 491 having an actuator 492 positioned to be actuated by a cam 493 on the shank 494 of a latching plunger 495. The latching plunger 495 is of the same construction as the latching plunger 386 and is normally held in its retracted position by a trip latch 496 normally held in a latching notch 497 in the plunger 495 by a spring 498, which tends to rotate the trip latch 496 about its pivot pins 499. The trip latch 496 is tripped in the same manner that the latch 384 was tripped in the braid severing station, that is, by the engagement therewith of the camming finger 381.

When the camming finger 381 engages the trip latch 496, the plunger 495 will be released and its spring 500 will force it into engagement with the face of the bracket 382. As the bracket 382 on the carriage 334 continues to move with the dial supporting casting 120, the end of the plunger 495 will enter into the socket 442, thus to hold the carriage 334 during the tucking and inspecting operations. It wil be understood that prior to the engagement of the plunger 495 with the socket 442, cam roller 357 had been actuated by cam 358 to withdraw spring pressed latch 346 from engagement with its cooperating latching notch 348 so that the carriage 334 may be held in the tucking and inspecting station during the performance of the necessary operations on the cordage carried by the cordage positioning plate 81.

After the tucking and inspection operations have been performed on the cordage in the inspection and tucking station 83, the plunger 473, in moving upwardly, will cause the camming projection 477 to engage the cam member 478 and thus, through the levers 480 and 484 and link 481, to rock the shaft 485 counterclockwise. The shaft 485 carries a plunger retracting member 501 in position to engage a notch 502 in the plunger 495 for resetting the plunger to a position where the trip latch 496 will reengage in the latching notch 497, thus to reset the plunger 495 and release switch 491 preparatory to a new cycle of operation of the apparatus at the inspection and tucking stations.

At the right side of the housing 460 (Figs. 31 and 32), there is provided means for suitably supporting the slide 467 for vertical movement comprising a pair of ways 510 and 511 to cooperate with a dove-tail 512 formed on the slide for guiding the slide in its movements. Suitably attached to the slide 467 is a block 513, which is cut away as shown at 514 (Fig. 32) to receive a pair of cooperating plates 515 and 516 adjacent to the portion thereof which abuts the slide 467. The plate 516 is milled out, as shown at 517, to form a rectangular pocket in which three push rods 518, 519 and 520 may slide. Each of the push rods has a short pin 521 fixed to its upper end, which cooperates with short pins 522 extending down from the upper end of the milled-out portion 517 to hold compression springs 523, 524 and 525 in position against the ends of the rods 518, 519 and 520, respectively, thus normally to urge the push rods downwardly to a point where shoulders 526, 527 and 528 formed thereon will engage the bottom 529 of the milled pocket in the plate 516. The shoulders 526, 527 and 528 formed on the push rods 518, 519 and 520 define the juncture between the main body of the push rods 518, 519 and 520 and reduced portions 530, 531 and 532 of the push rods.

At their lower ends, the push rods 518, 519 and 520 are provided with slots 534, 535 and 536, in which rollers 537, 538 and 539 are freely rotatable on pins 540, 541 and 542, respectively. The ends of the push rods 518 and 520 are of similar construction in that they each have rounded tips 543 and 544, respectively, at one side of the slots 534 and 536. The sides of the slots 534 and 536 opposite to the rounded tips 543 and 544 terminate in sloping surfaces 545 and 546, which serve to guide the individual conductors 76 and 78 into engagement with the rollers 537 and 539, respectively. The side surfaces of the slot 535 in the push rod 519 terminate in a pair of sloping surfaces 547 and 548, which serve to guide the conductor 77 into engagement with the roller 538. The three push rods 518, 519 and 520 being carried by the slide 497 will, when the slide is moved downwardly, travel from the position shown in Fig. 30 to the position shown in Fig. 31, as is illustrated by the reduced portion 530 of the push rod 518, and will, in cooperation with the sloping surfaces of the notches 314, 315 and 316, serve to guide the conductors 76, 77 and 78 into the notches 309, 310 and 311 (Fig. 11) on the die bar 312. The three push rods 518, 519 and 520, being spring pressed downwardly and normally being held in the position shown in dotted lines in Fig. 33, may be pushed upwardly relative to the plate 516 and may assume the positions shown in full lines in Fig. 33 when the slide 497 reaches its lowermost position. This spring action pulls all conductors tightly into position, although the individually insulated conductors 76, 77 and 78, as pulled from the cordage 75, are of unequal length so that when terminals are attached to the conductors 76, 77 and 78, the amount of individual conductor extending beyond the severed end of the braid will be different for each of the conductors.

At the outer or right end of the block 513 (Fig. 32), a plate 560 is attached to the block in position to hold a sleeve 561 in cooperating notches 562 and 563 formed in the block 513 and plate 562 to define a circular aperture when the plate 560 is attached to the block. The sleeve 561 has its central aperture reduced adjacent to its upper end (Fig. 31) to form an annular shoulder 564, through which a rod 565 is slidable. The upper end of the rod 565 is threaded to receive a lock nut assembly 566, which will abut the shoulder 564 when the slide 467 is raised to its upper position, thus to lift the rod 565 with the sleeve 561 (Fig. 30). At its lower end, the rod 565 is threaded into the closed end 567 of a tube 568 telescopically arranged with respect to the sleeve 561 (Fig. 31). A compression spring 569 encircles the rod 565 and bears against the closed end 567 of the tube 568 and against the shoulder 564, thus normally to urge the rod 565 to a position where the lock nut assembly 566 will engage the outer surface of the shoulder 564. Suitably mounted on the closed end 567 of the tube 568 is a tucking comb 570 (Figs. 31 and 34) having four teeth 571, 572, 573 and 574, which cooperate to align the individually insulated conductors 76, 77 and 78 in the proper notches in the die bar 312. The tucking comb 570 has a pair of shoulders 575 and 576 formed on it, which are adapted to engage flat surfaces of the auxiliary clamping members 271 and 267, respectively, thus to limit the downward movement of the comb 570 so that the conductors 76, 77 and 78 will be tucked down between the tongue 282 of the auxiliary clamping member 267 and the cordage locating comb 290.

In the event that the tucking comb 570 and the push rods 518, 519 and 520, in cooperation with the locating combs 290 and 289 and the tongues 282 and 281 on the auxiliary clamping members 267 and 270, respectively, properly locate the conductors 76, 77 and 78, the plate 81 may be transferred to the punch press station to have the stay bands, S-hooks and terminals fixed to its various components. However, in the event that the conductors 76, 77 and 78 are not properly located, it is not desirable to feed the cordage positioning plate 81 to the punch press station and, therefore, the three detecting plungers 580, 581 and 582 are moved into engagement with the conductors 76, 77 and 78 resting in the notches on the die bar 312 in the manner shown in Fig. 35 to control suitable mechanism for stopping the operation of the apparatus in the event that two conductors are piled up one on the other at any one of the notches in the die bar or in the event that a conductor is not present in each notch.

The detecting plungers 580, 581 and 582 are slidably mounted in the block 513, as shown in Figs. 31 and 35, being normally urged downwardly by compression springs 583, 584 and 585. The compression springs 583, 584 and 585 encircle reduced portions 586, 587 and 588 of the plungers 580, 581 and 582 and are interposed between a plate 589 attached to the block 513, and radially extending shoulders 590 and 591, 592 and 593, and 594 and 595 (Fig. 32) of washers 596, 597 and 598, which encircle the reduced portions 586, 587 and 588 of the detecting plungers 580, 581 and 582, respectively. The washers 596, 597 and 598 rest upon the shoulder formed by the juncture of the body of the plungers 580, 581 and 582 with their reduced portions 586, 587 and 588 when the springs 583, 584 and 585 are compressed. However, in the normal inoperative position of the plungers, where they are not pushed upwardly by conductors 76, 77 and 78 on the die bar 312, the washers will, as illustrated by the washer 596 in Fig. 30, rest upon shoulders formed at the juncture of guide apertures 599, 600 and 601 (Fig. 32), in which the main body portion of the detecting plungers 580, 581 and 582 are slidably mounted, and irregularly formed apertures 602, 603 and 604 which are shaped to receive the washers 596, 597 and 598.

The reduced portions 586, 587 and 588 (Fig. 35) of the detecting plungers 580, 581 and 582 have collars 610, 611 and 612 fixed to them which, in the normal inoperative position of the detecting plungers, are in engagement with the under-surface of a crossbar 613, which is, in turn, fixed to an auxiliary housing 605 (Fig. 31), attached to the housing 460. The reduced portions 586, 587 and 588 extend through suitable apertures in the crossbar 613 and are normally urged upwardly by compression springs 614, 615 and 616 surrounding the reduced portions and interposed between a lower surface of the crossbar 613 and head members 617, 618 and 619 fixed to the reduced portions 586, 587 and 588 of the detecting plungers. The head members 617, 618 and 619 are provided with horizontally extending arms 620, 621 and 622, respectively (Figs. 35 and 40), normally carried directly in alignment with three levers 623, 624 and 625, which are mounted upon a shaft 626 mounted in the housing 605 and which are held in alignment with the arms 620, 621 and 622 by spacer members 627 and 628 (Fig. 40).

Each of the levers 623, 624 and 625 is of the same construction and is T-shaped in configuration, the main body portion of the levers being pivoted on the shaft 626 and the cross head thereof being of arcuate shape, as illustrated in Figs. 30, 31, 36, 37 and 38. Since the levers are all of the same construction, only one of them will be described in detail, that is, the lever 623 which, as stated, has an arcuate head 629, as shown most clearly in Figs. 36, 37 and 38. The arcuate head 629 has a notch 630 cut in it of sufficient width to receive the tapered ends 631 and 632 of cross bars 633 and 634, respectively, of a pair of bails 635 and 636 (see Figs. 36 to 40, inclusive). The bails 635 and 636 are mounted upon a rock shaft 637, the bail 635 being pinned to the rock shaft by means of pins 638 and the bail 636 being freely rotatable about the rock shaft. The rock shaft is suitably supported in bearing portions 639 and 640 in the housing 605 and held in place in the housing by means of collars 641 and 642 suitably attached to the shaft 637. The bore of the bearing 640 is larger than the bore of the bearing 639 to hold a sleeve 643 for rotation therein around the shaft 637. One arm of the bail 636 has a key slot 644 to receive a key 645 formed on the sleeve 643, whereby, when rotative movement is imparted to the bail 636, corresponding movement will be imparted to the sleeve 643. The sleeve 643 is held in the housing 605 by a collar 646 formed integrally with the sleeve and engaging the bearing 640 on its inner side. The sleeve 643 has a switch actuating lever 647 fixed to it and the shaft 637 has a similar switch actuating lever 648 fixed to it for engaging actuating plungers 649 and 650, respectively, of switches 651 and 652. The operation of the switches 651 and 652 will be described more in detail hereinafter.

By referring to Fig. 35, it will be seen that the housing 605 is provided with a pair of extending bearing lugs 660 and 661, in which rods 662 and 663 are slidably mounted. The rods are normally prevented from moving upwardly beyond their normal inoperative position by a pair of collars 664 and 665 suitably fixed to the rods. At their upper ends, the rods 662 and 663 are attached to a slidable cross head 666 slidable in slots 667 and 668 formed in opposite sides of the auxiliary housing 605. Interposed between the undersurface of the cross head 666 and the upper surface of the bearing lugs 660 and 661 are a pair of compression springs 669 and 670, which surround the rods 662 and 663 and normally urge the cross head 666 and rods upwardly to engage the collars 664 and 665 with the undersurface of the bearing lugs. At their lower ends, the rods 662 and 663 are threaded to receive lock nut assemblies 671 and 672, respectively, adapted to be engaged by projections 673 and 674 extending outwardly at the sides of the block 513 when the block 513 is moved downwardly, the rods 662 and 663 extending through suitable apertures 675 and 676 formed in the projection 673 and 674. The cross head 666 has a cut 677 formed in it, across which a shaft 678 extends. The shaft 678 rotatably supports three rocker arms 679, 680 and 681 held in spaced relation to the side walls of the cut 677 by the spacers 682 and 683 and spaced from each other by spacers 684 and 685. The rocker arms 679, 680 and 681 are thus positioned in direct alignment with the head members 617, 618 and 619 on the detecting plungers 580, 581 and 582 and when the cross head 666 is moved downwardly, the rocker arms 679, 680 and 681 will move down to engage the horizontally extending arms 620, 621 and 622 and the levers 623, 624 and 625, respectively.

In the event that the proper alignment of the conductors 76, 77 and 78 has been made with respect to the notches formed in the die bar 312 to receive them, the plungers 580, 581 and 582 will move to the position shown in Fig. 35 and, as illustrated diagrammatically in Fig. 36, the cross head 666 will be moved downwardly to carry the rocker arms 679, 680 and 681 to the position shown in Fig. 36, where the arrangement of the various parts, as illustrated by rocker arm 679, lever 623 and horizontally extending arm 620 will be such that the tapered ends 631 and 632 of the cross bar 634 on bails 635 and 636 will nest in the notch 630 and neither the bail 635 nor the bail 636 will be moved. Therefore, the bails will not, through the shaft 637 or sleeve 643, actuate levers 647 or 648 (Fig. 39).

However, in the event that two conductors, as illustrated by the conductors 76 and 77 in Fig. 37, are accidentally superposed or are not nested in their associated notches on the die bar 312, one of the plungers 580, 581 or 582 will not travel downwardly as far as it should and the parts of the detecting mechanism will assume the position illustrated in Fig. 37, where the amount which the horizontally extending arms 620 move downwardly in less than the proper amount. Then, when the rocker arm 679 is carried down by the cross head 666, its movement will be blocked by the arm 620, causing the rocker arm to rock about the shaft 678 in a counterclockwise direction to rock lever 623 counterclockwise on its shaft 626. When this occurs, the bail 635 will be cammed in a clockwise direction due to the camming action between the edge of the notch 630 and the tapered end 631 of the bail's cross bar 633. When bail 635 is rocked clockwise, as viewed in Fig. 37, it will actuate the plunger 659 of switch 652, thus to operate the switch 652.

In the event that one of the conductors 76, 77 or 78 is accidentally broken or does not register under its detecting plunger 580, 581 or 582, respectively, the relative position of the parts of the detecting mechanism will be as illustrated in Fig. 38. In this figure, the plunger 580 is shown as having moved down into engagement with the upper surface of the die bar 312 and correspondingly has drawn the head member 617 below the position which it should occupy. Thus, when the cross head 666 carries the rocker arm 679 downwardly, the rocker arm will rock in a clockwise direction about its shaft 678 and will, through the horizontally extending arm 620, rock the lever 623 clockwise. When lever 623 rocks clockwise, the bail 636 will be rocked clockwise about the shaft 637 and will, through the sleeve 643 keyed thereto, move switch actuating lever 647 to operate switch plunger 649 and thus operate the switch 651.

As may be seen by reference to Fig. 64, the switches 651 and 652 are normally closed switches, which connect power from a power line 690 connected to a suitable source of power (not shown) to a contact 691 of a power relay 692. This connection through the switches 651 and 652 forms a locking path for holding the relay 692 energized and thus controlling the supply of power to the main drive motor 96, as will be described more in detail in connection with the description of the operation of the apparatus.

Punch press station

At this station of the apparatus, there is provided a suitable punch press, designated generally by the numeral 701 (Figs. 1 and 43). As illustrated generally in these two figures, the punch press is provided with a driving motor 702, which is mounted at the top of a standard 703 and, though a driving element 704, which may be either a chain drive or belt drive, imparts rotation to the punch press fly wheel 705, as is usual in such apparatus. The punch press motor 702 may be supplied with power from the power source including the power lines 690, 706 and 707 (Fig. 64). The power lines 690, 706 and 707 will be connected to a punch press upon operation of a relay 708 under control of a start switch 709, which, upon operation, will supply current from line 690 through the winding 710 of the relay 708, a stop switch 712 and back to line 706, to close the relay contacts. One of the relay contacts designated 711, upon energization of the relay, will serve to lock the relay operated over a path from line 690 through contact 711, winding 710 and normally closed contacts of the stop switch 712 to line 706. Thus, upon the momentary operation of the start switch 709, power will be supplied to the punch press motor 702 and the motor 702 will continuously drive the fly wheel 705 until the stop switch 712 is operated to break the locking path to the relay 708.

The punch press 701 is provided with a trip solenoid 715 (Figs. 43 and 64) which, upon operation, will trip the punch press mechanism to cause it to go through one complete cycle and then come to rest. This tripping mechanism may be of any suitable construction and, since the details of it are not pertinent to the present invention, are not disclosed herein. Suitable control means are provided at the punch press station 84 to be operated by the cordage positioning plate 81 in moving into the punch press station to cause the energization of the solenoid 715. This mechanism may be a duplicate of that shown in connection with the braid severing station and the tucking and inspection station and, for the sake of simplicity, has been shown herein as a single switch 716 (Figs. 44 and 64), the actuator button 717 of which lies in the path of the cam member 718.

The cam member 718 is mounted upon a reduced shank 719 of a plunger 720 normally held in a retracted position opposite to that shown in Fig. 44 by a latch 721. The latch 721 is provided with a trip finger 722, similar to the trip finger 383 in the braid severing station and described in detail in connection with the braid severing station. The plunger 720 is slidable in a bracket 723 suitably mounted at the punch press station 84 and is provided with a socket 724, in which a compression spring 725 is seated in a position surrounding the shank 719 and bearing against the base of the socket 724 and against a plate 726. In this manner, the plunger 720 is normally urged into the socket 442 in bracket 382 on the carriage 334. The amount of movement of the plunger 720 is limited by a collar 727 attached to the plunger and bearing against the plate 726. In addition to the collar 727, the shank 719 of the plunger has collar 728 attached to it, which is adapted to be engaged by the bifurcated end of a restoring lever 729, which, as will be described hereinafter, is operative to move the plunger against the action of the spring 725 to a position where it may be latched in a retracted position by the latch 721.

As pointed out hereinbefore, the operation of the trip solenoid 715 will cause the punch press to go through one complete cycle and then stop. In going through its complete cycle, the punch press will impart one complete rotation to a drive shaft 730 (Fig. 1) and, through connections of the type usual in punch press mechanisms, will impart one excursion of reciprocation to a ram 731 (Figs. 43 and 46). The shaft 730 carries a restoring cam 732 (Fig. 1) in position to engage a cam roller 733 mounted upon a lever 734. The lever 734 is fixed to a shaft 735 (Figs. 1 and 3), which is mounted for limited rotation in a bracket 736 and which has a lever 737 fixed to it adjacent to its lower end. The lever 737 has pivotally connected thereto a link 738, and the end of the link opposite to the lever 737 is pivotally connected to the restoring lever 729, which is pivoted on the bracket 723. At the completion of a cycle of operation of the punch press 701, the cam 732 will be effective to restore the latching plunger 720 to normal position opposite to that shown in Figs. 3 and 4, and will also be effective to permit switch 716 to open, thus releasing the solenoid 715 just prior to the release of the carriage 334 by plunger 720.

The punch press 701 is mounted upon the main supporting base 98 (Fig. 43) and, in addition to the standard 703, includes a base 745, on which a base plate 746 is mounted to support a bolster 747, to which there are secured a pair of clamp plates 748 and 749 (Fig. 46) for holding a tool supporting plate 750 in position on the bolster plate 747. The tool supporting plate 750 has four shouldered apertures 751—751 formed in it for receiving tubular supporting plungers 752—752 (Figs. 44, 45 and 46) provided with suitable shoulders cooperating with the shoulders in the apertures 751—751 to prevent upward movement of the plungers beyond a predetermined height. The lower ends of the apertures 751—751 are threaded to receive plugs 753—753, which serve to hold compression springs 754 in the plungers 752—752 for urging the plungers to carry their shoulders into engagement with the shoulders in the shouldered apertures 751—751. These plungers 752 are so positioned that they tend to support a cordage positioning plate 81 in an elevated position and also serve to guide the plate 81 when it is moved downwardly in the operation of the punch press so that it will not tend to tilt at an angle and tend to bind on the carriage 334.

The tool supporting plate 750, in addition to supporting the plungers 752—752, also supports a pair of liner sleeves 755 and 756 in alignment with liner pins 757 and 758 (Figs. 43 and 62) carried by the head of the press in a manner to be described hereinafter. The liner pins 757 and 758, in cooperation with the liner sleeves 755 and 756, serve to properly position the cordage positioning plate 81 in the punch press and compensate for any wear or slight variations in the position to which the plate is moved.

Mounted upon the tool supporting plate 750 is a tool base 744 carrying a tool holding block 760 (Figs. 45, 46 and 47) in which are positioned terminal cutting tools or punches 761, 762 and 763, wire cutting tools or punches 764 to 769, terminal forming tools 770 to 775, a stay band forming tool 776, and an S-hook forming tool 777. These tools are adjustably mounted in the tool holding block 760 and cooperate with other tools on the head of the press to cut the terminals from the strip 91, as shown in Fig. 62, form the terminals around the conductors 76, 77 and 78, shear the conductors against the surface of the individual terminal members 90, shear the stay bands and S-hooks from a part of the formed strips thereof, and attach the stay bands and S-hooks to cordage 75 adjacent to the points where the braid 79 has been severed.

The upper surface of the block 760 is cut away as shown at 780 (Figs. 45 and 47) to receive the conductors 76, 77 and 78 when the plate 81 is moved downwardly in the operation of the punch press from the position shown in Fig. 49 to the position shown in Fig. 47. Cutouts are formed in the other portions of the block 760 to accommodate portions of the plate 81 when the plate is moved by the punch press.

In the punch press, the forming tools 776 and 777 for forming stay bands and S-hooks and the terminal forming tools 770, 771, 772, 773, 774 and 775 are provided with shoulders 781—781, as illustrated in Figs. 50 and 52, for cooperation with shoulders 782—782 formed in the block 760 to position the forming tools in the block, the base of the tools resting on the tool base 744. The terminal forming tools 770, 771 and 772 are formed on the upper end of a tool blank 783, as illustrated in Fig. 52, and this blank is provided with the shoulders 781, which serve to position it on the tool base 744. The stay band forming tool 776, as shown most clearly in Figs. 47 and 49, is positioned in a conforming aperture 784 in the block 760 in position to engage the cordage 75 just to the left (Figs. 47 and 49) of the comb 289. The S-hook forming tool 777 is positioned in an aperture 785 in the block 760 in position to engage the cordage 75 just to the right of the cordage locating comb 290. The tool blank 783 is positioned in an aperture 784 adjacent to the left side of the die bar 312, and a tool blank 786, similar to the tool blank 783, is mounted in an aperture 787 positioned to hold the tool just to the right of the die bar 312.

Since the cutting tools 764, 765, 766, 767, 768, and 769 will become dulled after operating for a time, these tools are mounted in the manner illustrated most clearly in Fig. 47. As shown in this figure, the wire cutting tools or punches 765 and 766 have their upper ends formed to comprise knife blades and have tapered surfaces 789 and 790 adapted to be engaged by cooperating angularly disposed surfaces 791 and 792 on adjusting members 793 and 794, which are freely slidable in apertures 795 and 796 formed in the tool base 744. While only the adjusting members 793 and 794 for the wire cutting tools 765 and 766 are shown in full in Fig. 47, there are provided three adjusting members 793 and three adjusting members 794 operating on tools disposed at opposite sides of the die bar 312, as indicated by the dotted line showing the adjusting members 793 and 794, which cooperate with the wire cutting tools 764 and 767. The adjusting members 793 and 794 are mounted in staggered relation in the tool base 744 and are adapted to be actuated by threaded plugs 797—797, which are threaded into the tool base 744 and are attached to the adjusting members 793 and 794, but freely rotatable with respect to the adjusting members. After the wire cutting tools 764 to 769, inclusive, have been adjusted to the proper height, where they will cut the wires of conductors 76, 77 and 78 against their associated terminals, the cutting tools may be locked in place by set screws 798—798, which are threaded into the tool base 744 and have reduced shank portions 799 movable to bear against the wire cutting tools, thus to lock them in place.

Since it is also necessary to adjust the height of the terminal cutting tools or punches to compensate for wear in these members, the punches are adjustably supported in the manner shown most clearly in Figs. 47, 48 and 55. As shown in these figures, particularly in Figs. 48 and 55, the bottoms of the terminal cutting tools or punches 761, 762 and 763 are cut at a slight angle to the horizontal, and grooves 810, 811 and 812 are formed in the punches 761, 762 and 763, respectively, disposed at the same angle to the horizontal as the bottom of the punches. The bottoms of the punches rest upon a tapered shoulder 813 of a positioning member 814, which is slidable in the tool base 744. Cooperating with the positioning member 814 is a retaining member 815, which has a tapered projection 816, which enters the slots 810, 811, and 812 in the punches 761, 762 and 763 and serves to hold the punches against the tapered shoulder 813 of the positioning member 814. Fixed to the tool supporting plate 750 are a pair of U-shaped yokes 817 and 818, as shown most clearly in Figs. 45 and 55. These yokes have their bases threaded to receive set screws 819 and 820, which bear against the retainer member 815 and positioning member 814, respectively. By proper manipulation of the set screws 819 and 820, the height of the punches or terminal cutting tools 761, 762 and 763 may be adjusted with a high degree of accuracy.

Suitably attached to the ram 731 is a tool holder 826, which is provided with a shank 827 (Fig. 46) extending upwardly into the ram of the press whereby the tool holder may be attached to the ram. The tool holder is cut out as shown most clearly in Fig. 47 to receive tool positioning members 828 and 829, which serve to support the stay band forming and shearing tools 832 and 833 and tool positioning members 830 and 831, which serve to position the S-hook forming and shearing tool 834. The tool positioning members 828, 829, 830 and 831 are held in place in the tool holder 826 by a guide plate 835, and the plates 829 and 831 are provided with apertures of smaller size than the apertures in the plates 828 and 830, as illustrated by the aperture 836 in plate 831 (Fig. 57), whereby the plates 829 and 831 cooperate to hold the tools 832, 833 and 834 in the tool holder 826.

In addition to the cutouts for receiving the tool positioning plates 828 to 831 and the upper ends of tools 832, 833 and 834, the tool holder 826 is cut out as shown at 847 (Figs. 47 and 55) to receive scrap cut from the interconnected strips of terminals 90 by the terminal cutting tools 761, 762 and 763 in cooperation with a die 837 carried on the end a die block 838, which is provided with apertures in alignment with the apertures in the die 837. The die block 838 is provided with shoulders 839 (Fig. 55), which nest in cooperating shoulders in the guide plate 835 to accurately position the die block with respect to the terminal cutting tools or punches 761, 762 and 763. The cutout 847 formed in the tool holder 826 is in alignment with a scrap-receiving tube 844 and communicates with a downwardly extending passage 840 through which the scrap will be pushed by the terminal cutting tools or punches. The right end of the cutout 847 (Fig. 55) is reduced, as shown at 841, and is in communication with a hose or pipe connection 842, which may be connected to a suitable source of compressed air whereby the scrap pushed up into the cutout 847 may be blown out through the scrap-receiving tube 844. In order to prevent the scrap from being carried straight upwardly against the upper surface of the cutout 847 in such manner that it would tend to jam the passage, a breaker blade 843, as shown in Fig. 47, is set into the cutout 847 to disengage the pieces of scrap one from another so that they will be blown out through the scrap-receiving tube 844.

Also positioned in the tool holder 826, as shown most clearly in Figs. 47 and 55, are two sets of tool positioning slides 848, 849, 850 and 851. The tool positioning slides 848 and 850 are positioned between the upper surface of the guide plate 835 and the bottom surface of a slot 852 in the tool holder 826, whereas the tool positioning slides 849 and 851 are positioned between the upper surface of the plate 835 and the bottom surface of a slot 853 in the tool holder 826. These tool positioning slides are similar to the positioning member and retaining member 814 and 815, which adjustably position the punches 761, 762 and 763 with respect to the tool holding block 760 and are adjustably positioned by means of set screws 854—854 threaded into the tool holder 826. As illustrated most clearly in Fig. 55, the tool positioning slide 849 is provided with a tapered projecting portion 856, which engages the base of a terminal forming tool 857 and cooperates with a tapered projecting portion 858 on the slide 851 to position the terminal forming tool 857. The terminal forming tool 857 has a slot 859 cut in it to receive the tapered projecting portion 858 of the slide 851. A terminal forming tool 860, similar to the tool 857, may be locked in position with respect to the tool holder by means of the slides 848 and 850 in a manner similar to that described for positioning the terminal forming member 857.

The lower end of the terminal forming tool 860, as shown most clearly in Fig. 52, is provided with a plurality of forming surfaces 861, 862 and 863, which cooperate with the terminal forming tools 770, 771 and 772 on the tool blank 783 to wrap conductor engaging portions of the terminal members 90 around the insulated conductors 76, 77 and 78. The terminal members, as stated earlier in the description, are fed to the apparatus in strip form, as shown at 91 (Fig. 62). An enlarged view of these terminals is shown in Fig. 56, wherein the terminals are shown as being partly formed and interconnected by a strip 864. In this view, the terminals are shown arranged over the punches 761, 762 and 763, the edge portions of which appear just outside the edges of the strip 864. Each of the terminals 90 in the strip 91 has a U-shaped portion 865 and when the terminals are interconnected in the strip 91, the connecting strips 864 interconnect portions of the terminal which are to be cut along the dotted lines by the punches 761, 762 and 763.

The individual terminals 90 thus, in the operation of the apparatus, will be separated one from another by the co-action of the punches 761, 762 and 763 with the die 837 and the sleeve portion of the terminals, as indicated at 866, will be pressed onto the individually insulated conductors 76, 77 and 78 through the co-action of the terminal forming tools 770, 771 and 772 and the forming surfaces 861, 862 and 863 of tool 860. As fed to the apparatus, the sleeve portions 866 of the terminals are partially formed, being of U-shaped configuration, and having V-shaped notches 867 and 868 formed in them to deform a triangular portion of the sleeve 866 so that it will extend into the interior of the U-shaped sleeve 866, and when the sleeve is forced onto a conductor, the inwardly projecting tips will pass through the insulation on the conductors and contact the core of conducting material therein.

The strip of S-hooks 92 (Figs. 46 and 57 to 62) comprises a plurality of U-shaped sleeve portions 870 interconnected by and integral with a feed strip 871. This feed strip serves to interconnect the S-hook sleeves 870 and aids in the guiding of them through the apparatus. At the end of each of the U-shaped sleeves opposite to the part where they are connected to the feed strip 871, the sleeve is deformed slightly (Figs. 60 and 61) to permit the attachment thereto of an S-shaped hook 872 in such manner that when an S-hook is attached to the cordage and wrapped around the outer layer of insulation on the cordage, the S-hook will not damage the cordage or be bound so tightly in place that it cannot be moved slightly to facilitate the attachment of the resultant cord to a supporting element in a piece of electrical apparatus in which the cord is to be used.

The stay bands 94 are formed in a manner somewhat similar to the S-hooks, as illustrated most clearly in Figs. 50, 51 and 62, in that they are formed integrally with a connecting strip 873, and have cord engaging sleeve portions 874 and attaching portions 875. In the stay band, the attaching portion 875 comprises a hook, which is in alignment with the sleeve portion, and thus the stay bands 94 are unlike S-hooks 93 attached together adjacent to their head portions.

Suspended from the tool holder 826 (Figs. 46 and 62) by means of a plurality of headed bolts 885—885 and 886—886 is a stripper plate assembly 887, which is normally urged to assume the position shown in Fig. 46 by compression springs 888, which bear against an upper surface of a main stripper plate 889, and are seated in pockets 890 formed in the tool holder 826 in position where they surround the bolts 885. The lower ends of the bolts 885—885 and 886—886 are threaded into the main stripper plate 889, and their heads rest on shoulders 891—891 and 892—892 formed in apertures 893—893 and 894—894, respectively, in which the bolts 885—885 and 886—886 are slidable. In this manner, the compression springs 888 normally urge the stripper plate assembly 887 to assume the position shown in Fig. 46, but when the plate engages the cordage positioning plate 81 on the downward stroke of the ram 731, the stripper plate assembly may move relatively upwardly with respect to the ram and tool holder 826.

The stripper plate assembly 887 carries three brackets 896, 897 and 898 (Figs. 57, 46 and 55), respectively, in which are mounted bell crank levers 899, 900 and 901, which are operable to feed the S-hook strip 92, the stay band strip 95, and the strip of terminal members 91 step by step into the apparatus. The bell crank lever 899 is pivoted on a pivot pin 902 and is normally urged to rotate in a clockwise direction by a contractile spring 903, one end of which is attached to the bell crank lever and the other end of which is attached to a pin 904 in an auxiliary bracket 905 mounted on the main stripper plate 889. The amount of rotation imparted to the bell crank lever 899 is limited by a pair of set screws 906 and 907 threaded into cross members 908 and 909 of the bracket 896. The bell crank 899 is adapted to be rocked counterclockwise against the action of the spring 903 each time the ram 731 moves to its lowermost position due to the engagement of the left end (Figs. 57 and 46) of the bell crank lever 899 with an abutment post 910 fixed in a suitable bracket 911 attached to a stationary portion of the press 912.

The end of the bell crank lever 899, which extends in a substantially vertical direction, carries a feed pawl 913 pivotally mounted on a pin 914, attached to the lever 899. The feed pawl 913 is normally urged to rotate clockwise by a contractile spring 915 attached to the left end of the pawl 913 (Fig. 57) and to the bell crank lever 899. This pawl is adapted to engage one of the sleeve portions 870 of an S-hook and force it to the right (Fig. 57) each time the bell crank 899 is actuated by its engagement with the abutment post 910. Pivoted on a pin 916 mounted in the auxiliary bracket 904 is a retainer pawl 917, which is resiliently urged to rock clockwise by a compression spring 918 interposed between the left end of the pawl 917 (Fig. 57) and the base of a socket 919 formed in the plate 889. This retainer pawl 917 will engage the sleeve portion of the S-hooks to prevent their retraction when the spring 903 retracts the bell crank lever 899 to its normal position.

As illustrated most clearly in Fig. 46, the interconnected strip of S-hooks 92 adjacent to the point where it engages the stripper plate assembly 887 is positioned to contact with a constantly rotating wire brush 925 mounted upon a shaft 926 driven by a motor 927. The motor 927 may be mounted in any suitable manner upon the punch press framework in a position such that the brush 925 will engage the strip of S-hooks 92 adjacent to its point of entry into the stripper plate assembly 887. This engagement of the strip of S-hooks with the brush occurs each time the ram 731 moves downwardly, and the brush 925 is rotated in such direction that it will throw any one of the S-shaped hooks which it engages, and which is suspended between the sides of the U-shaped sleeve portion 870, up on top of the sleeve portion.

Formed integrally with or suitably attached to the plate 889 is a guide member 928, which is shaped as shown in Fig. 60 to move the S-shaped hook 872 from its full line position to its dotted line position, where the hook will rest upon a guide surface 929. The plate 889 has a slot 930 (Figs. 60 and 61) formed in it for receiving and guiding the sleeve portions 870 of the S-hooks 93 and the lower end of the slot 930 is closed by a plate 931 on which the sleeve portion 870 of the S-hooks slide in their travel to alignment with the S-hook forming and shearing member 834. The forming shearing tool 834 is formed as shown most clearly in Figs. 49, 54, 57 and 59, that is, a rounded notch 932 is formed on its lowest surface for engaging and forming the sleeve portion 870 of the S-hook 93. At the center of the rounded notch 932, the lower end of the tool 834 has a slot 933 formed in it (Figs. 49 and 54) into which the hook 872 may extend without damaging the hook during the forming of the sleeve 870 by the cooperative action of the S-hook forming tool 777 and the S-hook forming and shearing tool 834.

As will be apparent by reference to Figs. 49 and 54, the S-hook strip 92 is carried into the position to be operated upon by the tools in a position above the cordage 75. When the tool 834 moves downwardly with respect to the stripper plate assembly 887, the tool 834 will engage the S-hook sleeve portion 870 and the right hand edge (Fig. 49) of the tool 834 in cooperation with an edge 934 of the plate 889 will shear the S-hook from the feed strip 871 and will force the S-hook onto the cordage 75, carrying the severed S-hook from the position shown in Figs. 49 and 57 downwardly to the position shown in Fig. 59 and clamping the sleeve thereof around the cordage 75. In order to prevent the S-shaped hook 872 from dropping down under the sleeve 870, the hook 872 is resiliently supported by a pair of lead springs 935 and 936, which extend into a slot 937 in the plate 889 (Fig. 54). Thus, the S-shaped hook 872 will be forced through between the springs 935 and 936 by an extending shoulder 938 formed on the tool 834 during the transference of the S-hook from the interconnected strip to clamping engagement with the cordage 75.

Attached to the underside of the main stripper plate 889, as shown in Fig. 55, is an auxiliary plate 941 having a slot 942 formed in it for receiving the sleeve portions 866 of the strip of terminal members 91. Resiliently mounted in a portion of the slot 942 in the plate 941 is a support plate 943, along the upper surface of which the joined together U-shaped portions 865 and strip 864 ride in the operation of the apparatus. Since, in the shearing of the individual terminal members 90 from the strip 91 the strip is flexed somewhat, this resilient support plate is utilized to guide the strip 91. The support plate 943 is resiliently mounted upon the base of the slot 942 in the auxiliary plate 941 by a plurality of compression springs 944 seated in opposed sockets 945 and 946 in the plate 941 and plate 943, respectively.

A feed mechanism similar to that described in connection with the feeding of the S-hooks is provided for feeding the strip 91 of interconnected terminals 90, and this comprises a feed pawl 947 (Fig. 55) pivoted on the lower end of the substantially vertically extending arm of the bell crank lever 901. The bell crank lever is mounted on a pivot pin 948 mounted in the bracket 898 and its movement is limited by set screws 949 and 950 fixed in the bracket 898. A contractile spring 951 attached to the bell crank lever 901 and to an auxiliary bracket 952 normally urges the bell crank lever to rock counterclockwise and a contractile spring 953 normally urges the feed pawl to rock counterclockwise. When the bell crank lever 901 is carried upwardly by the ram 731 moving upwardly, the substantially horizontally extending arm of the bell crank lever will engage an abutment post 954 (Fig. 43) and the bell crank lever will thus be rocked clockwise (Fig. 55) against the action of the spring 951 to feed six terminal members 90 attached by the strips 864 into position to be attached to the individually insulated conductors 76, 77 and 78. As the ram of the press moves downwardly, the spring 951 will return the pawl 947 and bell crank 901 to the position shown in Fig. 55, and, during this returning of the pawl to position to feed a new length of strip 91 to the apparatus, a retainer pawl 956 will prevent the strip 91 from being drawn to the right (Fig. 55) due to the engagement of its lowermost end with the strip 91. The retainer pawl 956 is mounted in the auxiliary bracket 952, being pivoted on a pin 957 and being normally urged to rock counterclockwise by a compression spring 958.

As described hereinbefore, the scrap from the strip 91 of interconnected terminals is pushed up through the die block 838 and the scrap from the strip 92 of S-hooks, which, after the S-hooks have been sheared from it, comprises a continuous length of material, is fed out of the stripper plate assembly through a passage 965 (Fig. 62) which is, in effect, a continuation of the slot which received the feed strip 871 of the strip 92 of S-hooks, as shown in Figs. 60 and 61.

The mechanism for feeding the stay band into position to be clamped on the cordage 75 is similar to the mechanism utilized for feeding the terminals and S-hooks and comprises, as shown most clearly in Fig. 46, the bell crank lever 900 pivoted on a pivot pin 966 mounted in the bracket 897. A pair of set screws 967 and 968 limit the rocking movement of the bell crank lever 900, which is urged to rock clockwise by a contractile spring 969 attached to the bell crank lever and to an auxiliary bracket 970. The substantially vertically extending arm of the bell crank lever 900 has pivotally mounted upon it a feed pawl 971 urged into engagement with the stay band strip 95 by a contractile spring 972. A retainer pawl 973, pivoted in the auxiliary bracket 970, and urged into engagement with the stay band strip by a compression spring 974, prevents the strip 95 from being drawn backward by the pawl 971 when the pawl 971 moves to the right (Fig. 46).

Feeding movement, that is, clockwise movement, is imparted to the bell crank lever 900 by an abutment post 975 as the ram 731 of the press approaches its uppermost position. The bell crank lever 900 will thus be effective to feed one stay band into position over the cordage 75 each time the ram 731 approaches its uppermost position. The strip of stay bands 95 is carried into position to be attached to the cordage 75 by cooperating surfaces on the plate 889 and a guide plate 976 (Fig. 46), a slot 977 (Figs. 49, 50 and 62) being formed in the main stripper plate 889 to receive the sleeve portions 874 of the stay bands and a slot 978 (Fig. 49) being formed by cooperating portions of the plate 976 and the main stripper plate 889 to receive the attaching portions 875 of the stay bands. The flattened portion of the stay bands comprising attaching portion 875 and the connecting strip 873 extend into the slot 978, whereby the strip 95 of stay bands is carried to position over the cordage. As will be apparent by reference to Figs. 49, 50 and 53, the stay band shearing tool 833 cooperates with side walls 979 and 980 of the aperture 981 in the main stripper plate 89, in which the tools 832 and 833 are slidable, to cut the stay band from its connecting strip 873 after the sleeve portion of the stay band has encircled the cordage 75. The stay bands will thus be sheared from the strip 873 and on the next feed stroke of the feed pawl 971, the extending end of the connecting strip 873, from which a stay band has been sheared, will enter into a passageway 982 (Fig. 62) in the plate 889 and will be carried out of the stripper plate assembly in this manner, the sheared-off lengths of connecting strips 873 being pushed through passageway 982 upon the entrance of a succeeding length attached to the strip 95.

When the ram 731 of the press moves downwardly to perform the various shearing and attaching operations, the cordage positioning plate 81 must first be moved downwardly to rest upon the liner sleeves 755 and 756 (Figs. 44, 46 and 47), thus to carry the cordage and individual conductors down to position to be operated upon. Accordingly, a series of pads 983, 984, 985 and 986 (Fig. 62) are carried on the underside of the main stripper plate 889 and these pads will engage the sides of the cordage positioning plate 81, thus to compress the supporting plungers 752—752 (Figs. 44, 45 and 46) so that the stripper plate assembly 887 and cordage positioning plate 81 will move downwardly as a unit until further downward movement of them is blocked by the liner sleeves 755, whereupon, the stripper plate assembly 887 will remain stationary as the ram 731 completes its downward movement. In addition to the pads 983, 984 and 985, the head portion of the press carries a pair of stripping plungers 987 and 988 (Figs. 49 and 62). These stripping plungers 987 and 988 are mounted in the block 838, in which they are slidably mounted, being urged downwardly by compression springs 989, one of which is shown in Fig. 55. The plungers 987 and 988 will engage the terminal member 90, which has been attached to the left hand conductor 76. Plungers similar to the plungers 987 and 988 may be provided in alignment with each of the attached terminal members to aid in stripping them from the die 837, if necessary. The punch press at the punch press station 84 is disclosed, and some of the features thereof are claimed specifically, in Hackbarth Patent 2,592,276, granted April 8, 1952, and assigned to Western Electric Company, Incorporated, a corporation of the State of New York.

*Operation*

It is believed that a complete understanding of the invention may be had by reference to the following brief description of the mode of operation of the apparatus:

In the operation of the apparatus, a supply of cordage 75, having been threaded into the feeding mechanism 80, and supplies of strips of terminals 91, strips of S-hooks 92, and a stay band strip 95 having been placed in the stripper plate assembly 887, the apparatus will be in condition for operation, it being assumed that the various tool adjustments have been made to place the shearing and forming tools in the punch press in position to perform their operations effectively. After the apparatus has thus been supplied with the materials used in its operation, the apparatus may be started. In other to insure that the punch press will function properly at all times that cordage positioning plates 81 are in position therein to have the cordage held thereby equipped with S-hooks, stay bands and terminal members, the punch press motor 702 must be started first by closing the start switch 709 (Fig. 64). Momentary closure of the switch 709 will connect power from line 690 to one side of the winding 710 of relay 708 and through normally closed stop switch 712 back to line 706. Power will thus be supplied to energize the relay 708, causing it to close its contacts. As soon as relay 708 closes its contacts, power will be supplied from the lines 707, 690 and 706 to leads 991, 992 and 993 extending from the relay 708 to the motor 702. As soon as the relay 708 pulls up, it will lock operated over its locking contacts 711.

The punch press motor 702 thus having been put in operation the main driving motor 96 may be started. This motor may be started by momentarily closing a start switch 994. The closure of start switch 994 will connect lead 992, now connected to the power source, to one side of the winding 995 of relay 692. The other side of the winding 995 is connected to lead 993 through a normally closed stop switch 996 and thus, when the punch press motor 702 is supplied with power, a circuit may be completed to initiate the operation of the main driving motor 96. When relay 692 pulls up, it will lock operated over its contact 691 and through the normally closed switches 652 and 651 back to line 690. In this manner, motor 96 will continue to be supplied with power until stop switch 712, stop switch 996, or either of switches 651 or 652 is operated.

As the apparatus starts in operation, due to the fact that motor 96 is supplying power to the main shaft 104 (Figs. 3 and 43), power for driving the feeding mechanism 80 will be transmitted from the shaft 104 and interconnected gear to drive shafts 108, 111 and 114, thus to supply power to drive the ring gear 119. As the ring gear 119 rotates, it will carry the dial supporting casing 120 with it around the tubular bearing member 100 (Fig. 4). As the ring gear 119 rotates, it will, through pinion 135 and stud shaft 136, transmit power through gears 140 and 141 to shaft 142 (Fig. 16). Shaft 142, through pinions 144 and 145, will drive chain 159 and through the chain 159 will transmit power to drive the sprockets 160 and 161 (Fig. 17). The chains 162 and 163 and their interconnecting pins 166 will thus travel in a clockwise direction around the sprockets 160, 161, 164 and 165. As the pins 166 thus travel clockwise, the feed members 174 will engage the looped conductors 76, 77 and 78 extending out from the braid 79 and, accordingly, will advance the cordage across the feed chain housing 150. As the feed members 174 travel across the top level of the feeding mechanism, they will be held in position where they extend upwardly an appreciable distance beyond the upper surface of the pins 166 and will thus pull the cordage 75 along with them until they arrive in position at the right end (Fig. 16) of the housing 150, where they will be retracted by the auxiliary cam member 186. In this manner, cordage will be fed onto the platform 80, from which the operator may remove a length of cordage equal to the distance between the places on the cordage where conductors are looped through the braid 79.

An operator positioned adjacent to the feeding mechanism 80 will place the cordage 75 on the adjacent moving cordage positioning plate 81, aligning the cordage in such a manner that the conductor 78 will be extending between the auxiliary movable clamping members 266 and 267, the conductor 76 will be extending between the auxiliary fixed clamping members 270 and 271 and the conductor 77 will be extending vertically upwardly at the juncture of the clamping members as viewed in Figs. 24 and 27. As the cordage positioning plate 81 arrives at the feeding mechanism 80, a completed cord having been removed from it after it left the punch press station, it will have its cam rollers 231, 232 and 233 moved to their innermost positions by the cams 379 and 380, thus to move the clamp supporting plates 220 and 221 as near to the die bar 312 as they can be moved. When the clamp supporting plates 220 and 221 are at their closest position, the main clamping members 222, 223, 224 and 225 will be as closely adjacent as possible and in position to receive a length of cordage 75.

Just as the cordage positioning plate 81 enters the position where cordage may be placed on it, the cam 377 will become effective to push the cam rollers 232 and 233 apart slightly and at the same time cams 376 and 378 will prevent the clamp supporting plates 220 and 221 from moving apart. In this manner, the plates 220 and 221, being held against movement longitudinally of the cordage positioning plate 81, the cam rollers 232 and 233, in being moved apart slightly, will cause the main movable clamping members 223 and 225 to move toward the main fixed clamping members 222 and 224 and will carry the auxiliary movable clamping members 266 and 267 toward the auxiliary fixed clamping members 270 and 271. Thereafter, when a length of cordage is placed between the clamping jaws, it will remain in the position in which it is placed, although it is not tightly clamped by the clamping members.

After the operator has properly located the cordage 75 so that the loops of conductors 76 and 78 are positioned as just described hereinbefore, the operator may wrap the cordage 75 as shown in Fig. 1 with the cordage carried by clips 316, 317 and guided by pins 318 and 319. If it is found necessary, additional retaining pins 997 and 998 may be provided on the cordage positioning plate between which the operator may place the excess cordage and an additional pin 999 may be provided adjacent to each cordage positioning plate 81 on the dial supporting casting 129 to receive the coil of cordage 75 which had been dropped onto the platform 86.

As the cordage positioning plate 81, on which a length of cordage has been positioned, continues to travel, the cams 232 and 233 will be moved farther apart by the cam 377 as the cordage positioning plate 81 enters the braid severing station 82, as seen most clearly in Fig. 3. When the cam rollers 232 and 233 move apart under the action of cam 377 at the braid severing station 82, the cam rollers 230 and 231 will be held against movement longitudinally of the cordage positioning plate by cams 376 and 378 and thus the main movable clamping members 223 and 225 and the auxiliary movable clamping members 266 and 267 will be moved toward their associated fixed clamping members. Accordingly, the main clamping members 222, 223, 224 and 225 will tightly grip the cordage 75 between them and the auxiliary clamping members 266, 267, 270 and 271 will lightly engage the cordage. The cordage as thus positioned will extend over the die bar 312 and between the upstanding fingers 291 on the combs 289 and 290.

As the cordage positioning plate 81 enters the braid severing station 82, camming finger 381 on the carriage 334 will engage the trip finger 383 to release plunger 386. The plunger 386 will move forward onto the surface of the bracket 382 at approximately the same time that the cam roller 357 rolls up the surface of operating cam 358 (Fig. 22) to withdraw spring pressed latch 346 from latching notch 348. The carriage 334 will thus continue to move with the dial supporting casting 120 until the plunger 386 is in registry with the socket 442, at which time the latch 346 will be retracted from the notch 348, the plunger 386 dropping into the socket 442 will hold the carriage 334 stationary for a short time in the braid severing station 82.

The plunger 386, in moving into the socket 442, will, through the cam 400, close switch 401 and since switch 402 had previously been closed by the engagement of camming finger 381 with actuator 409, power will be supplied to energize the solenoid 404 over a circuit (Fig. 64) from line 706 through the solenoid 404, switches 401 and 402, back to line 690. When solenoid 404 is energized, reversing valve mechanism 403 will be operated and fluid under pressure will be supplied to the lower end of cylinder 406. When fluid under pressure is supplied to the lower end of cylinder 406, piston rod 411 (Fig. 20) will be moved upwardly to carry the braid cutting knife 423 up through the die bar 312. When the knife 423 moves upwardly through the die bar 312, its rounded tip 435, as shown most clearly in Fig. 27, will engage the braid 79 on the cordage 75 at the point where the looped conductors 76, 77 and 78 extend out from the cordage and thus the rounded tip of the knife will enter between the servings of braid and will push the conductors 76, 77 and 78 out of its path. As the knife 423 continues to move upwardly, its blade members 436 and 437 will cut the braid 79.

In moving upwardly, the piston rod 411 rocks the shaft 415 clockwise (Figs. 20 and 23) due to the engagement of the camming projection 413 with the cam 414. This operation of the shaft 415 effects no useful purpose. However, as the piston rod 411 continues to move upwardly, the cam 430 will engage the cam roller 429 and will rock the bell crank lever 424 clockwise, as viewed in Fig. 22, thereby to operate the reset button 410 of switch 402, thus breaking the circuit to solenoid 404 and permitting the reversing valve 403 to return to normal position, where it will direct fluid under pressure to the upper end of the cylinder 406. Fluid under pressure being supplied to the upper end of the cylinder 406, the piston rod 411 will be moved downwardly and, in moving downwardly, the camming projection 413 will again engage and actuate the cam 414 to rock the shaft 415 counterclockwise (Figs. 20 and 23). When the shaft 415 is rocked counterclockwise, plunger retracting member 416 will be rocked counterclockwise to retract the plunger 386 and move it to its inoperative position, thus opening switch 401 and restoring the braid severing mechanism to normal position. When the plunger 386 is retracted, it will release the carriage 334 and, thereupon, the door check mechanism 360 will be effective to return the carriage 334 to its normal position with respect to the dial supporting casting 120. At the time that the door check mechanism 360 becomes effective, the cam roller 357 will move off of the cam 358 and when the door check mechanism returns the carriage 334 to normal position, the latch 346 will lock the carriage to the casting 120, in position to be carried around to the tucking and inspection station 83.

As the carriage 334 continues to move around the tubular bearing member 100, it will carry the cordage positioning plate 81 into the tucking and inspection station 83. In travelling from the braid severing station to the tucking and inspection station 83, the clamp supporting plates 220 and 221 are moved apart by cam 377 (Fig. 3) acting on rollers 232 and 233 and pushing the rollers apart. This movement is possible because the cam tracks 376 and 378 terminate short of this position. In this manner, the grip of the main clamping members 222, 223, 224 and 225 on the cordage is not released since the plates are pushed apart only by the action of the cam rollers 232 and 233. In thus moving apart, the plates 220 and 221 will cause the various clamping members to move from the positions shown in Fig. 24 to the position shown in Fig. 28, where the conductors 76, 77 and 78 are separated into loops, as shown in Fig. 28, and the portion of the cordage 75 with the braid 79 on it is drawn through the combs 289 and 290 and out into position to have S-hooks and stay bands attached to them in the punch press station 84 after the conductors 76, 77 and 78 have been tucked down through the cordage positioning plate to the position as shown in Fig. 29.

The individual conductors 76, 77 and 78 will be held beneath the auxiliary clamping members 266, 267, 270 and 271 and, as the main clamping members move apart in the early stages of their movement away from each other, the conductors 276, 277 and 278 will tend to assume the position shown in Fig. 28, their movement being restricted somewhat by the configuration of the auxiliary clamping members and the flingers 291 on the combs 289 and 290. In the later portion of their movement apart, the main clamping members and auxiliary clamping members will move as a unit, as described in detail in connection with the description of this portion of the apparatus.

As the cordage positioning plate 81 and carriage 334 enter the tucking and inspection station 83, the camming finger 381 will engage the actuator arm 490 to close switch 489 preparatory to energizing solenoid 465 (Fig. 64). Continued movement of the carriage 334 into the tucking and inspection station 83 will cause the finger 381 to engage the trip latch 496 (Fig. 41) and thus will release plunger 495. Plunger 495 will move into engagement with the surface of the bracket 382 and at approximately the time the plunger 495 is aligned with the socket 442 in the carriage 334, cam roller 357 will ride up cam 358, as shown in Fig. 41. When plunger 495 is released, its spring 500 will drive it into the socket 442 to hold the carriage 334 stationary during the tucking and inspection operations, and cam 493 carried on the shank 494 of the plunger will engage and operate actuator 492 to close switch 491, thus completing the circuit to solenoid 465.

Operation of solenoid 465 will cause the reversing valve mechanism 464 to operate and fluid under pressure will be supplied to the upper end of the cylinder 461, thus to move piston rod 466 downwardly. As the piston rod 466 moves from the position shown in Fig. 30 to the position shown in Fig. 31, it will carry the slide 467 downwardly with it to perform a tucking and inspection operation on the cord positioned on the cord position plate 81. As the slide 467 moves downwardly, the rod 470 will tend to move with it until the camming projection 477 on rod 473 engages the cam member 478, at which time the rod 470 will cease to move downwardly with the slide 467, being held in a slightly elevated position by the cam 478. However, as the slide 467 continues its downward movement, the projecting portion 468 of the slide will engage the upper portion of the lock nut assembly 471 and push the rod 470 and plunger 473 downwardly. In moving downwardly, the plunger 473, will, through the camming projection 477, rock shaft 479 counterclockwise and through the link 481 the shaft 485 will also be rocked counterclockwise. This counterclockwise movement of shaft 485 effects no useful purpose, the plunger retracting member 501 simply moving away from the edge of the notch 502 in the plunger 495 (Fig. 42). After the camming projection 477 has passed the cam 478, it will engage the extending left end (Figs. 30, 31 and 41) of the lever 451 to rock it about the pin 452, thus to move the camming surface 453 into operative engagement with the reset button 488 of switch 489.

When switch 489 is reset in this manner, the circuit to the solenoid 465 will be broken and the reversing valve 464 will return to normal position where fluid will be directed through it to the lower end of the cylinder 461, thereby to start the piston rod 466 on its upward travel. At the lowermost point of its travel, the slide 467, under actuation by the piston rod 466, will cause the tucking and inspecting mechanisms to perform their operations, as will be described, and the slide 467 then starts upwardly. In moving upwardly, the slide 467 will, near the upper end of its travel, engage the lock nut assembly 469 on lock nut 470, thus to lift the plunger 473 and carry the camming projection 477 past the cam 488 again. This will cause the shaft 479 to be rocked clockwise (Figs. 30 and 31) and will, through the link 481, rock shaft 485 counterclockwise (Fig. 42) to retract the plunger 495 and release the actuator 492 (Fig. 41) of switch 491 to restore the circuit to normal condition, as shown in Fig. 64. When the plunger 495 is withdrawn from the socket 442 under the action of the plunger retracting member 501 on shaft 485, it will be latched in its retracted position by the trip latch 496 and the carriage 334 will be returned to its normal position by the door check mechanism 360.

When the slide 467 is moved downwardly by the piston rod 466, it will carry the block 513 with it and the tucking comb 570 will engage the conductors 76, 77 and 78, as shown in Fig. 34, and will then come to rest on the auxiliary clamping members 267 and 271 after tucking the conductors in between the comb 290 and the auxiliary clamping members, as shown in Figs. 29 and 31. Since the ends of the conductors 76, 77 and 78 at this end of a cord to be formed are all of the same length, the comb 570 will tuck them equal distances below the upper surface of the comb 290. The teeth of the tucking comb 570 are of such construction that they will tend to force the conductors 76, 77 and 78 into the notches 306, 307, 308, 309, 310 and 311 and assist in aligning the conductors on the die bar 312. As illustrated most clearly in Fig. 15, the notches 313, 314 and 315, which cooperate with the notches 306, 307 and 308, slope to one side and will thus facilitate the locating of the conductors 76, 77 and 78 on the notches 306, 307 and 308 and the notches 309, 310 and 311. The comb 570, upon engaging its shoulders 575 and 576 with the auxiliary clamping members, will be prevented from moving downwardly and the spring 569 will be compressed as the tube 568 is telescoped into the sleeve 561.

At approximately the same time that the comb 570 engages the conductors 76, 77 and 78, the lower ends of the push rods 518, 519 and 520 will also engage the conductors 76, 77 and 78 and will guide them into engagement with the rollers 537, 538 and 539 (Fig. 33). As the push rods 518, 519 and 520 continue their downward movement under the influence of the springs 523, 524 and 525, the conductors 76, 77 and 78 will be pushed down between the comb 289 and the auxiliary clamping members 266 and 270. Since the amount of individually insulated conductors 76, 77 and 78 which is drawn through the braid 79 is somewhat different for each conductor so that the lengths of conductors extending from the side of the cord to which the stay band is to be attached will be different, the push rods 518, 519 and 520 will be pushed up different distances, as illustrated in Fig. 33. However, the lower ends of the push rods, due to their construction, as shown in Fig. 33, will serve to guide the conductors 76, 77 and 78 into the proper notches 309, 310 and 311 in the die bar 312, tucking the loops of conductors down between the auxiliary clamping members 266 and 270 and the comb 289, as shown in Fig. 29.

During the downward movement of the slide 467, the detecting plungers 580, 581 and 582, as shown most clearly in Fig. 35, will carry their lower ends into engagement with the conductors 76, 77 and 78, laid across the notches in the die bar 312, as shown in Fig. 35. Thus, as the slide 467 continues to move downwardly, the plungers 580, 581 and 582 will rest on the conductors laid across the die bar 312 and will be held in the position shown in Fig. 35 if the proper number of conductors is in the proper notches in the die bar 312. The plungers will move the washers 596, 597 and 598 upward slightly off of the shoulders on which they normally rest in the apertures 599, 600 and 601. After the slide 467 has moved almost to its lowermost position, the projections 673 and 674 thereon will engage the lock nut assembly 671 and 672 to move the rods 662 and 663 downwardly against the action of the springs 669 and 670. This will cause the cross head 666 to move downwardly and will carry the rocker arms 679, 680 and 681 down into engagement with the head members 617, 618 and 619 on the detecting plungers 580, 581 and 582. The rocker arms 679, 680 and 681 will also engage the levers 623, 624 and 625, as described in connection with the description of the structural features of the apparatus. The levers 623, 624 and 625 will not rock about the shaft 626 if the conductors 76, 77 and 78 are properly positioned on die bar 312.

However, in the event that the conductors are not properly aligned in the notches on the die bar 312, one of the detecting plungers 580, 581 or 582 will either not be moved upwardly as much as it should be or will be moved upwardly more than it should with respect to the cross head 666, and one or the other of the switches 651 or 652 will be operated. Operation of either the switch 651 or 652, as shown on the circuit diagram (Fig. 64) will break the locking circuit to the relay 692, thus to release the relay 692 and stop the operation of the apparatus. When the main driving motor 96 stops, it is believed to be obvious that since the carriages 334 will stop, it will be impossible to trip the press solenoid 715, and, therefore, although the punch press motor continues to operate, the solenoid 715 will not be operated and no punching operation will take place. In the event that it is possible to properly align the conductors 76, 77 and 78 manually, the switches 651 and 652 will return to their normal closed position and operation of the start switch may reinitiate the operation of the apparatus as a whole. Thus, in the tucking and inspection station 83, the individual conductors 76, 77 and 78 are properly positioned for the receipt of terminal members 90 in the punch press station 84 and if the conductors are not properly aligned, the apparatus is stopped.

After the conductors 76, 77 and 78 have been tucked down through the cordage positioning plate 81 at the tucking and inspection station 83, the carriage 334 carrying the plate 81 will move into the punch press station. As the carriage moves into the punch press station, the switch 716 (Fig. 44) will be operated due to the release of the plunger 720 at the punch press station by the camming finger 381 engaging the trip finger 722 and the plunger 720 entering the socket 442, thus, as shown in Fig. 64, to complete a circuit to the press trip solenoid 715. Operation of the press trip solenoid 715 will cause the punch press to move its ram 731 through one complete cycle, that is, downwardly and upwardly (Fig. 43). As the ram 731 moves down, the bell crank levers 899, 900 and 901 will be released by their abutment posts 910, 975 and 954, respectively, thus permitting their associated springs to retract them to position preparatory to feeding the strip of S-hooks 92, the strip of stay bands 95 and the strip of terminal members 91 the next time the ram returns to its uppermost position.

As the ram 731 moves downwardly, the stripper plate assembly 877 will be moved with it to engage the pads 983, 984, 985 and 986 with the upper surface of the cordage-positioning plate 81 after the liner pins 757 and 758 have passed through the liner pin holes 321 and 320, respectively, in the cordage positioning plate. As the ram 731 continues to move downwardly, the stripper plate 887 will push the cordage positioning plate 81 downwardly to enter the liner pins 757 and 758 into the liner sleeves 755 and 756, thus to properly align the cordage positioning plate in the punch press. The supporting plungers 752 will be depressed against the action of their springs 754 as the plate 81 moves downwardly and thus will prevent the plate from tilting during its downward movement. After the aligning pins 757 and 758 are properly seated in the liner sleeves 755 and 756, the ram 731, in continuing to move downwardly, will compress the springs 888 (Fig. 46) and thus the stripper plate assembly 887 will remain stationary as the ram 731 completes its stroke.

As soon as the downward movement of the stripper plate assembly 887 is blocked, the cordage positioning plate 81 being in its lowermost position at this time, the tools on the tool holder 826 will move relative to the main stripper plate 889. As the stay band shearing tool 833 and the S-hook forming and shearing tool 834 move downwardly, they will cut the stay bands and S-hooks from the strips 92 and 95 and will carry a stay band and an S-hook into engagement with the cordage 75. In moving to engagement with the cordage 75, the sheared-off S-hook 93 will have the S-shaped hook 872 pushed through between the springs 935 and 936 (Figs. 49 and 54). As the tool holder 826 continues to move down, the forming tools 832 and 834, in cooperation with the forming tools 776 and 777 (Fig. 47), will wrap the sleeves of the stay bands and S-hooks, respectively, around the cordage. Concurrently with the wrapping of the S-hook and stay band sleeves around the cordage, the terminal cutting tools or punches 761, 762 and 763 (Figs. 45 and 49) will, in cooperation with the die 837, cut the terminal members 90 apart and the two sets of terminal forming tools on the tool block 760 and tool 860 will form the sleeves of the terminal members 90 into gripping engagement with the individual conductors 76, 77 and 78. In the last fraction of an inch of movement of the die 837 downwardly, the terminal members 90 will carry the conductors 76, 77 and 78 into engagement with the wire cutting tools or punches 764, 765, 766, 767, 768 and 769, thus to trim the wire adjacent to the sleeve portion of the terminal members 90. In this manner, the S-hooks, stay bands and terminal members will be attached to the cordage, and the conductors 76, 77 and 78 will be cut as the ram 731 completes its downward movement.

When the ram moves upwardly, the springs 888 will return the stripper plate assembly 887 to the position shown in Fig. 46 and the plungers 752 will return the cordage positioning plate 81 to the position shown in dot and dash lines in Fig. 46. At the upper end of its travel, the stripper plate assembly 887 will carry the bell crank levers 899, 900 and 901 into engagement with their respective abutment posts and the bell crank levers will thus effect the feeding of predetermined lengths of S-hook strip, stay band strip and terminal strip to the apparatus preparatory to another reciprocation of the ram 731 and immediately thereafter the cam 732 (Fig. 1) will become effective to rock lever 734 clockwise, thereby to push the link 733 in a direction such that it will rock the restoring lever 729 counterclockwise (Fig. 44) and retract the plunger 720 from the socket 442, thus to permit the door check mechanism 360 to return the carriage 334 to position to be latched by the latch 346.

Thus, the carriage 334 and cordage positioning plate 81 will be moved rapidly out of the punch press station 84 to a position where the cam rollers 230, 231, 232 and 233 will engage the cams 379 and 380 (Fig. 3). Cam rollers 230 and 232 will engage cam 380 and will be spread apart by the forward end of this cam. Similarly, cam rollers 231 and 233 will engage cam 379 and will be spread apart by the forward end of this cam, thus to open the sets of clamping jaws on the cordage positioning plate sufficiently to permit the removal of a completed cord from it. As the carriage 334 carries the cordage positioning plate 81 into association with the feeding mechanism 80, the clamp supporting plates 220 and 221 will be moved toward each other by the action of the cam rollers 232 and 233 on cams 380 and 379, respectively, to prepare the cordage positioning plate to receive a new length of cordage. At the unloading station 85, through which the carriage 334 will be moved at the time when the just-described operations take place, any suitable means may be provided for taking the cords from the cordage positioning plate 81 or the cords may be removed by an operator.

It will be understood that while the previous description of operation of the apparatus has been couched in language indicating that a single plate 81 is provided, it will be understood that six plates 81 and their associated carriages 334 are provided in the apparatus and that while an operator is loading the cordage 75 onto one of the plates 81, there will be a plate 81 at the braid severing station 82, one at the tucking and inspection station 83, one at the punch press station 84, one at the unloading station 85 and one at an idle position between the severing station 82 and the tucking and inspection station 83.

We claim:

1. Apparatus for making electric cords from continuous cordage including a plurality of conductors with covered sections and uncovered sections, which comprises a support, means for rotating the support, a carrier mounted on the support, spaced means mounted on the carrier for engaging such cordage at portions thereof at opposite ends of an uncovered section thereof, a tucker at a fixed station with respect to the support, said tucker having a plurality of conductor-receiving notches, and means for moving the tucker between the spaced cordage-engaging means when they reach the tucker to engage the conductors in said notches to take slack out of the conductors.

2. Apparatus for making electric cords from continuous cordage including a plurality of conductors with covered sections and uncovered sections, which comprises a support, means for rotating the support, a carrier mounted on the support, a pair of clamps on said carrier for clamping such cordage near an end of a covered section thereof, a pair of clamps on said carrier for clamping the cordage at another end of a covered section thereof adjacent to the first-mentioned covered section thereof, a support positioned between the two pairs of clamps, a tucker having a plurality of wide-mouthed conductor-receiving notches, a second tucker having a plurality of wide-mouthed conductor-receiving notches, means for moving the tuckers between the support and the pairs of the clamps to take slack out of the conductors when the carrier is advanced to a point in alignment with the tucker, and means for limiting the tucking movement of one of the tuckers.

3. Apparatus for making electrical cords from continuous cordage including a plurality of conductors with covered sections and uncovered sections joining the covered sections, which comprises a pair of clamps for clamping a covered section of such cordage at a point near an end of that section, a second pair of clamps for clamping a covered section of the cordage adjacent to the first covered section at a point near an end of the second section adjacent to the clamped end of the first covered section, means for holding the pairs of clamps in substantial alignment and spaced apart a predetermined distance, said distance being less than the length of any of the portions of the conductors extending between the pairs of clamps, a support having a plurality of conductor-receiving grooves spaced a predetermined distance apart, said support being positioned between the pairs of clamps and spaced from at least one pair of the clamps, a plurality of plungers, each of said plungers having a wide-mouthed conductor-receiving notch, said plungers being spaced apart the same distance as that between the grooves in the support, means for urging the plungers individually toward the conductors, and means for moving the plungers between the support and the last-mentioned pair of the clamps to take slack out of the conductors and to move the conductors into the grooves in the support.

4. Apparatus for making electrical cords from continuous cordage including a plurality of conductors with covered sections and uncovered sections, which comprises a pair of clamps for clamping such cordage at a point near an end of a covered section thereof, a second pair of clamps for clamping the cordage at a point near the end of the covered section thereof adjacent to the first-mentioned end thereof, means for holding the pairs of clamps substantially in alignment and spaced apart a predetermined distance, said distance being less than the length of any of the uncovered portions of the conductors extending between the pairs of clamps, a support having a plurality of conductor-receiving grooves spaced a predetermined distance apart, said support being positioned between the pairs of clamps and spaced from at least one pair of the clamps, a tucker having a plurality of wide-mouthed conductor-receiving notches spaced apart the same distance as the grooves in the support, and means for moving the tucker between the support and the last-mentioned pair of the clamps to take slack out of the conductors and to move the conductors into the grooves in the support.

5. Apparatus for making electrical cords from continuous cordage including a plurality of conductors with covered sections and uncovered sections alternating with the covered sections, which comprises an open frame, a pair of clamps positioned at one end of the frame for clamping an end of a covered section of such cordage, a second pair of clamps positioned at the opposite end of the frame for clamping an end of a second covered section of the cordage adjacent to the first covered section thereof, a guide having a notch therein and positioned so that it extends across the frame near the first-mentioned pair of clamps, a second guide having a notch therein and positioned so that it extends across the frame near the second pair of clamps, the notches in said guides serving to receive the conductors extending between the ends of the covering, a support having a plurality of notches formed therein at spaced points therealong and positioned so that it extends across the frame at a point spaced from but near the first guide, a second support having a plurality of notches formed therein at spaced points therealong and positioned across the frame at a point near to but spaced from the second guide, said notches in said supports serving to receive the individual conductors extending between the ends of the covered sections, a die bar having a plurality of notches therein for partially receiving the individual conductors and positioned so that it extends across the frame between the supports, the supports and the die bar being so positioned and the notches therein being so formed and being so spaced that each notch in the die bar is aligned with a notch in the first support and a notch in the second support, a plurality of pusher plungers, each of said plungers having a wide-mouth notch formed in an end thereof for receiving one of the conductors, a pusher comb having a plurality of spaced notches therein for receiving the conductors, a pusher head for resiliently mounting the pusher plungers in alignment with the space between the first support and the first guide and for mounting the pusher comb in alignment with the second support and the second guide, and means for moving the pusher head towards the frame, whereby the pusher plungers and the pusher comb engage the conductors and move them into the notches in the supports and the die bar to take the slack out of the conductors and to orient them.

6. Apparatus for making electrical cords from continuous cordage including a plurality of conductors with covered sections and uncovered sections, which comprises a pair of clamps for clamping an end portion of a covered section of such cordage, a second pair of clamps for clamping an end portion of a second covered section of the cordage adjacent to the first-covered section thereof, means for holding the pairs of clamps in positions substantially aligned and spaced apart a predetermined distance, said distance being less than the length of any of the portions of the conductors extending between the pairs of clamps, a support having a plurality of conductor-receiving grooves spaced a predetermined distance apart, said support being positioned between and spaced from the pairs of clamps, a tucker having a plurality of wide-mouthed conductor-receiving notches, said notches in the tucker being spaced apart substantially the same distance as that between the grooves in the support, a second tucker having a plurality of wide-mouthed conductor-receiving notches, said notches in the second tucker being spaced apart substantially the same distance as that between the grooves in the support, means for mounting the first tucker for movement into the space between one pair of clamps and the support, means for mounting the second tucker for movement into the space between the other pair of clamps and the support, and means for moving the tuckers into the spaces between the support and the pairs of clamps to take the slack out of the conductors and to move the conductors into the grooves in the support.

7. Apparatus for making electrical cords from continuous cordage including a plurality of conductors with covered sections and uncovered sections alternating with the covered sections, which comprises an open frame, a pair of clamps positioned at one end of the frame for clamping an end of a covered section of such cordage, a second pair of clamps positioned at the opposite end of the frame for clamping an end of a second covered section of the cordage adjacent to the first covered section thereof, a support having a plurality of notches formed therein at spaced points therealong and positioned so that it extends across the frame at a point near to but spaced from the first pair of clamps, a second support having a plurality of notches formed therein at spaced points therealong and positioned across the frame at a point near to but spaced from the second pair of clamps, said notches in said supports serving to receive the individual conductors extending between the ends of the covered sections, a die bar having a plurality of notches therein for partially receiving the individual conductors and positioned so that it extends across the frame between the supports, the supports and the die bar being so positioned and the notches therein being so formed and being so spaced that each notch in the die bar is aligned with a notch in the first support and a notch in the second support, a pusher having a plurality of spaced notches therein for receiving the conductors, a second pusher having a plurality of spaced notches therein for receiving the conductors, a plunger head for mounting the first pusher in alignment with the space between the first support and the first pair of clamps, means for mounting the second pusher in alignment with the second support and the second pair of clamps, means for moving the pushers toward the frame, whereby the pushers engage the conductors and move them into the notches in the supports and the die bar and take the slack out of the conductors, a plurality of feelers, means for mounting the feelers in alignment with the notches in the die bar, means for moving the feelers toward the notches in the die bar, and means operable by any of the feelers for indicating the absence of one of the conductors from one of the notches in the die bar or the piling up of any of the conductors on the die bar.

8. Apparatus for making cords from continuous cordage including a plurality of conductors with a continuous covering thereover and having the conductors thrown in loops through and out of the covering at spaced points along the cordage, which comprises a guideway, means for moving the guideway along a predetermined endless path, a pair of clamps mounted slidably on the guideway and closable to a clamping position for clamping a covered portion of such cordage on one side of one of said points, a second pair of clamps mounted slidably on the guideway closable to a clamping position for clamping a covered portion of the cordage on a side of said last-mentioned point opposite to that of the portion of the cordage clamped by the first pair of clamps, means for closing said pairs of clamps at a predetermined point along the path of the guideway, means for moving the pairs of clamps apart at a second point along the path of the guideway, and means for opening the pairs of clamps at a third point along the path of the guideway.

9. Apparatus for making cords from continuous cordage including a plurality of conductors with a continuous covering thereover and having the conductors thrown in loops through and out of the covering at spaced points along the cordage, which comprises a guideway, means for moving the guideway along a predetermined endless path, a pair of clamps mounted slidably on the guideway and closable to a clamping position for clamping a covered portion of such cordage on one side of one of said points, a second pair of clamps mounted slidably on the guideway closable to a clamping position for clamping a covered portion of the cordage on a side of said last-mentioned point opposite to that of the portion of the cordage clamped by the first pair of clamps, means for closing said pairs of clamps at a predetermined point along the path of the guideway, means for moving the pairs of clamps apart at a second point along the path of the guideway, means for normally maintaining the pairs of clamps in closed conditions after they have once been closed, and means for opening the pairs of clamps at a third point along the path of the guideway.

10. Apparatus for making electrical cords from continuous cordage including a plurality of conductors with a continuous covering thereover and having the conductors thrown in loops through and out of the covering at spaced points along the cordage, which comprises a frame, a guideway carried by the frame, means for moving the frame along a predetermined path, a plate mounted slidably on the guideway, a second plate mounted slidably on the guideway, a pair of clamps mounted on the first plate and closable to a clamping position for clamping a covered portion of such cordage on one side of one of said points, means carried by the first plate including a cam follower and an overcenter latch operable by the cam follower for closing the pair of clamps, a second pair of clamps mounted on the second plate and closable to a clamping position for clamping a covered portion of the cordage on a side of said point opposite to that of the portion of the cordage clamped by the first pair of clamps, a second closing means carried by the second plate including a second cam follower and a second overcenter latch operable by the second cam follower for closing the second pair of clamps, a third cam follower fixed to the first plate, a fourth cam follower fixed to the second plate, and a plurality of cam tracks positioned along said path for sequentially moving the third cam follower and the fourth cam follower toward each other to move the plates toward each other, moving the first cam follower and the second cam follower in predetermined directions relative to the third cam follower and the fourth cam follower, respectively, and simultaneously holding the third cam follower and the fourth cam follower against movement to close the pairs of clamps on the cordage and actuate the overcenter latches, moving the plates apart through the cam followers to separate the covered portions of the cordage adjacent to said point and to at least partially straighten the loops of conductors therebetween, and moving the first cam follower and the second cam follower in directions opposite to the first-mentioned directions thereof relative to the third cam follower and the fourth cam follower, respectively, and simultaneously holding the third cam follower and the fourth cam follower stationary to release the overcenter latches and to open the pairs of clamps.

11. Apparatus for making electrical cords from continuous cordage including a plurality of conductors with a continuous covering thereover and having the conductors thrown in loops through and out the covering at spaced points along the cordage, which comprises a frame, a guideway carried by the frame, means for moving the frame along a predetermined path, a plate mounted slidably on the guideway, a second plate mounted slidably on the guideway, a pair of clamps mounted on the first plate and closable to a clamping position for clamping a covered portion of such cordage on one side of one of said points, means including a cam follower for closing the pair of clamps when the follower is moved relative to the first plate in a predetermined direction, a second pair of clamps mounted on the second plate and closable to a clamping position for clamping a covered portion of the cordage on a side of said point opposite to that of the portion of the cordage clamped by the first pair of clamps, a second closing means including a second cam follower for closing the second pair of clamps when the second follower moved relative to the second plate in a predetermined direction, a third cam follower fixed to the first plate, a fourth cam follower fixed to the second plate, and a plurality of cam tracks positioned along said path for sequentially moving the third cam follower and the fourth cam follower toward each other to move the plates toward each other, moving the first cam follower and the second cam follower in said predetermined directions while holding the third cam follower and the fourth cam follower against movement therewith to close the pairs of clamps on the cordage, moving the plates apart through the cam followers to separate the covered portions of the cordage adjacent to said point and to at least partially straighten the loops of conductors therebetween, and moving the first cam follower and the second cam follower in directions opposite to said predetermined directions while holding the third cam follower and the fourth cam follower against movement therewith to open the clamps.

12. Apparatus for making electrical cords from continuous cordage including a plurality of conductors with a continuous covering thereover and having the conductors thrown in loops through and out of the covering at spaced points along the cordage, which comprises a frame, a guideway carried by the frame, means for moving the frame along a predetermined path, a plate mounted slidably on the guideway, a second plate mounted slidably on the guideway, a pair of clamps mounted on the first plate and closable to a clamping position for clamping a covered portion of such cordage on one side of one of said points, a cam follower connected to the pair of clamps for closing the pair of clamps, a second pair of clamps mounted on the second plate and closable to a clamping position for clamping a covered portion of the cordage on a side of said point opposite to that of the portion of the cordage clamped by the first pair of clamps, a second cam follower connected to the second pair of clamps for closing the second pair of clamps, a third cam follower fixed to the first plate for moving that plate along the guideway in the frame, a fourth cam follower fixed to the second plate for moving that plate along the guideway in the frame, and a pair of matched cam means extending along the path of the frame, one of said matched cam means serving to engage the first cam follower and the third cam follower and the other matched cam means serving to engage the second cam follower and the fourth cam follower, said first cam follower and said third cam follower serving to close the first pair of clamps when moved in a predetermined direction relative to one another and to open these clamps when moved relative to one another in a direction opposite thereto, said second cam follower and said fourth cam follower serving to close the second pair of clamps when moved relative to one another in a predetermined direction and to open these clamps when moved relative to each other in a direction opposite thereto, said pairs of matched cam means serving to sequentially move the third cam follower and the fourth cam follower toward each other to move the plates toward each other, to move the first cam follower and the second cam follower relative to the third cam follower and the fourth cam follower, respectively, in such directions as to close the pairs of clamps on the cordage, to move the plates apart through the cam followers to separate the covered portions of the cordage adjacent to said points and to at least partially straighten the loops of conductors therebetween, and to move the first cam follower and the second cam follower relative to the third cam follower and the fourth cam follower, respectively, in such directions as to open the pairs of clamps.

13. Apparatus for making electric cords from continuous cordage including a plurality of conductors with covered sections and uncovered sections, which comprises means for engaging such cordage at portions thereof at opposite ends of an uncovered section thereof, a tucker for taking slack out of the uncovered sections of the conductors and for orienting the conductors, feeler means for inspecting the orientation of the conductors, pneumatic means for moving the tucker and the feeler means into engagement with the conductors, and means responsive to the feeler means for stopping the apparatus when a conductor is improperly positioned.

14. Apparatus for making electrical cords from continuous cordage including a plurality of conductors with a continuous covering thereover and having the conductors thrown through and extending out of the covering at spaced points along the cordage, which comprises a support, means for rotating the support, a carrier mounted on the support, spaced means mounted on the carrier for engaging such cordage at portions thereof at opposite sides of a point where the conductors extend therefrom, means at a fixed station with respect to the support for cutting the covering on the cordage at said point, a tucker at another fixed station with respect to the support, said tucker having a plurality of conductor-receiving notches, and means for moving the tucker between the spaced cordage-engaging means when they reach the tucker to engage the conductors in said notches to take slack out of the conductors.

15. Apparatus for making electrical cords from continuous cordage including a plurality of conductors with a continuous covering thereover and having the conductors thrown through and extending out of the covering at spaced points along the cordage, which comprises a pair of clamps for engaging a covered section of such cordage at a point near an end of that section, a second pair of clamps for clamping a covered section of the cordage adjacent to the first covered section at a point near an end of the second section adjacent to the clamped end of the first covered section, means for holding the pairs of clamps in substantial alignment and spaced apart a predetermined distance, said distance being less than the length of any of the portions of the conductors extending between the pairs of clamps, a support having a plurality of conductor-receiving grooves spaced a predetermined distance apart, said support being positioned between the pairs of clamps, a support having a plurality of conductor-receiving grooves spaced a predetermined distance apart, said support being positioned between the pairs of clamps and spaced from at least one pair of the clamps, means for cutting the covering on the cordage at the point where the conductors extend therethrough, a plurality of plungers, each of said plungers having a wide-mouthed conductor-receiving notch, said plungers being spaced apart the same distance as that between the grooves in the support, means for urging the plungers individually toward the conductors, and means for moving the plungers between the support and the last-mentioned pair of the clamps to take slack out of the conductors and to move the conductors into the grooves in the support.

16. Apparatus for making electric cords from continuous cordage including a plurality of conductors with covered sections and uncovered sections, which comprises a support, means for rotating the support, a carrier mounted on the support, spaced means mounted on the carrier for engaging such cordage at portions thereof at opposite ends of an uncovered section thereof, a tucker at a fixed station with respect to the support, said tucker having a plurality of conductor-receiving notches, means for moving the tucker between the spaced cordage-engaging means when they reach the tucker to engage the conductors in said notches to take slack out of the conductors, means at another fixed station for applying terminal members to the conductors and for serving the conductors, and means for successively actuating the tucker and the member-applying and severing means.

ROBERT T. ADAMS.
JULIUS A. WAGNER.

REFERENCES CITED

The following references are of record in the file of this patent:

UNITED STATES PATENTS

| Number | Name | Date |
|---|---|---|
| 1,765,521 | Barrans | June 24, 1930 |
| 1,836,500 | Poole | Dec. 15, 1931 |
| 1,873,125 | Holmes et al. | Aug. 23, 1932 |
| 2,169,802 | Keller | Aug. 15, 1939 |
| 2,422,282 | Adams | June 17, 1947 |

FOREIGN PATENTS

| Number | Country | Date |
|---|---|---|
| 56,092 | Sweden | Feb. 26, 1924 |